United States Patent
Akutagawa et al.

(10) Patent No.: US 8,679,578 B2
(45) Date of Patent: Mar. 25, 2014

(54) METHOD OF MANUFACTURING ANTI-REFLECTION FILM, ANTI-REFLECTION FILM AND COATING COMPOSITION

(71) Applicant: FUJIFILM Corporation, Tokyo (JP)

(72) Inventors: Nobuyuki Akutagawa, Kanagawa (JP); Hiroyuki Yoneyama, Kanagawa (JP); Daiki Wakizaka, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/630,407

(22) Filed: Sep. 28, 2012

(65) Prior Publication Data

US 2013/0084442 A1 Apr. 4, 2013

(30) Foreign Application Priority Data

Sep. 29, 2011 (JP) .................. 2011-215655

(51) Int. Cl.
*B05D 5/06* (2006.01)
*B05D 5/00* (2006.01)
*B05D 3/10* (2006.01)
*B32B 9/04* (2006.01)
*C08K 9/00* (2006.01)
*C08K 9/06* (2006.01)
*C08L 27/00* (2006.01)
*C08L 27/12* (2006.01)
*B32B 7/02* (2006.01)
*C08K 9/04* (2006.01)

(52) U.S. Cl.
CPC *B05D 5/00* (2013.01); *B05D 5/063* (2013.01); *B05D 3/108* (2013.01); *B32B 7/02* (2013.01); *C08K 9/04* (2013.01); *C08K 9/06* (2013.01); *C08L 27/12* (2013.01)
USPC ........ 427/162; 428/411.1; 523/200; 523/212; 524/520; 524/544

(58) Field of Classification Search
CPC .......... B05D 3/108; B05D 5/00; B05D 5/063; B32B 7/02; C08K 9/04; C08K 9/06; C08L 27/12
USPC ................ 427/162; 428/411.1; 523/200, 212; 524/520, 544
See application file for complete search history.

(56) References Cited

U.S. PATENT DOCUMENTS

| 2002/0103316 A1* | 8/2002 | Tanaka et al. ................. 526/245 |
| 2009/0202819 A1* | 8/2009 | Asahi et al. .................... 428/336 |
| 2011/0026121 A1* | 2/2011 | Suzuki et al. ................. 359/585 |

FOREIGN PATENT DOCUMENTS

| JP | 2006-206832 A | 8/2006 |
| JP | 2007-038199 A | 2/2007 |
| JP | 2007-238897 A | 9/2007 |
| JP | 2009-198748 A | 9/2009 |

* cited by examiner

*Primary Examiner* — Michael Cleveland
*Assistant Examiner* — James M Mellott
(74) *Attorney, Agent, or Firm* — Jean C. Edwards, Esq.; Edwards Neils PLLC

(57) ABSTRACT

A method of manufacturing an anti-reflection film, the method forming a multi-layer structure with different refractive indices from a coating composition in which the following (A) to (F) components are mixed. (A) Fluorine-containing polymer including a fluorine-containing hydrocarbon structure and a constituent unit derived from a compound having at least one group selected from a polyalkylene oxide group and a basic functional group, (B) Low refractive index inorganic fine particles which are not surface-modified or low refractive index inorganic fine particles which are surface-treated with a silane coupling agent having the molecular weight of 600 or less, (C) A curable binder containing no fluorine atoms in the molecule, (D) A solvent, (E) A polyfunctional fluorine-containing curable compound, and (F) High refractive index inorganic fine particles treated with a specific surface modifying agent.

16 Claims, No Drawings

METHOD OF MANUFACTURING ANTI-REFLECTION FILM, ANTI-REFLECTION FILM AND COATING COMPOSITION

CROSS-REFERENCE TO RELATED APPLICATIONS

This application claims priority from Japanese Patent Application No. 2011-215655, filed on Sep. 29, 2011, the contents of which are herein incorporated by reference in its entirety.

BACKGROUND OF THE INVENTION

1. Field of the Invention

The present invention relates to a method of manufacturing an anti-reflection film, an anti-reflection film, and a coating composition. More specifically, the present invention relates to a coating composition with excellent manufacturing efficiency which is capable of forming an anti-reflection film having a multi-layer structure formed of two layers or more having different refractive indices with a single coating step, a method of manufacturing an anti-reflection film having a multi-layer structure of two layers or more using the coating composition, and an anti-reflection film manufactured by the manufacturing method.

2. Description of the Related Art

The anti-reflection film is arranged on the surface of a display in an image display device such as a liquid crystal display (LCD), a cathode ray tube display (CRT), a plasma display panel (PDP), or an electroluminescent display (ELD), and there is a demand for low reflectivity in order to prevent contrast deterioration due to the reflection of external light or reflection of background images as well as a demand for high physical strength (such as scratch resistance), transparency, and the like.

Therefore, in anti-reflection films, in general, on a substrate, functional layers such as a hard coat layer and a high refractive index layer, and a low refractive index layer of an appropriate thickness which has a lower refractive index than the substrate, are formed in this order.

These anti-reflection films can be manufactured by a coating method; however, there is a problem with the productivity since laminating a plurality of layers of thin films having different refractive indices requires a film forming step including at least a plurality of coating steps, facilities associated with the plurality of film forming steps need to be set up, and time is required to complete these steps.

In relation to this problem, techniques capable of forming two or more layers from one coating liquid have been disclosed (for example, refer to JP2006-206832A, JP2007-038199A, JP2007-238897A, and JP2009-198748A).

SUMMARY OF THE INVENTION

However, while these techniques are excellent in terms of being able to manufacture an anti-reflection film with few coating steps, in the techniques disclosed in to JP2006-206832A, JP2007-038199A, and JP2007-238897A, there is no freedom of choice of the coating solvent and control of the drying step after the coating is difficult, whereby it is difficult to obtain an anti-reflection film having a high anti-reflection performance obtained by precise film thickness control due to changes in the conditions and non-uniformity of the drying. For example, in the technique disclosed in JP2009-198748A, the distribution of two kinds of inorganic particles for forming the layers having different refractive indices, which are included in the coating liquid, is insufficient, and it is difficult to suppress thickness unevenness of the layers.

In addition, in the obtained anti-reflection film, there is a need for further improvement from the viewpoints of the adhesion between each layer, the scratch resistance of the surface, and also the suppression of surface defects (point defects).

The present invention has an object of providing a manufacturing method of an anti-reflection film which is capable of improving the manufacturing efficiency by forming a multi-layer structure of two or more layers with a single coating step, an anti-reflection film obtained by the manufacturing method and excellent from the viewpoints of the thickness unevenness of each layer in the multi-layer structure, the adhesion between each layer, the reflectivity, the scratch resistance, and the surface shape, and a coating composition used for forming the multi-layer structure.

Means for Solving the Problems

As a result of intensive research to solve the above-described problems, the present inventors found that the object of solving the problems could be achieved using the following configuration, thereby completing the present invention.

The present invention is a technique relating to a coating composition capable of forming a multi-layer structure formed of two or more layers with a single coating step and capable of improving the manufacturing efficiency of an anti-reflection film, in particular, a technique in which, by coating the surface of the low refractive index inorganic fine particles with a specific compound with low surface energy and high interaction with the low refractive index inorganic fine particles, the surface energy of low refractive index inorganic fine particles coated on the surface is decreased, the low refractive index inorganic fine particles are spontaneously distributed in the coating film, and the distribution of the high refractive index inorganic fine particles of which the surface energy is comparatively high is also controlled in the same manner.

In particular, the low refractive index inorganic fine particles in which the surface energy is decreased in the above-described manner can be distributed (upper portion distribution) to the air interface side (upper layer) in the coating film and, at the same time, the high refractive index inorganic fine particles in which the surface energy is high can be distributed (lower portion distribution) to the substrate side (lower layer), whereby a multi-layer structure can be formed in the coating film. In addition, in the coating composition, by using a curable binder and high refractive index inorganic fine particles which easily cause phase separation with the compound having low surface energy, a layer in which the low refractive index inorganic fine particles are present can be formed in the upper layer and a layer in which the high refractive index inorganic fine particles are present can be formed in the lower layer.

In addition, in the coating composition, by including an (E) polyfunctional fluorine-containing curable compound, unexpectedly, it was found that the generation of point defects was suppressed, and a layer having an excellent surface shape could be obtained.

An object of the present invention is achieved by the following configuration.

The manufacturing method of the anti-reflection film of the present invention comprises steps of: preparing a coating composition in which the following (A) to (F) components are mixed; coating the coating composition on the substrate to form a coating film; drying the coating film by volatilizing a solvent from the coating film; and curing the coating film to form a cured layer, in this order, and forms a multi-layer structure having different refractive indices from the coating composition.

(A) Fluorine-containing polymer including a fluorine-containing hydrocarbon structure and a constituent unit derived from a compound having at least one group selected from a polyalkylene oxide group and a basic functional group.

(B) Low refractive index inorganic fine particles which are not surface-modified or low refractive index inorganic fine particles which are surface-treated with a silane coupling agent having the molecular weight of 600 or less.

(C) A curable binder containing no fluorine atoms in the molecule.

(D) A solvent.

(E) A polyfunctional fluorine-containing curable compound.

(F) High refractive index inorganic fine particles treated with a surface modifying agent represented by the following general formula (F-1).

$$[R\!\!-\!\!\!{}_{m}M\!\!-\!\!\!X]_n \quad (F\text{-}1)$$

In the general formula (F-1), R represents an organic group having one or more carbon atoms, M represents a metal atom selected from silicon, zirconium, or titanium, and X represents an alkoxy group or a halogen atom. m represents an integer of 1 to 3 and n represents an integer of 1 to 3. In a case where there is more than one of R and X, they may respectively be the same or different.

However, in the coating composition, the mass ratio of [(A) component+(B) component+(E) component]/[(C) component+(F) component] is 20/80 to 60/40.

Preferably, the molecular weight of the (E) component is 450 to 2000.

In addition, preferably, the (B) component is low refractive index inorganic fine particles which are surface-treated with a silane coupling agent, and a molecular weight of the silane coupling agent is 90 to 600.

In addition, preferably, the (A) component is a copolymer containing a constituent unit having a fluorine-containing hydrocarbon structure.

In addition, preferably, the (A) component has a further polysiloxane structure in the molecule.

In addition, preferably, the (A) component contains a polymerizable functional group in the molecule.

In addition, preferably, the (A) component is a fluorine-containing polymer represented by the following general formula (1).

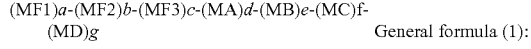

(MF1)$a$-(MF2)$b$-(MF3)$c$-(MA)$d$-(MB)$e$-(MC)$f$-(MD)$g$     General formula (1):

In the general formula (1), a to f respectively represent the molar fraction of each constituent unit with respect to all the constituent units configuring the fluorine-containing polymer, g represents the mass ratio of the constituent unit (MD) with respect to the whole fluorine-containing polymer, and a relationship of $0\%\leq a\leq 70\%$, $0\%\leq b\leq 70\%$, $0\%\leq c\leq 80\%$, $30\%\leq a+b+c\leq 90\%$, $0\%\leq d\leq 50\%$, $0\%\leq e\leq 50\%$, $0.1\%\leq f\leq 50\%$, and 0 mass %$\leq g\leq$15 mass % is satisfied.

(MF1): represents a constituent unit derived from a monomer represented by $CF_2=CF-Rf_1$. $Rf_1$ represents a perfluoroalkyl group having 1 to 5 carbon atoms.

(MF2): represents a constituent unit derived from a monomer represented by $CF_2=CF-ORf_{12}$. $Rf_{12}$ represents a fluorine-containing alkyl group having 1 to 30 carbon atoms.

(MF3): represents a constituent unit derived from a monomer represented by $CH_2=CR_0\text{-L-}Rf_{13}$. $R_0$ represents a hydrogen atom, a halogen atom, or a methyl group, L represents a divalent linking group, and $Rf_{13}$ represents a fluorine-containing alkyl group having 1 to 30 carbon atoms.

(MA): represents a constituent unit having at least one cross-linking group.

(MB): represents a constituent unit having at least one non-cross-linking group.

(MC): represents a constituent unit derived from a compound having at least one group selected from a polyalkylene oxide group and a basic functional group.

(MD): represents a constituent unit having at least one polysiloxane structure.

In a case where there is more than one of (MF1), (MF2), (MF3), (MA), (MB), (MC), and (MD), they may respectively be the same or different.

In addition, preferably, the low refractive index inorganic fine particles of (B) component are metal oxide fine particles having an average particle diameter of 1 to 150 nm, and a refractive index of 1.46 or less.

In addition, preferably, the low refractive index inorganic fine particles of (B) component are metal oxide particles of which the surface has at least a silicon as a constituent component.

In addition, preferably, as the (C) component, a compound having a plurality of unsaturated double bonds in the molecule is contained.

In addition, preferably, the free energy ($\Delta G=\Delta H-T\cdot\Delta S$) of mixing of the (C) component and the (A) component is greater than zero.

In addition, preferably, the (D) component is a mixed solvent including the following (D-1) and (D-2).

(D-1): a volatile solvent having a boiling point in excess of 100° C.

(D-2): a volatile solvent having a boiling point of 100° C. or less

In addition, preferably, the viscosities of the solvents (D-1) and (D-2) are 4.0 cP or less.

In addition, preferably, the high refractive index inorganic fine particles of the (F) component are oxide fine particles of at least one element selected from a group of zirconium, titanium, aluminum, iron, copper, zinc, yttrium, niobium, molybdenum, indium, tin, tantalum, tungsten, lead, bismuth, cerium, antimony, and germanium.

In addition, preferably, the surface modifying agent in the high refractive index inorganic fine particles of the (F) component is a compound having at least one group selected from a group of a vinyl group, a styryl group, an acryl group, a methacryl group, an acryloxy group, an epoxy group, a carbon-carbon double bond, a phenyl group, and a methylphenyl group.

In addition, preferably, the (A) component is a polymer containing a constituent unit having a fluorine-containing hydrocarbon structure, and a constituent unit including a basic functional group is grafted.

In addition, preferably, (MC) in the general formula (1) is a constituent unit derived from an unsaturated group-containing prepolymer having a basic functional group.

In addition, preferably, (MC) in the general formula (1) is a constituent unit derived from a component in which a compound containing a basic functional group is bonded to a polyfunctional epoxy compound.

In addition, preferably, (MC) in the general formula (1) is a constituent unit derived from a monomer having at least one polyalkylene oxide group of the following general formula (2).

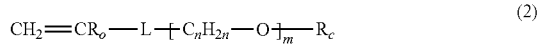
(2)

($R_O$ represents a hydrogen atom, a halogen atom, or a methyl group, L represents a divalent linking group, Rc represents a hydrogen atom or an alkyl group having 1 to 10 carbon atoms, m represents a positive integer and $2 \leq m \leq 50$, and n represents a positive integer and $1 \leq n \leq 5$. Here, when m is two or more, a plurality of —$C_nH_2$—O— may be different repeating units, respectively.)

In addition, preferably, L in the general formula (2) is a divalent linking group having 1 to 9 carbon atoms.

The anti-reflection film of the present invention is obtained by the manufacturing method of the present invention.

Preferably, the anti-reflection film of the present invention comprises a low refractive index layer wherein the (B) component is distributed to the air interface side and a high refractive index layer wherein the (F) component is distributed to the substrate interface side, and the refractive index of the low refractive index layer is 1.25 to 1.48, and the refractive index of the high refractive index layer being 1.55 to 1.90.

The coating composition of the present invention mixes the following (A) to (F) components.

(A) Fluorine-containing polymer including a fluorine-containing hydrocarbon structure and a constituent unit derived from a compound having at least one group selected from a polyalkylene oxide group and a basic functional group, (B) low refractive index inorganic fine particles which are not surface-modified or low refractive index inorganic fine particles which are surface-treated with a silane coupling agent having the molecular weight of 600 or less, (C) a curable binder containing no fluorine atoms in the molecule, (D) a solvent, (E) a polyfunctional fluorine-containing curable compound, (F) high refractive index inorganic fine particles treated with a surface modifying agent represented by the following general formula (F-1).

(F-1)

In the general formula (F-1), R represents an organic group having one or more carbon atoms, M represents a metal atom selected from silicon, zirconium, or titanium, and X represents an alkoxy group or a halogen atom. m represents an integer of 1 to 3 and n represents an integer of 1 to 3. In a case where there is more than one of R and X, they may respectively be the same or different.

However, in the coating composition, the mass ratio of [(A) component+(B) component+(E) component]/[(C) component+(F) component] is 20/80 to 60/40.

Effect of the Invention

The present invention can provide a coating composition capable of forming a multi-layer structure of two or more layers with a single coating step. Furthermore, a manufacturing method of an anti-reflection film having excellent productivity (with simplified manufacturing steps) by using the coating composition can be provided. In addition, an anti-reflection film with low reflectivity, good scratch resistance and excellent adhesion can be provided. In addition, by using the polyfunctional fluorine-containing curable compound, an anti-reflection film with excellent scratch resistance and with reduced surface defects can be provided.

DESCRIPTION OF THE PREFERRED EMBODIMENTS

The present invention relates to a method of manufacturing an anti-reflection film, the method comprising steps of: preparing a coating composition in which the following (A) to (F) components are mixed; coating the coating composition on a substrate to form a coating film; drying the coating film by volatilizing a solvent from the coating film; and curing the coating film to form a cured layer, in this order, and forming a multi-layer structure having different refractive indices from the coating composition.

(A) Fluorine-containing polymer including a fluorine-containing hydrocarbon structure and a constituent unit derived from a compound having at least one group selected from a polyalkylene oxide group and a basic functional group, (B) low refractive index inorganic fine particles which are not surface-modified or low refractive index inorganic fine particles which are surface-treated with a silane coupling agent having the molecular weight is 600 or less, (C) a curable binder containing no fluorine atoms in the molecule, (D) a solvent, (E) a polyfunctional fluorine-containing curable compound, (F) high refractive index inorganic fine particles treated with a surface modifying agent represented by the following general formula (F-1).

However, in the coating composition, the mass ratio of [(A) component+(B) component+(E) component]/[(C) component+(F) component] is 20/80 to 60/40.

(F-1)

In the general formula (F-1), R represents an organic group having one or more carbon atoms, M represents a metal atom selected from silicon, zirconium, or titanium, and X represents an alkoxy group or a halogen atom. m represents an integer of 1 to 3 and n represents an integer of 1 to 3. In a case where there is more than one of R and X, they may respectively be the same or different.

In addition, the present invention relates to the coating composition and an anti-reflection film manufactured by the manufacturing method of the anti-reflection film.

<(A) Component: Fluorine-Containing Polymer>

The coating composition of the present invention contains a fluorine-containing polymer including, as the (A) component, a fluorine-containing hydrocarbon structure and a constituent unit derived from a compound having at least one group selected from a polyalkylene oxide group and a basic functional group.

Examples of the fluorine-containing polymer may include compounds having a fluorine-containing hydrocarbon structure such as a group containing a fluorine-containing hydrocarbon and a constituent unit (constituent unit derived from a monomer including a fluorine-containing hydrocarbon) containing a fluorine-containing hydrocarbon.

Examples of the fluorinated hydrocarbon structure may include a fluorine-containing aliphatic hydrocarbon group, a fluorine-containing aromatic hydrocarbon group, a constituent unit containing a fluorine-containing aliphatic hydrocarbon, and a constituent unit containing a fluorine-containing aromatic hydrocarbon, and the fluorine-containing aliphatic hydrocarbon group or the constituent unit containing a fluorine-containing aliphatic hydrocarbon are preferable.

The molecular weight of the fluorine-containing hydrocarbon structure is preferably 500 to 100000, more preferably 1000 to 80000, and even more preferably 2000 to 50000. In the case of a constituent unit containing a fluorine-containing hydrocarbon, the adjustment of the molecular weight of the fluorine-containing hydrocarbon structure is easily performed by changing the degree of polymerization of the fluorine-containing vinyl monomer, which is preferable. Examples of the fluorine-containing vinyl monomers may include fluoroolefins (for example, fluoroethylene, vinylidene fluoride, tetrafluoroethylene, perfluoro octyl ethylene, hexafluoropropylene, and the like), partially or completely fluorinated alkyl ester derivatives of (meth)acrylate (for example, Viscoat 6FM (manufactured by Osaka Organic Chemical), M-2020 (manufactured by Daikin), or the like), partially or completely fluorinated vinyl ethers, and the like.

In the (A) component, the fluorine-containing hydrocarbon structure may be single, or a plurality of types may be mixed.

It is preferable that the (A) component further have a polysiloxane structure in the molecule.

It is preferable that the (A) component contain a polymerizable functional group in the molecule. The polymerizable functional group refers to a cross-linking group, and a group having a reactive unsaturated double bond, or a ring-opening polymerization reactive group is preferable.

Preferable Embodiment of Synthesis Method of (A) Component

Detailed description will be given of a preferable embodiment of a synthesis method of the (A) component.

Preferable embodiments of a synthesis method of the (A) component in the present invention include the following (A-1) to (A-5).

(A-1): A synthesis method reacting a polymerizable polyalkylene oxide compound (T) containing unsaturated double bonds and a polymerizable compound (U) containing unsaturated double bonds having a fluorine-containing hydrocarbon structure.

(A-2): A synthesis method reacting a polymerizable basic compound (Z) containing unsaturated double bonds and a polymerizable compound (U) containing unsaturated double bonds having a fluorine-containing hydrocarbon structure.

(A-3): A synthesis method grafting a prepolymer (V) containing unsaturated double bonds containing constituent units derived from the polymerizable basic compound (Z) containing unsaturated double bonds, to a polymerizable compound (U) containing unsaturated double bonds having a fluorine-containing hydrocarbon structure.

(A-4): A synthesis method grafting a prepolymer (W) having a fluorine-containing hydrocarbon structure and a carboxyl group at the end and a basic compound (X) through a polyfunctional epoxy compound (Y).

(A-5): A synthesis method reacting a polymerizable polyalkylene oxide compound (T) containing unsaturated double bonds, a polymerizable basic compound (Z) containing unsaturated double bonds, and a polymerizable compound (U) containing unsaturated double bonds having a fluorine-containing hydrocarbon structure.

As a preferable embodiment in the present invention, by the interaction of a polyalkylene oxide group or a basic functional group included in the fluorine-containing polymer of the (A) component with the low refractive index inorganic fine particles of (B) component to be described later, and coating the surface of the low refractive index inorganic fine particles of (B) component using a fluorine-containing polymer of the (A) component, the surface energy of the low refractive index inorganic fine particles coated on the surface is decreased and the low refractive index inorganic fine particles are controlled so as to be spontaneously distributed in the coating film.

Here, since the interaction of the fluorine-containing polymer of the (A) component and the low refractive index inorganic fine particles of the (B) component is a hydrogen bond of the polyalkylene oxide group or the basic functional group of the (A) component and a hydroxyl group generally present in the surface of the low refractive index inorganic fine particles, a common bond is not formed between the (A) component and (B) component before the process of forming the curable layer by curing the coating composition in the present invention.

In addition, before preparation of the coating composition, it is preferable that the (A) component and the (B) component be mixed (interact) in advance.

The fluorine-containing polymer is preferably a fluorine-containing polymer represented by the following general formula (1).

$$(MF1)a\text{-}(MF2)b\text{-}(MF3)c\text{-}(MA)d\text{-}(MB)e\text{-}(MC)f\text{-}(MD)g \qquad \text{General Formula (1):}$$

In general formula (1), a to f respectively represent the molar fraction of each constituent unit with respect to all the constituent units configuring the fluorine-containing polymer, g represents the mass ratio with respect to the whole fluorine-containing polymer, and a relationship of $0\% \leq a \leq 70\%$, $0\% \leq b \leq 70\%$, $0\% \leq c \leq 80\%$, $30\% \leq a+b+c \leq 90\%$, $0\% \leq d \leq 50\%$, $0\% \leq e \leq 50\%$, $0.1\% \leq f \leq 50\%$, and 0 mass $\% \leq g \leq 15$ mass % is satisfied.

(MF1): indicates a constituent unit derived from a monomer represented by $CF_2\!=\!CF\text{---}Rf_1$. $Rf_1$ represents a perfluoroalkyl group having 1 to 5 carbon atoms.

(MF2): indicates a constituent unit derived from a monomer represented by $CF_2\!=\!CF\text{---}ORf_{12}$. $Rf_{12}$ represents a fluorine-containing alkyl group having 1 to 30 carbon atoms.

(MF3): indicates a constituent unit derived from a monomer represented by $CH_2\!=\!CR_0\text{-}L\text{-}Rf_{13}$. $R_0$ represents a hydrogen atom, a halogen atom, or a methyl group, L represents a divalent linking group, and $Rf_{13}$ represents a fluorine-containing alkyl group having 1 to 30 carbon atoms.

(MA): represents a constituent unit having at least one cross-linking group.

(MB): represents a constituent unit having at least one non-cross-linking group.

(MC): represents a constituent unit derived from a compound having at least one group selected from a polyalkylene oxide group and a basic functional group.

(MD): represents a constituent unit having at least one polysiloxane structure.

In a case where there is more than one of (MF1), (MF2), (MF3), (MA), (MB), (MC), and (MD), they may respectively be the same or different.

The fluorine-containing polymer represented by the general formula (1) may be a random copolymer, a block copolymer, or a graft copolymer.

Description will be given of (MC) of the general formula (1).

(MC) of the general formula (1) represents a constituent unit derived from a compound having at least one group selected from a polyalkylene oxide group or a basic functional group.

<Fluorine-Containing Polymer Having a Constituent Unit Derived from a Compound Having a Polyalkylene Oxide Group>

First, description will be given of the constituent unit derived from a compound having a polyalkylene oxide group as one form of (MC) in the general formula (1).

As the compound having a polyalkylene oxide group (polyalkylene oxide compound), as described above, a polymerizable polyalkylene oxide compound (T) having an unsaturated double bond is preferable and a compound represented by the following general formula (2) is preferable.

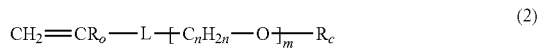

(2)

In the formula, $R_O$ represents a hydrogen atom, a halogen atom, or a methyl group, L represents a divalent linking group, Rc represents a hydrogen atom or an alkyl group having 1 to 10 carbon atoms, m represents a positive integer and $2 \leq m \leq 50$, and n represents a positive integer and $1 \leq n \leq 5$. Here, when m is two or more, a plurality of $—C_nH_{2n}—O—$ may be different repeating units, respectively.

In order that the interaction with the low refractive index inorganic fine particles is sufficient and that the solubility in the solvent for preparing the coating composition is set to be sufficient, n is preferably $2 \leq n \leq 4$ and more preferably $2 \leq n \leq 3$. In addition, m is preferably $3 \leq m \leq 20$ and more preferably $5 \leq m \leq 10$.

From the viewpoint of interaction with the low refractive index inorganic fine particles, L in the general formula (2), is preferably a divalent linking group having 1 to 9 carbon atoms, more preferably a divalent linking group having 1 to 7 carbon atoms, and even more preferably a divalent linking group having 1 to 5 carbon atoms. Examples of L include —COO—, —CO—, —O—, —CONH—, —CO—S—, —COO—(CH₂)u-, —CO—(CH₂)u-, —O—(CH₂)u-, —CONH—(CH₂)u-, —CO—S—(CH₂)u- (u is an integer of 8 or less), and —COO— is most preferable.

The polymerizable polyalkylene oxide compound having unsaturated double bonds is a polymerizable compound having unsaturated double bonds and preferable examples thereof include compounds having a polyalkylene oxide side chain, for example, a methoxy polyethylene glycol(meth)acrylate, (methoxy polyethylene glycol)(meth)acrylamide, methoxy poly(propylene-block-ethylene)glycol(meth)acrylate, (methoxy poly(propylene-block-ethylene)glycol)(meth)acrylamide, ethoxy polyethylene glycol(meth)acrylate, (ethoxy polyethylene glycol)(meth)acrylamide, ethoxy poly(propylene-block-ethylene)glycol(meth)acrylate, and (ethoxy poly(propylene-block-ethylene)glycol)(meth)acrylamide. In particular, methoxy polyalkylene glycol(meth)acrylate is preferable. Here, the (meth)acrylate represents acrylate and methacrylate.

It is advantageous to set the total length of the polyalkylene oxide side chains in order that the number average molecular weight of the side chain is 30 to 4300 g/mol, preferably 132 to 1440 g/mol, and more preferably 220 to 580 g/mol.

Among these compounds, those having a number average molecular weight from 100 to 4500 are preferable, more preferably 200 to 1600, and even more preferably 300 to 700, and methoxy polyalkylene glycol acrylate and methacrylate having a polyalkylene oxide side chain in these molecular weight ranges are particularly preferable. Specific examples include BLEMMER PE-20, PE-200, PE-350, PME-100, PME-200, PME-400, AE-350 (the above are manufactured by NOF Corporation), MA-30, MA-50, MA-100, MA-150, RA-1120, RA-2314, RMA-564, RMA-568, RMA-1114, MPG130-MA (the above are manufactured by Nippon Nyukazai Ltd.), and the like. Furthermore, a commercially available hydroxy poly(oxyalkylene) material can also be manufactured by reacting, for example, those sold as trade name "Pluronic" [Pluronic (manufactured by Asahi Denka Co., Ltd.), Adeka polyether (manufactured by Asahi Denka Co., Ltd.) "Carbowax [Carbowax (Glico Products)], "Triton" [Triton (Rohm and Haas (manufactured by Rohm and Haas)) and P.E.G. (manufactured by Dai-ichi Kogyo Seiyaku), with acrylic acid, methacrylic acid, acrylic chloride, methacrylic chloride, acrylic acid anhydride, or the like using a well-known method. Here, the monomers exemplified above can be used alone or in a combination of two types or more.

Examples of the polyalkylene oxide compound having a polymerizable unsaturated double bond have been given; however, the invention is not limited thereto. Repeating units of alkylene oxide groups in the compounds represent an integer closest to the average value of the average mass.

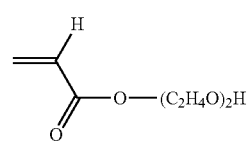

A-1

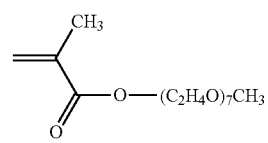

A-2

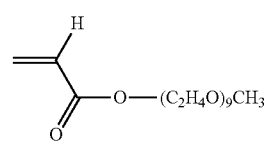

A-3

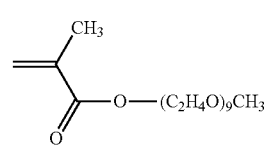

A-4

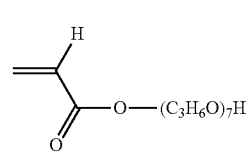

A-5

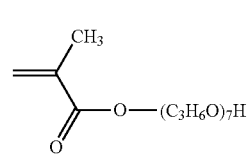

A-6

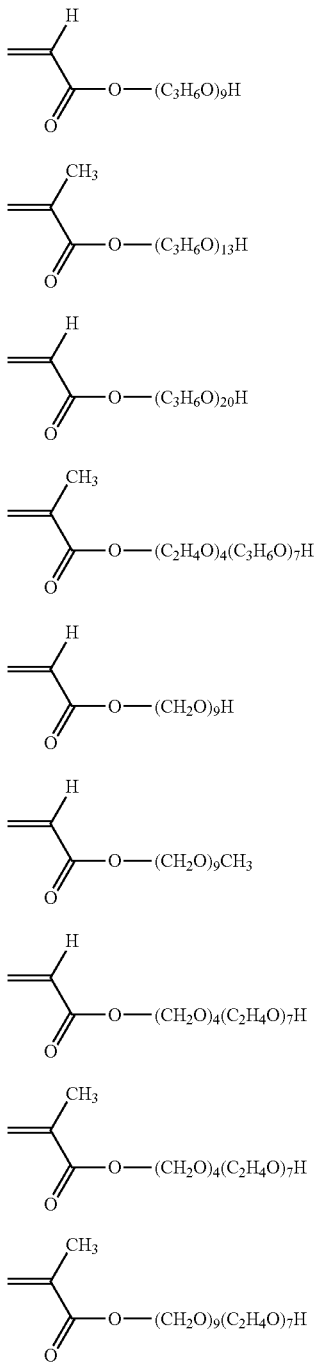

Description will be given of (MF1) to (MF3) of the general formula (1).

(MF1) to (MF3) are constituent units derived from monomers represented by the following general formulas (1-1), (1-2) or (1-3). The monomers represented by the following general formulas (1-1), (1-2) or (1-3) are equivalent to a polymerizable compound (U) containing unsaturated double bonds having the above-described fluorine-containing hydrocarbon structure.

(MF1) is a constituent unit derived from a monomer represented by the following general formula (1-1).

$$CF_2=CF-Rf_1 \qquad \text{General formula (1-1)}$$

In the formula, $Rf_1$ represents a perfluoroalkyl group having 1 to 5 carbon atoms.

As the compound represented by the general formula (1-1), from the viewpoint of polymerization reactivity, perfluoropropylene or perfluorobutylene are preferable and perfluoropropylene is particularly preferable from the viewpoint of availability.

(MF2) is a constituent unit derived from a monomer represented by the following general formula (1-2).

$$CF_2=CF-ORf_{12} \qquad \text{General formula (1-2)}$$

In the formula, $Rf_{12}$ represents a fluorine-containing alkyl group having 1 to 30 carbon atoms. The fluorine-containing alkyl group may have a substituent. Furthermore, $Rf_{12}$ may be one having an ether bond between carbon atoms.

$Rf_{12}$ is preferably a fluorine-containing alkyl group having 1 to 20 carbon atoms and more preferably 1 to 10 carbon atoms, and is even more preferably a perfluoroalkyl group having 1 to 10 carbon atoms. Specific examples of $Rf_{12}$ include those listed below or the like but are not limited thereto.

$$-CF_3, -CF_2CF_3, -CF_2CF_2CF_3, -CF_2CF(OCF_2CF_2CF_3)CF_3$$

(MF3) represents a constituent unit derived from a monomer represented by the following general formula (1-3).

$$CH_2=CR_0\text{-}L\text{-}Rf_{13} \qquad \text{Formula (1-3)}$$

In the formula, $R_0$ represents a hydrogen atom, a halogen atom or a methyl group, L represents a divalent linking group, and $Rf_{13}$ represents a fluorine-containing alkyl group having 1 to 30 carbon atoms.

$Rf_{13}$ is preferably a fluorine-containing alkyl group having 1 to 15 carbon atoms, and may have a straight chain (for example, $-CF_2CF_3$, $-CH_2(CF_2)_4H$, $-CH_2(CF_2)_8CF_3$, $-CH_2CH_2(CF_2)_4H$, and the like), a branched structure (for example, $-CH(CF_3)_2$, $-CH_2CF(CF_3)_2$, $-CH(CH_3)CF_2CF_3$, $-CH(CH_3)(CF_2)_5CF_2H$, and the like), or an alicyclic structure (preferably a 5 or 6 membered ring, for example, a perfluorocyclohexyl group, a perfluorocyclopentyl group, an alkyl group substituted with these, or the like).

In addition, $Rf_{13}$ may have a substituent, and may have an ether bond between carbon atoms. $Rf_{13}$, for example, may be $-CH_2OCH_2CF_2CF_3$, $-CH_2CH_2OCH_2(CF_2)_bH$, $-CH_2CH_2OCH_2(CF_2)_bF$ (b: integer of 2-12), $-CH_2CH_2OCF_2CF_2OCF_2CF_2H$, or the like.

L in the general formula (1-3) is not particularly limited; however, $-COO-$, $-CONH-$, and $-CO-S-$ are preferable.

As MF3, the use of constituent units derived from a monomer represented by the following general formula (1-3-1) or (1-3-2) is preferable.

$$CH_2=CR_0\text{-}L\text{-}(CH_2)_{n1}(CF_2)_{n2}H \qquad (1\text{-}3\text{-}1)$$

(In the formula, $R_0$ represents a hydrogen atom, a halogen atom, or a methyl group, L represents a divalent linking group, n1 is 0 or a positive integer and $0 \leq n1 \leq 20$, and n2 is a positive integer and $1 \leq n2 \leq 30$.)

$$CH_2=CR_0\text{-}L\text{-}(CH_2)_{n3}(CF_2)_{n4}F \qquad (1\text{-}3\text{-}2)$$

(In the formula, $R_0$ represents a hydrogen atom, a halogen atom, or a methyl group, L represents a divalent linking group, n3 is 0 or a positive integer and $0 \leq n3 \leq 20$, and n4 is a positive integer and $1 \leq n4 \leq 30$.)

Specific examples of the monomer represented by the above-described general formulas (1-3-1) or (1-3-2) have been given; however, the invention is not limited thereto.

Furthermore, those disclosed in, for example, paragraphs [0025] to [0033] of JP2007-298974A can also be used as the monomer represented by the general formula (1-3).

$$CH_2=CR_0\text{-L-}(CH_2)_{n1}(CF_2)_{n2}H \qquad (1\text{-}3\text{-}1)$$

|  | $R_0$ | L | $n_1$ | $n_2$ |
|---|---|---|---|---|
| MF3-1 | H | COO | 1 | 4 |
| MF3-2 | CH3 | COO | 1 | 4 |
| MF3-3 | H | COO | 1 | 6 |
| MF3-4 | CH3 | COO | 1 | 6 |
| MF3-5 | H | COO | 1 | 8 |
| MF3-6 | CH3 | COO | 1 | 8 |
| MF3-7 | H | COO | 1 | 10 |
| MF3-8 | CH3 | COO | 1 | 10 |
| MF3-9 | H | COO | 1 | 12 |
| MF3-10 | CH3 | COO | 1 | 12 |
| MF3-11 | H | COO | 1 | 14 |
| MF3-12 | CH3 | COO | 1 | 14 |
| MF3-13 | H | COO | 1 | 16 |
| MF3-14 | CH3 | COO | 1 | 16 |
| MF3-15 | H | COO | 1 | 18 |
| MF3-16 | CH3 | COO | 1 | 18 |
| MF3-17 | H | COO | 2 | 8 |
| MF3-18 | CH3 | COO | 2 | 8 |
| MF3-19 | CH3 | COO | 3 | 8 |
| MF3-20 | F | COO | 1 | 8 |
| MF3-21 | H | CONH | 1 | 8 |
| MF3-22 | CH3 | CONH | 1 | 8 |
| MF3-23 | H | CO—S— | 1 | 8 |
| MF3-24 | CH3 | CO—S— | 1 | 8 |

$$CH_2=CR_0\text{-L-}(CH_2)_{n3}(CF_2)_{n4}F \qquad (1\text{-}3\text{-}2)$$

|  | $R_0$ | L | $n_3$ | $n_4$ |
|---|---|---|---|---|
| MF3-25 | H | COO | 1 | 4 |
| MF3-26 | CH3 | COO | 1 | 4 |
| MF3-27 | H | COO | 1 | 7 |
| MF3-28 | CH3 | COO | 1 | 7 |
| MF3-29 | H | COO | 1 | 10 |
| MF3-30 | CH3 | COO | 1 | 10 |
| MF3-31 | H | COO | 2 | 8 |
| MF3-32 | CH3 | COO | 2 | 8 |
| MF3-33 | H | CONH | 2 | 4 |
| MF3-34 | CH3 | CONH | 2 | 4 |
| MF3-35 | H | CONH | 2 | 6 |
| MF3-36 | CH3 | CONH | 2 | 6 |
| MF3-37 | H | CO—S— | 2 | 6 |
| MF3-38 | CH3 | CO—S— | 2 | 6 |

Description will be given of (MA) of the general formula (1).

(MA) of the general formula (1) represents a constituent unit having at least one cross-linking group. The cross-linking group is a group having cross-linking sites (reactive sites that may be involved in a cross-linking reaction), and, in terms of improving the strength of the coating film formed using the coating composition of the present invention, the fluorine-containing polymer which is the (A) component preferably includes a repeating unit (MA) having a cross-linking site in the polymer molecule.

Examples of the cross-linking sites include, for instance, a silyl group having a hydroxyl group or a hydrolyzable group (for example, an alkoxysilyl group, an acyloxysilyl group, or the like), a group having reactive unsaturated double bonds sites (a (meth)acryloyl group, an allyl group, a vinyloxy group, or the like), a ring-opening polymerization reactive group (an epoxy group, an oxetanyl group, an oxazolyl group, or the like), a group having an active hydrogen atom (for example, a hydroxyl group, a carboxyl group, an amino group, a carbamoyl group, a mercapto group, β-ketoester group, a hydrosilyl group, a silanol group, or the like), a group (active halogen atom, sulfonic acid ester, or the like) which may be substituted using an acid anhydride or a nucleophilic agent.

The cross-linking group of (MA) is preferably a group having a reactive unsaturated double bond or a ring-opening polymerization reactive group, and more preferably a group having a reactive unsaturated double bond.

Below, preferable specific examples of the constituent units represented by (MA) in the above-described general formula (1) are shown; however, the invention is not limited thereto.

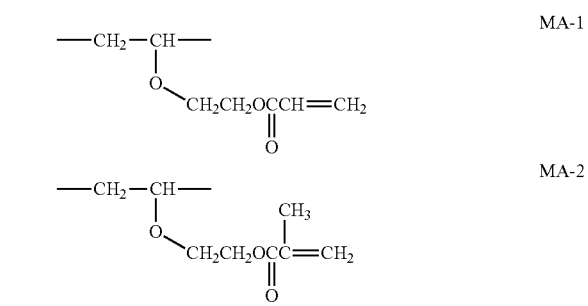

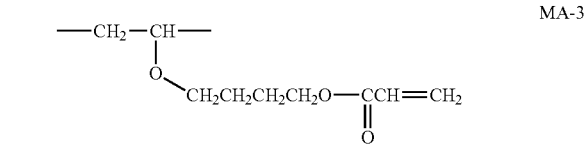

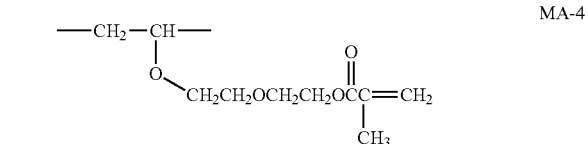

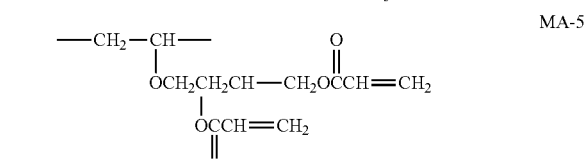

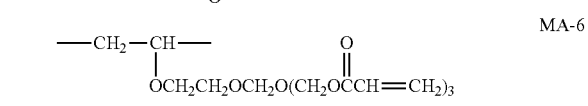

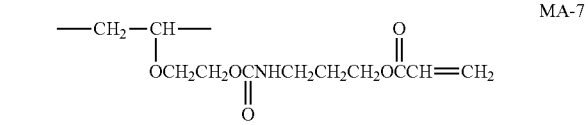

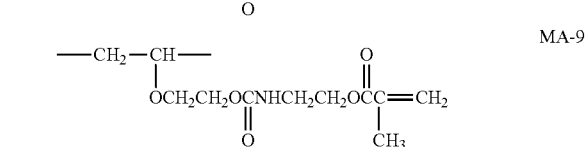

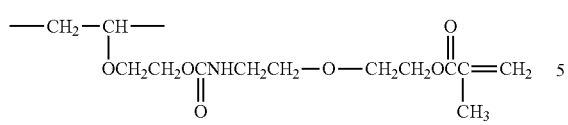
MA-10

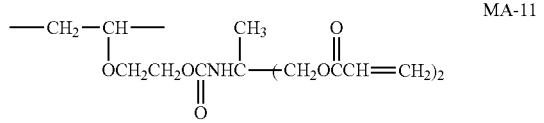
MA-11

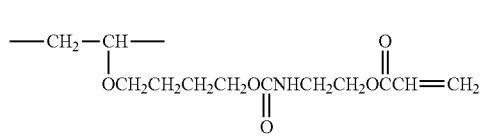
MA-12

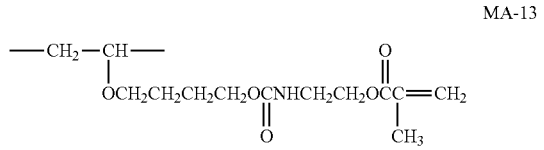
MA-13

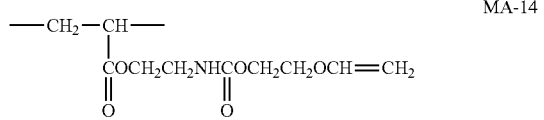
MA-14

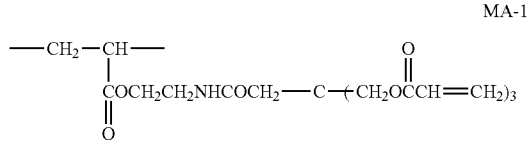
MA-15

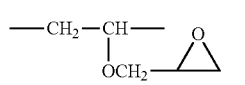
MA-16

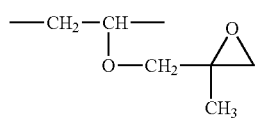
MA-17

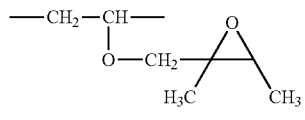
MA-18

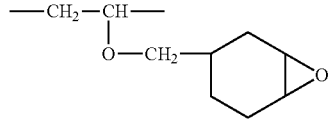
MA-19

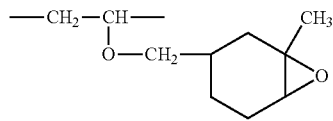
MA-20

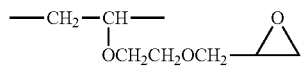
MA-21

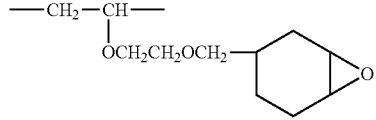
MA-22

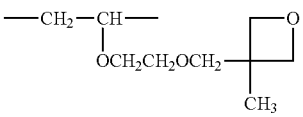
MA-23

Description will be given of (MB) of the general formula (1).

(MB) in the general formula (1) represents a constituent unit having at least one non-cross-linking group. Due to a dehydration condensation reaction or a hydrolysis reaction, there are times where the (MA) forms a three-dimensional network structure and has an adverse influence such as gelling or generating foreign material or the like in the coating composition liquid or during the forming of the coating film. In order to prevent this, (MB) can be appropriately selected from the viewpoints of stability of the coating composition, solubility in a solvent, affinity with low refractive index inorganic fine particles, dispersion stability of the low refractive index inorganic fine particles, and the like.

Examples of the monomer for forming (MB) include, for instance, vinyl ethers such as methyl vinyl ether, ethyl vinyl ether, n-butyl vinyl ether, cyclo hexyl vinyl ether, and isopropyl vinyl ether; vinyl esters such as vinyl acetate, vinyl propionate, vinyl butyrate, and vinyl cyclo hexane carboxylate; and (meth)acrylate esters such as methylmethacrylate, and ethylmethacrylate; and the like.

Description will be given of (MD) of the general formula (1).

(MD) in the general formula (1) represents a constituent unit having at least one polysiloxane structure. Since the upper portion distribution of the low refractive index inorganic fine particles in the present invention can be increased and the low refractive index inorganic fine particles remaining in small amounts in the lower layer caused by surface defects can also be reduced by including the polysiloxane structure as (MD), it is preferable to have a constituent unit having at least one polysiloxane structure.

That is, the (A) component preferably contains both fluorine-containing hydrocarbon units and polysiloxane units in the molecule, more specifically, (MD) preferably includes polysiloxane repeating units represented by the following general formula (20) in the main chain or the side chain.

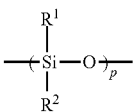
General formula (20)

In the formula, $R^1$ and $R^2$ each independently represent an alkyl group or an aryl group.

The alkyl group preferably has 1 to 4 carbon atoms and may be substituted. Specifically, examples thereof include a methyl group, a trifluoromethyl group, an ethyl group, and the like.

The aryl group preferably has 6 to 20 carbon atoms and may be substituted. Specifically, examples thereof include a phenyl group, a naphthyl group, and the like.

$R^1$ and $R^2$ are preferably a methyl group or a phenyl group, and more preferably methyl groups.

p is the number of constituent units and represents an integer of 2 to 500, preferably 5 to 350, and more preferably 8 to 250.

Polymers having a polysiloxane structure represented by the general formula (20) in the side chain can be synthesized using a method of introducing polysiloxane (for example, the Silaplane series manufactured by Chisso Corporation, or the like) having an opposing reactive group (for example, an epoxy group, an amino group with respect to an acid anhydride group, a mercapto group, a carboxyl group, a hydroxyl group) at one end using a polymer reaction, or a method of polymerizing a polysiloxane-containing micromer, with respect to polymers having a reactive group such as an epoxy group, a hydroxyl group, a carboxyl group, and an acid anhydride group, for example, as described in J. Appl. Polym. Sci. 2000, 78, 1955, JP1981-28219A (JP-S56-28219A), and the like.

Regarding synthesizing methods of the polymers having a polysiloxane structure in the main chain, for example, methods using a polymer-type initiator such as an azo group-containing polysiloxane amide (as commercially available ones, for example, VPS-0501, 1001, manufactured by Wako Pure Chemical Industries, Ltd.) described in JP-1994-93100A (JP-H06-93100A), or methods of introducing a reactive group (for example, a mercapto group, a carboxyl group, a hydroxyl group, or the like) derived from a polymerization initiator or a chain transfer agent to a polymer end and then causing a reaction with polysiloxane containing a reactive group at one end or both ends (for example, an epoxy group, an isocyanate group, or the like), include methods such as copolymerizing a cyclic siloxane oligomer such as hexamethylcyclotrisiloxane with anionic ring-opening polymerization. Among these, a method using an initiator having a polysiloxane partial structure is easy and therefore preferable.

Description will be given of a to g of the general formula (1).

In the general formula (1), a to f respectively represent the molar fraction of each constituent unit with respect to all the constituent units configuring the fluorine-containing polymer, g represents the mass ratio with respect to the whole fluorine-containing polymer, and a relationship of $0\% \leq a \leq 70\%$, $0\% \leq b \leq 70\%$, $0\% \leq c \leq 80\%$, $30\% \leq a+b+c \leq 90\%$, $0\% \leq d \leq 50\%$, $0\% \leq e \leq 50\%$, $0.1\% \leq f \leq 50\%$, and 0 mass % $\leq g \leq 15$ mass % is satisfied.

By increasing a+b+c which is the molar fraction of (MF1) component, (MF2) component, and (MF3) component, the surface free energy of the polymer is decreased and the low refractive index inorganic fine particles modified by the polymer are easily distributed to the upper portion; however, in terms of the adsorption to the low refractive index inorganic fine particles, the solubility in general-purpose solvents, and the like, $30\% \leq a+b+c \leq 90\%$ is preferable and $40\% \leq a+b+c \leq 80\%$ is more preferable.

The constituent units derived from a compound having a polyalkylene oxide group represented by (MC) preferably have a molar fraction in the range of $0.1\% \leq f \leq 50\%$, more preferably $0.5\% \leq f \leq 40\%$, and even more preferably $1\% \leq f \leq 30\%$, from the viewpoints of the polymer having sufficient coatability to the low refractive index inorganic fine particles and being able to ensure the amount of the fluorine-containing component required for distribution of the low refractive index inorganic fine particles in the upper portion. Furthermore, in a case where the solubility in the coating solvent due to the monomer composition of the fluorine-containing copolymer during the forming of the copolymer is sufficiently high, the proportion of the monomer having the polyalkylene oxide group can be increased, and can be preferably set to $6\% \leq f \leq 40\%$.

The constituent unit having a cross-linking group represented by (MA) is preferably introduced to the polymer from the viewpoint of increasing the hardness of the coating film. In particular, in the present invention, the molar fraction of the (MA) component is preferably in the range of $0\% \leq d \leq 50\%$, more preferably in the range of $5\% \leq d \leq 40\%$, and particularly preferably in the range of $5\% \leq d \leq 30\%$.

The molar fraction e of the constituent unit having at least one non-cross-linking group represented by (MB) is preferably in the range of $0\% \leq e \leq 50\%$, more preferably in the range of $0\% \leq e \leq 20\%$, and even more preferably in the range of $0\% \leq e \leq 10\%$.

Regarding the constituent unit having at least one polysiloxane structure represented by (MD), the introduction of a polysiloxane structure is preferable from the viewpoint of the distribution of the low refractive index inorganic fine particles in the upper portion and the coating film surface defects. The content ratio of the polysiloxane structure in the fluorine-containing polymer is preferably 0.5 mass % $\leq g \leq 15$ mass %, and more preferably 1 mass % $\leq g \leq 10$ mass %.

Below, specific examples of the fluorine-containing polymer represented by the general formula (1) which is the (A) component of the present invention are shown; however, the invention is not limited thereto. Here, in Table 1, the specific examples are shown as combinations of monomers (MF1), (MF2) and (MF3) forming the fluorine-containing constituent units of the general formula (1) by being polymerized, and the structural units (MC), (MA), (MB), and (MD). In the Table, a to f represent the mole ratio (%) of the monomer for each component. In the Table, the description of wt % for the (MD) Component shows the mass % of the component in the whole polymer.

TABLE 1

|  | (MF-1) | (MF-2) | (MF-3) | (MC) | (MA) | (MB) | MD | a | b | c | f | d | e | g | (Mw) |
|---|---|---|---|---|---|---|---|---|---|---|---|---|---|---|---|
| IPF-1 | HFP | — | — | A-3 | — | EVE |  | 50 | — | — | 5 | — | 48 |  | 2.2 |
| IPF-2 | HFP | — | — | A-3 | (MA-8) | EVE |  | 50 | — | — | 5 | 25 | 20 |  | 2.3 |
| IPF-3 | HFP | — | — | A-3 | (MA-8) | EVE | VPS-1001 | 50 | — | — | 5 | 25 | 20 | 2 wt % | 2.4 |
| IPF-4 | HFP | FPVE | — | A-3 | (MA-8) | EVE | VPS-1001 | 45 | 5 | — | 5 | 25 | 20 | 2 wt % | 2.3 |
| IPF-5 | HFP | FPVE | MF3-3 | A-3 | (MA-8) | EVE |  | 45 | 5 | 5 | 5 | 25 | 15 |  | 2.2 |
| IPF-6 | HFP | — | — | A-3 | (MA-8) | EVE | FM-0721 | 50 | — | — | 5 | 25 | 20 | 2 wt % | 2.3 |
| IPF-7 | HFP | — | — | A-3 | (MA-12) | EVE | FM-0721 | 50 | — | — | 5 | 25 | 20 | 3 wt % | 2.5 |
| IPF-8 | HFP | FPVE | — | A-3 | (MA-12) | EVE | FM-0721 | 45 | 5 | — | 5 | 25 | 20 | 2 wt % | 2.4 |
| IPF-9 | HFP | — | — | A-5 | (MA-8) | EVE | VPS-1001 | 50 | — | — | 5 | 25 | 20 | 2 wt % | 2.6 |
| IPF-10 | HFP | FPVE | — | A-5 | (MA-8) | EVE | VPS-1001 | 45 | 5 | — | 5 | 25 | 20 | 2 wt % | 2.7 |
| IPF-11 | — | — | MF3-3 | A-3 | — | — |  | — | — | 60 | 40 | — | — |  | 1.3 |
| IPF-12 | — | — | MF3-3 | A-3 | — | — |  | — | — | 80 | 20 | — | — |  | 2.4 |
| IPF-13 | — | — | MF3-3 | A-3 | — | EVE | — | — | — | 60 | 20 | — | 20 |  | 1.8 |
| IPF-14 | — | — | MF3-3 | A-3 | — | EVE | — | — | — | 60 | 10 | — | 30 |  | 1.9 |
| IPF-15 | — | — | MF3-3 | A-8 | — | EVE | VPS-1001 | — | — | 60 | 10 | — | 30 | 2 wt % | 2.3 |
| IPF-16 | — | — | MF3-3 | A-4 | — | EVE | FM-0721 | — | — | 60 | 10 | — | 30 | 2 wt % | 2.3 |

TABLE 1-continued

| | (MF-1) | (MF-2) | (MF-3) | (MC) | (MA) | (MB) | MD | a | b | c | f | d | e | g | (Mw) |
|---|---|---|---|---|---|---|---|---|---|---|---|---|---|---|---|
| IPF-17 | — | — | MF3-3 | A-4 | — | EVE | FM-0721 | — | — | 60 | 10 | — | 30 | 2 wt % | 2.3 |
| IPF-18 | — | — | MF3-3 | A-4 | — | EVE | FM-0721 | — | — | 60 | 10 | — | 30 | 2 wt % | 2.4 |
| IPF-19 | — | — | MF3-3 | A-4 | — | EVE | — | — | — | 60 | 8 | — | 32 | | 2.1 |
| IPF-20 | — | — | MF3-3 | A-4 | (MA-15) | EVE | — | — | — | 60 | 8 | 12 | 20 | | 2.0 |
| IPF-21 | — | — | MF3-3 | A-4 | (MA-15) | EVE | VPS-1001 | — | — | 60 | 8 | 12 | 20 | 2 wt % | 2.5 |
| IPF-22 | — | — | MF3-3 | A-4 | (MA-15) | EVE | FM-0721 | — | — | 60 | 8 | 12 | 20 | 2 wt % | 2.2 |
| IPF-23 | — | — | MF3-3 | A-4 | (MA-14) | EVE | VPS-1001 | — | — | 60 | 8 | 12 | 20 | 2 wt % | 2.3 |
| IPF-24 | — | FPVE | MF3-3 | A-4 | (MA-15) | EVE | VPS-1001 | — | 5 | 55 | 8 | 22 | 20 | 2 wt % | 2.3 |
| IPF-25 | — | — | MF3-3 | A-3 | (MA-21) | EVE | FM-0721 | — | — | 60 | 8 | 22 | 10 | 2 wt % | 2.6 |
| IPF-26 | — | — | MF3-3 | A-3 | (MA-22) | EVE | FM-0721 | — | — | 60 | 8 | 22 | 10 | 2 wt % | 2.5 |
| IPF-27 | — | — | MF3-3 | A-10 | (MA-21) | EVE | FM-0721 | — | — | 60 | 8 | 22 | 10 | 2 wt % | 2.1 |
| IPF-28 | — | — | MF3-6 | A-3 | (MA-8) | EVE | — | — | — | 60 | 10 | 10 | 20 | | 1.8 |
| IPF-29 | — | — | MF3-6 | A-3 | (MA-8) | EVE | — | — | — | 60 | 10 | 10 | 20 | | 1.9 |
| IPF-30 | — | — | MF3-6 | A-8 | (MA-8) | EVE | VPS-1001 | — | — | 60 | 10 | 10 | 20 | 2 wt % | 2.3 |
| IPF-31 | — | — | MF3-6 | A-4 | (MA-8) | EVE | FM-0721 | — | — | 60 | 10 | 10 | 20 | 2 wt % | 2.3 |
| IPF-34 | HFP | FPVE | MF3-6 | A-4 | (MA-1) | EVE | FM-0721 | 50 | 5 | 5 | 10 | 10 | 20 | | 2.3 |
| IPF-35 | HFP | FPVE | MF3-3 | A-4 | (MA-1) | EVE | VPS-1001 | 50 | 5 | 5 | 10 | 10 | 20 | 2 wt % | 2.2 |
| IPF-36 | HFP | — | — | A-4 | (MA-1) | EVE | — | 50 | — | — | 10 | 10 | 30 | | 2.4 |

(Mw) represents a weight average molecular weight.
(Value in ten thousands)
The abbreviations in the above Table represent the following.
(MF1) Component
HFP: Hexafluoropropylene
(MF2) Component
FPVE: Perfluoropropyl vinyl ether
(MB) Component
EVE: Ethyl vinyl ether
(MD) Component
VPS-1001: Azo group-containing polydimethylsiloxane, molecular weight of polysiloxane moiety: about 10,000, manufactured by Wako Pure Chemical Industries, Ltd.
FM-0721: Dimethylsiloxane modified with methacryloyl at one end, average molecular weight: 5,000, manufactured by Chisso Corporation.

The mass average molecular weight of the fluorine-containing polymer having a constituent unit derived from a compound having a polyalkylene oxide group is preferably from 1,000 to 100,000, more preferably from 2,000 to 50,000, and even more preferably from 3,000 to 30,000.

Here, the mass average molecular weight is a molecular weight which is expressed in conversion of polystyrene obtained using a solvent THF and differential refractometer detection with a GPC analyzer using columns of TSKgel GMHxL, TSKgel G4000HxL and TSKgel G2000HxL (all trade names, manufactured by Tosoh Corp.).

The fluorine-containing polymer having a constituent unit derived from a compound having a polyalkylene oxide group can be manufactured with a commonly used method. In particular, synthesizing using the synthesis method (A-1) is preferable. That is, manufacturing can be performed by polymerizing a polymerizable polyalkylene oxide compound (T) containing unsaturated double bonds and a polymerizable compound (U) containing unsaturated double bonds having a fluorine-containing hydrocarbon structure in an organic solvent by adding a general-purpose radical polymerization initiator thereto. Alternatively, depending on the case, manufacturing can be performed with the same method as described above with the addition of an addition-polymerizable unsaturated compound. According to the polymerizability of each monomer, a dropping polymerization method or the like performing polymerization whilst dropping a monomer and an initiator in a reaction container may also be effective for obtaining a polymer of uniform composition.

<Fluorine-Containing Polymer Having a Constituent Unit Derived from a Compound Having a Basic Functional Group>

Next, description will be given of an embodiment having a basic functional group which is one embodiment of the fluorine-containing polymer.

Examples of the basic functional group include an amino group, a quaternary ammonium group, an amide group, a pyridyl group, a triazine group, a pyrryl group, an indolyl group, carbazolyl group, an imidazolyl group, and the like. Among these, an amino group or an amide group is preferable from the viewpoint of interaction with the low refractive index inorganic fine particles.

Description will be given of each component described in the preferable synthesis methods (A2) to (A5) of the fluorine-containing polymer having constituent units derived from a compound having the basic functional group.

[Polymerizable Basic Compound (Z) Containing Unsaturated Double Bonds]

Preferable examples of the basic compound having an unsaturated double bond include the following compounds.

Examples include amino(meth)acrylates: dimethylaminoethyl acrylate, diethylaminoethyl acrylate, dibutylaminoethyl acrylate, dimethylaminoethyl methacrylate, diethylaminoethyl methacrylate, dibutylaminoethyl methacrylate, dimethylaminopropyl acrylate, diethylaminopropyl acrylate, dimethylaminopropyl methacrylate, t-butylaminoethyl acrylate, t-butylaminoethyl methacrylate, amino ethyl acrylate, aminoethyl methacrylate, aminopropyl acrylate, and the like, (meth)acrylamides:

N,N-dimethyl acrylamide, N,N-diethyl acrylamide, N,N-dibutyl acrylamide, N,N-dimethyl methacrylamide, N,N-diethyl methacrylamide, N,N-dibutyl methacrylamide, acryloyl morpholine, N-t-butyl acrylamide, N-t-butyl methacrylamide, N-hydroxyethyl acrylamide, N-(dimethylaminoethyl)acrylamide, N-(diethylaminoethyl)acrylamide, N-(dibutyl amino ethyl)acrylamide, N-(dimethylaminoethyl)methacrylamide, N-(diethylaminoethyl)methacrylamide, N-(dibutyl aminoethyl)methacrylamide, N-(dimethylaminopropyl)acrylamide, N-(diethylaminopropyl)acrylamide, N-(dimethylaminopropyl)methacrylamide, t-butyl amino ethyl acrylamide, t-butyl amino ethyl methacrylamide, and the like.

The above may be used alone, or may be used in combination of two types or more.

Among the above, compounds containing a dialkylamino group or a dialkylamide group are preferable.

[Pre-Polymer (V) Containing Unsaturated Double Bonds Formed of Polymer Component Derived from Basic Monomer]

In the present invention, using a prepolymer containing unsaturated double bonds formed of a polymer component derived from basic monomers, a basic group can be localized and introduced into the (A) component of the present invention. The prepolymer is preferably obtained by bonding a part of a multifunctional basic functional group of a polymer derived from basic monomers with an epoxy group of a compound containing an epoxy group and an unsaturated double bonding group. Examples of the compound containing an epoxy group and an unsaturated double bonding group include glycidyl acrylate, glycidyl methacrylate and 4-hydroxybutyl acrylate glycidyl ether.

As the basic monomer, the use of the polymerizable basic compound containing unsaturated double bonds of the above (Z) is preferable. These basic monomers may be used by mixing a plurality of kinds thereof or may also be copolymerized with other monomers in a range not impairing the effects of the present invention.

The number of basic functional groups in the polymer derived from the basic monomer is preferably 2 to 21, and more preferably 4 to 21. The compound containing an epoxy group and an unsaturated double bonding group is preferably added to and reacted with the basic polymer in a range in which the epoxy group is from 0.1 to 0.5 equivalents with respect to the basic functional group in the polymer. By setting this condition, the unsaturated double bond can be prevented from being excessively introduced into the obtained prepolymer. There is preferably one unsaturated double bond in one molecule of the prepolymer of (V).

[(X) Basic Compound]

By bonding the basic compound (X) to the prepolymer having a (terminal) carboxyl group of the above-described (W) through a polyfunctional epoxy compound, the (A) component of the present invention can be formed. That is, the (A) component of the present invention has a constituent unit derived from a component in which a compound containing a basic functional group is bonded to a polyfunctional ethoxy compound. The basic compounds which can be used in this synthesis method are preferably primary or secondary alkyl amines and can fix a basic amine with a high yield since the reactivity with the epoxy group is high. Examples of the basic compound include alkylamines:

ethylamine, propylamine, butylamine, isobutylamine, hexylamine, diethylamine, dipropyl amine, dibutylamine, dimethylaminoethylamine, diethyl aminoethyl amine, dimethylaminopropylamine, diethylaminopropylamine, 3-methoxypropyl amine, diethylenetriamine, tetraethylenepentamine, or the like;

amino heterocyclic compounds:

N-aminopiperidine, 1-amino-4-methylpiperazine, 2-amino-3-nitropyridine, 2-picolylamine, 3-picolylamine, 2-aminopyridine, 3-aminopyridine, 4-aminopyridine, 2-aminopyrazine, or the like; and heterocyclic compound amines:

triazole, imidazole, morpholine, piperidine, pyrrolidine, 2-pipecoline, 3-pipecoline, 4-pipecoline or the like.

One of these may be used alone, or two or more may be used in combination.

[(Y) Polyfunctional Epoxy Compound]

The polyfunctional epoxy compounds which can be used in preferable embodiments of the present invention are not particularly limited as long as they are a compound having a plurality of epoxy groups in each molecule; however, a (co)polymer of an unsaturated double bond group-containing monomer having a glycidyl group, or a bisphenol A-type, bisphenol F-type, phenol novolak-type or cresol novolak-type epoxy resin is preferable. The above compound is preferably a compound having a molecular weight of 200 to 5,000, and more preferably a molecular weight of 300 to 3,000. The epoxy equivalent is preferably 150 to 500, and more preferably 150 to 300. The number of epoxy groups in each molecule is preferably from 2 to 20, and more preferably from 3 to 15. By setting this range, it is easy to efficiently bond the fluorine-containing hydrocarbon structure or polysiloxane structure and the basic component in the present invention.

As the commercially available epoxy resin EOCN-120, EOCN-102, EOCN-103, EOCN-104, and the like manufactured by Nippon Kayaku Co., Ltd.; and Epoxy Resins 1001, 1002, 806, 807, 152, 154, 157S70, and the like manufactured by Mitsubishi Chemical Corporation, can be used.

[(U) Polymerizable Compound Containing an Unsaturated Double Bond Having a Fluorine-Containing Hydrocarbon Structure]

Examples of the compound of (U) include fluorine-containing hydrocarbon monomers having an unsaturated double bond.

Examples of the fluorine-containing vinyl monomer include fluoroolefins (for example, fluoroethylene, vinylidene fluoride, tetrafluoroethylene, perfluorooctylethylene, hexafluoropropylene, or the like), partially or completely fluorinated alkyl ester derivatives of (meth)acrylic acid (for example, VISCOAT 6FM (manufactured by Osaka Organic Chemical Industry Ltd.), M-2020 (manufactured by Daikin Industries, Ltd.) or the like), partially or completely fluorinated vinyl ethers, and the like. One of the above fluorine-containing hydrocarbon components may be used alone, or a plurality of types may be mixed.

[(W) Prepolymer Having a Fluorine-Containing Hydrocarbon Structure and Having a (Terminal) Carboxyl Group]

In the present invention, a basic group can be introduced into the (A) component of the present invention using a prepolymer having a fluorine-containing hydrocarbon structure and having a (terminal) carboxyl group. This prepolymer can be synthesized by the following method.

During the polymerization of a monomer, by starting the polymerization using a general-purpose azo-nitrile compound or peroxide compound as a polymerization initiator and using a carboxyl group-containing compound, for example, mercaptoacetic acid, as the chain transfer agent, a prepolymer in which a carboxyl group is introduced into the terminal of the formed polymer can be synthesized.

In addition, by starting the polymerization using a carboxyl group-containing initiator, for example, 4,4'-azobis(4-cyanopentanoic acid), a prepolymer in which a carboxyl group is introduced into the terminal of the formed polymer can be synthesized.

In addition, while not limited to introducing at the terminal, the method for introducing a carboxyl group into a polymer having a fluorine-containing hydrocarbon component is a method in which, the carboxyl group-containing monomer is polymerized together with the monomer during the formation of the polymer, using a general-purpose azo-nitrile compound or peroxide compound as the polymerization initiator. Examples of the carboxyl group-containing monomer include acrylic acid, methacrylic acid, maleic acid fumaric acid, and the like.

Among the above three prepolymer synthesis methods, the synthesis method of introducing a carboxyl group into the terminal is preferable since problems such as gelling do not easily occur during the subsequent synthesis of the (A) component.

The molecular weight of the prepolymer synthesized by the above methods is preferably 1,000 to 100,000, and more preferably 2,000 to 50,000.

In addition, according to another synthesis method for the (A) component of the present invention, a compound having a fluorine-containing hydrocarbon component and having an isocyanate group is synthesized, and, by hydrolyzing the isocyanate group of this compound, a primary amino group can be introduced. The method for introducing an isocyanate group is not limited; however, for example, synthesis can be performed by copolymerizing an isocyanate compound having an unsaturated double bond together with a fluorine-containing hydrocarbon component having an unsaturated double bond.

Even in a case where the fluorine-containing polymer having a basic functional group is represented by the general formula (1), (even in a fluorine-containing polymer having a constituent unit having a basic functional group as (MC)), (MF1), (MF2), (MF3), (MA), (MB), (MD), a, b, c, d, e, f, and g are the same as those described in the fluorine-containing polymer having a constituent unit having a polyalkylene oxide group as the above-described (MC).

<Block or Graft Type Fluorine-Containing Polymer Having a Basic Functional Group>

Among the (A) components, controlling the position in the polymer of the basic functional group is easy, and, from the viewpoints of increasing the interaction with the low refractive index inorganic particles of the (B) component and being able to reduce negative effects such as cross-linking aggregation between particles of the (B) component, the fluorine-containing polymer is preferably a block or a graft type polymer having a structure represented by the following general formula (10).

$$[(MF1)a\text{-}(MF2)b\text{-}(MF3)c\text{-}(MA)d\text{-}(MB)e\text{-}(MD)g]j\text{-}[(MC')]k \quad \text{General formula (10)}$$

In the general formula (10), [ ] represents a prepolymer or a linkable structure formed of constituent units of the respective ( )s, and j and k represent the mass ratios (mass %) thereof. $70\% \leq j \leq 99.8\%$ and $0.2\% \leq k \leq 30\%$. a to e respectively represent the molar fraction of each constituent unit with respect to all the constituent units configuring the fluorine-containing polymer, g represents the mass ratio with respect to the whole fluorine-containing polymer, $a+b+c+d+e=100\%$, and a relationship of $0\% \leq a \leq 70\%$, $0\% \leq b \leq 70\%$, $30\% \leq a+b \leq 70\%$, $0\% \leq c \leq 50\%$, $0\% \leq d \leq 50\%$, $0\% \leq e \leq 50\%$, and 0 mass $\% \leq g \leq 15$ mass % is satisfied.

(MF1): indicates a constituent unit derived from a monomer represented by $CF_2 = CF - Rf_1$. $Rf_1$ represents a perfluoroalkyl group having 1 to 5 carbon atoms.

(MF2): indicates a constituent unit derived from a monomer represented by $CF_2 = CF - ORf_{12}$. $Rf_{12}$ represents a fluorine-containing alkyl group having 1 to 30 carbon atoms.

(MF3): indicates a constituent unit derived from a monomer represented by $CH_2 = CR_0\text{-}L\text{-}Rf_{13}$. $R_0$ represents a hydrogen atom, a halogen atom, or a methyl group, L represents a divalent linking group, and $Rf_{13}$ represents a fluorine-containing alkyl group having 1 to 30 carbon atoms.

(MA): represents a constituent unit having at least one cross-linking group.

(MB): represents a constituent unit having at least one non-cross-linking group.

(MD): represents a constituent unit having at least one polysiloxane structure.

(MC'): represents a constituent unit having at least two basic functional groups.

(MF1), (MF2), (MF3), (MA), (MB), and (MD) in the general formula (10) are the same as those described on the part relating to the general formula (1).

The constituent unit of (MC') is preferably the constituent unit induced from the prepolymer containing unsaturated double bonds containing a constituent unit derived from the polymerizable basic compound containing (V) unsaturated double bonds, or a constituent unit formed from a reaction product of the (X) basic compound and the polyfunctional epoxy compound, as described in the above-described preferable synthesis methods (A-3) and (A-4).

Below, specific examples of a fluorine-containing polymer having a constituent unit having a basic functional group represented by the general formula (1) which is the (A) component are shown; however, the invention is not limited thereto. Furthermore, in Table 2, the specific examples are shown as combinations of monomers ((MF1), (MF2), (MF3), (MA), (MB), (MD)) forming the fluorine-containing constituent units of the general formula (1) by being polymerized, and the constituent unit (MC'). In the Table, a to e represent the molar fraction of the monomers of each component. In the Table, the description of wt % for the (MD) Component shows the mass % of the component in the whole polymer.

TABLE 2

| | (MF1) | (MF2) | (MF3) | (MA) | (MB) | (MC') | (MD) | a | b | c | d | e | k | g | (Mw) |
|---|---|---|---|---|---|---|---|---|---|---|---|---|---|---|---|
| EPF-1 | HFP | — | — | — | EVE | DMAEA | | 50 | — | — | — | 49 | 1 wt % | — | 2.2 |
| EPF-2 | HFP | — | — | (MA-8) | EVE | DMAEA | | 50 | — | — | 29 | 20 | 1 wt % | — | 2.3 |
| EPF-3 | HFP | — | — | (MA-8) | EVE | DMAEA | VPS-1001 | 50 | — | — | 29 | 20 | 1 wt % | 2 wt % | 2.5 |
| EPF-4 | HFP | FPVE | — | (MA-8) | EVE | DMAEA | VPS-1001 | 45 | 5 | — | 29 | 20 | 1 wt % | 2 wt % | 2.5 |
| EPF-5 | HFP | FPVE | MF3-1 | (MA-8) | EVE | DMAEA | | 45 | 5 | 5 | 29 | 15 | 1 wt % | — | 2.2 |
| EPF-6 | HFP | — | — | (MA-8) | EVE | DMAEA | FM-0721 | 50 | — | — | 29 | 20 | 1 wt % | 2 wt % | 2.3 |
| EPF-7 | HFP | — | — | — | EVE | DMAPAA | | 50 | — | — | — | 49 | 1 wt % | — | 2.5 |
| EPF-8 | HFP | — | — | (MA-8) | EVE | DMAPAA | | 50 | — | — | 29 | 20 | 1 wt % | — | 2.4 |
| EPF-9 | HFP | — | — | (MA-8) | EVE | DMAPAA | VPS-1001 | 50 | — | — | 29 | 20 | 1 wt % | 2 wt % | 2.4 |
| EPF-10 | HFP | FPVE | — | (MA-8) | EVE | DEAA | VPS-1001 | 45 | 5 | — | 29 | 15 | 1 wt % | — | 2.2 |
| EPF-11 | HFP | — | — | — | EVE | AOI' *1) | VPS-0501 | 50 | — | — | — | 49 | 1 wt % | 2 wt % | 2.2 |
| EPF-12 | HFP | — | — | (MA-8) | EVE | HEVE/IPDI' *2) | VPS-0501 | 50 | — | — | 29 | 20 | 1 wt % | 2 wt % | 2.4 |
| EPF-13 | HFP | — | — | (MA-8) | EVE | DMAEA | | 50 | — | — | 29 | 16 | 1 wt % | — | 2.3 |

(Mw) represents a weight average molecular weight.
(Value in ten thousands)
The abbreviations in the above Table represent the following.
(MF1) Component
HFP: Hexafluoropropylene
(MF2) Component
FPVE: Perfluoropropyl vinyl ether
(MF3) Component
MF3-1: $CH_2=CH-O-CH_2CH_2-O-CH_2(CF_2)_4H$
(MB) Component
EVE: Ethyl vinyl ether
(MD) Component
VPS-0501: Azo group-containing polydimethylsiloxane, molecular weight of polysiloxane moiety: about 5,000, manufactured by Wako Pure Chemical Industries, Ltd.
VPS-1001: Azo group-containing polydimethylsiloxane, molecular weight of polysiloxane moiety: about 10,000, manufactured by Wako Pure Chemical Industries, Ltd.
FM-0721: Dimethylsiloxane modified with methacryloyl at one end, average molecular weight: 5,000, manufactured by Chisso Corporation.
(MC') Component
DMAEA: Dimethylaminoethyl acrylate, manufactured by Kohjin Co., Ltd.
DMAPAA: N-(Dimethylaminopropyl)acrylamide, manufactured by Kohjin Co., Ltd.
DEAA: N--N-Diethylacrylamide, manufactured by Kohjin Co., Ltd.
*1) AOI': A constituent component in which acryloyl of 2-acryloyloxyethyl isocyanate is polymerized in the main chain, and in which the isocyanate group is hydrolyzed.
*2) HEVE/IPDI': A constituent component in which the vinyl group of hydroxyethyl vinyl ether is polymerized in the main chain, in which one isocyanate group of isophorone diisocyanate is reacted with a hydroxyl group and the remaining one isocyanate group is hydrolyzed.

Below, specific examples of the block or graft type fluorine-containing polymer represented by the general formula (10) which is the (A) component are shown; however, the invention is not limited thereto. Furthermore, in Table 3, the specific examples are shown as combinations of monomers ((MF1), (MF2), (MF3), (MA), (MB), (MD)) forming the fluorine-containing constituent components of the general formula (10) by being polymerized, and the constituent component(MC').

The compositional ratio in the Table of the fluorine-containing polymer moiety represents the mole ratio (%) of monomers of each component of the fluorine-containing polymer, and the description of wt % shows the mass % of the component in the fluorine-containing polymer moiety. In addition, in the Table, the composition equivalent ratio of the basic moiety (MC') represents the equivalent ratio of the basic functional group and the epoxy group.

Furthermore, the composition (j/k) ratio of the fluorine-containing polymer moiety and the basic moiety in the whole polymer represents the respective mass ratio.

TABLE 3

| | Fluorine-containing polymer moiety | | Basic moiety (MC') | | | |
|---|---|---|---|---|---|---|
| | Structural component | Composition (mole ratio) | Structural component | Composition (equivalant ratio) | j/k composition (mass ratio) | (Mw) |
| EPF-101 | HFP/MA-8/EVE/(VPS-0501) | 50/25/25/(3 wt %) | DMAEA/GMA | 90/10 | 95/5 | 2.9 |
| EPF-102 | HFP/MA-8/EVE/(VPS-0501) | 50/25/25/(3 wt %) | DMAA/GMA | 90/10 | 95/5 | 2.3 |
| EPF-103 | HFP/MA-8/EVE/(VPS-0501) | 50/25/25/(3 wt %) | DMAPAA/GMA | 90/10 | 95/5 | 3.4 |
| EPF-104 | HFP/MA-8/EVE | 50/25/25 | DMAEA/GMA | 90/10 | 95/5 | 2.9 |
| EPF-105 | HFP/MA-8/EVE | 50/25/25 | DMAA/GMA | 90/10 | 95/5 | 2.3 |
| EPF-106 | HFP/MA-8/EVE | 50/25/25 | DMAPAA/GMA | 90/10 | 95/5 | 3.4 |
| EPF-107 | HFP/MA-8/EVE/(VPS-0501) | 50/25/25/(3 wt %) | DMAEA/4HBAGE | 90/10 | 95/5 | 3.0 |
| EPF-108 | HFP/MA-8/EVE/(VPS-0501) | 50/25/25/(3 wt %) | DMAA/4HBAGE | 90/10 | 95/5 | 2.4 |
| EPF-109 | HFP/MA-8/EVE/(VPS-0501) | 50/25/25/(3 wt %) | DMAPAA/4HBAGE | 90/10 | 95/5 | 3.2 |
| EPF-110 | HFP/MA-8/EVE +MAc | 50/25/25 | DEA/EOCN104S | 45/55 | 95/5 | 3.8 |
| EPF-111 | HFP/MA-8/EVE/(VPS-0501) +MAc | 50/25/25/(3 wt %) | DEA/EOCN104S | 45/55 | 95/5 | 3.8 |

TABLE 3-continued

| | Fluorine-containing polymer moiety | | Basic moiety (MC') | | | |
|---|---|---|---|---|---|---|
| | Structural component | Composition (mole ratio) | Structural component | Composition (equivalant ratio) | j/k composition (mass ratio) | (Mw) |
| EPF-112 | HFP/MA-8/EVE/(VPS-0501) +MAc | 50/25/25/(3 wt %) | DBA/EOCN104S | 40/60 | 92/8 | 2.8 |
| EPF-113 | HFP/MA-8/EVE/(FM-0721) +MAc | 50/25/25/(3 wt %) | DBA/EOCN104S | 40/60 | 95/5 | 4.5 |
| EPF-114 | HFP/MA-8/EVE/(FM-0721) +ABCPA | 50/25/25/(3 wt %) | DEA/(GMA/MMA = 1/1) | 40/60 | 95/5 | 2.7 |

(Mw) represents a weight average molecular weight.
(Value in ten thousands)
The abbreviations in the above Table represent the following.
Fluorine-containing polymer moiety
+MAc: A polymer moiety in which a carboxyl group is introduced into the polymer terminal by using a mercaptoacetic acid as the chain transfer agent.
+ABCPA: A polymer moiety in which a carboxyl group is introduced into the polymer terminal using 4,4'-azobis(4-cyanopentanoic acid) as the polymerization initiator.
Basic moiety (MC')
DMAEA/GMA: A methacrylate prepolymer (mass average molecular weight: 1,400) in which an amino group of a dimethylaminoethyl acrylate polymer and a glycidyl group of glycidyl methacrylate (90/10 equivalent ratio mixture) are reacted.
DMAA/GMA: A methacrylate prepolymer (mass average molecular weight: 1,100) in which an amido group of a dimethylacrylamide polymer and a glycidyl group of glycidyl methacrylate (90/10 equivalent ratio mixture) are reacted.
DMAPAA/GMA: A methacrylate prepolymer (mass average molecular weight: 1,700) in which an amino group of a N-(dimethylaminopropyl)acrylamide polymer and a glycidyl group of glycidyl methacrylate (90/10 equivalent ratio mixture) are reacted.
DMAEA/4HBAGE: A methacrylate prepolymer (mass average molecular weight: 1,500) in which an amino group of a dimethylaminoethyl acrylate polymer and a glycidyl group of 4-hydroxybutyl acrylate glycidyl ether (90/10 equivalent ratio mixture) are reacted.
DMAA/4HBAGE: A methacrylate prepolymer (mass average molecular weight: 1,200) in which an amido group of a dimethylacrylamide polymer and a glycidyl group of 4-hydroxybutyl acrylate glycidyl ether (90/10 equivalent ratio mixture) are reacted.
DMAPAA/4HBAGE: A methacrylate prepolymer (mass average molecular weight: 1,600) in which an amino group of an N-(dimethylaminopropyl)acrylamide polymer and a glycidyl group of 4-hydroxybutyl acrylate glycidyl ether (90/10 equivalent ratio mixture) are reacted.
DEA/EOCN104S: A 45/55 (equivalent ratio) reaction product (molecular weight: about 1,800) of diethylamine and EOCN-104S (average 7.5-functional phenol novolak-type epoxy resin, epoxy equivalent: about 220).
DEA/EOCN104S: A 45/55 (equivalent ratio) reaction product (molecular weight: about 2,300) of diamine and EOCN-104S (average 7.5-functional phenol novolak-type epoxy resin, epoxy equivalent: about 220).
DBA/EOCN104S: A 40/60 (equivalent ratio) reaction product (molecular weight: about 1,300) of dibutylamine and EOCN-104S (average 7.5-functional phenol novolak-type epoxy resin, epoxy equivalent: about 220).
DEA/GMA/MMA: A reaction product (weight average molecular weight: about 1,300) of a glycidyl group of a 1:1 copolymer (weight average molecular weight: about 1,000) of glycidyl methacrylate and methyl methacrylate, and diethylamine. The equivalent ratio of the amine and the glycidyl group is 40/60.

The mass average molecular weight of the fluorine-containing polymer having a constituent unit derived from a compound having a basic functional group is preferably 1,000 to 100,000, more preferably 2,000 to 50,000, and even more preferably 3,000 to 30,000. The manner of determining the weight average molecular weight is the same as the manner of determining the weight average molecular weight of the above-described fluorine-containing polymer having a constituent unit derived from a compound having a polyalkylene oxide group.

<Preparation Method of Coating Composition>

When preparing the coating composition of the present invention, each component dissolved or dispersed in a solvent can be mixed, and it is preferable that a fluorine-containing polymer having at least one group selected from the polyalkylene oxide group and basic functional group of the (A) component and low refractive index inorganic fine particles of (B) component be mixed in advance together with a solvent of the (D) component and then that a binder of the (C) component, a polyfunctional fluorine-containing curable compound of the (E) component, and high refractive index inorganic fine particles of the (F) component be mixed.

The mass % with respect to the total solid content of the coating liquid of the fluorine-containing polymer of the (A) component having at least one group selected from the polyalkylene oxide group and basic functional group is preferably 1 to 50 mass %, more preferably 3 to 30 mass %, and even more preferably 5 to 20 mass % from the viewpoints of lowering the refractive index after forming the coating film and the upper portion distribution of the low refractive index inorganic fine particles.

The mass % with respect to the total solid content of the coating liquid of the low refractive index inorganic fine particles of (B) component is preferably 1 to 50 mass %, more preferably 3 to 30 mass %, and even more preferably 5 to 20 mass % from the viewpoint of lowering the refractive index of the low refractive index layer after forming the coating film.

The mass % with respect to the total solid content of the coating liquid of the binder of the (C) component is preferably 0.1 to 50 mass %, more preferably 0.5 to 30 mass %, and even more preferably 1 to 20 mass % from the viewpoints of raising the refractive index of the high refractive index layer after forming the coating film and scratch resistance.

The mass % with respect to the total solid content of the coating liquid of the polyfunctional fluorine-containing curable compound of the (E) component is preferably 0.1 to 50 mass %, more preferably 0.5 to 30 mass %, and even more preferably 1 to 20 mass % from the viewpoints of lowering the refractive index of the low refractive index layer after forming the coating film and scratch resistance.

The mass % with respect to the total solid content of the coating film of the high refractive index inorganic fine particles of the (F) component is preferably 5 to 80 mass %, more preferably 10 to 70 mass %, and even more preferably 20 to 60 mass % from the viewpoint of increasing the refractive index after forming the coating film.

<(B) Component: Low Refractive Index Inorganic Fine Particles>

The low refractive index inorganic fine particles of (B) component used in the present invention are low refractive index inorganic fine particles which are not surface-modified, or low refractive index inorganic fine particles which are surface-treated with a silane coupling agent having the molecular weight of 600 or less. Furthermore, the above may be used in combination.

Here, the low refractive index inorganic fine particles which are not surface-modified refer to low refractive index inorganic fine particles of which the surface of the low refractive index inorganic fine particles is not processed with a silane coupling agent or the like.

The low refractive index inorganic fine particles of (B) component used in the present invention are preferably low refractive index inorganic fine particles of which the average particle diameter thereof is 1 nm or more to 150 nm or less, more preferably low refractive index inorganic fine particles of which the average particle diameter thereof is 5 nm or more to 100 nm or less, and even more preferably low refractive index inorganic fine particles of which the average particle diameter thereof is 10 nm or more to 80 nm or less.

If the particle diameter of the low refractive index inorganic fine particles is excessively small, the effect of improving the scratch resistance is reduced, and if the particle diameter is excessively large, fine unevenness is created on the curable layer surface, and since there are cases where the external appearance, such as the black density and the integral reflectivity, is deteriorated, it is preferably within the above-described range. The low refractive index inorganic fine particles may be crystalline or may be amorphous or even monodisperse particles, and, as long as the predetermined particle diameter is satisfied, may be aggregated particles. The shape ideally has a spherical diameter, but even an irregular shape does not cause problems.

Here, the average particle diameter of the low refractive index inorganic fine particles is the average diameter in which the mass of the particles is weighted, and can be measured by observation (microscope method) using a light scattering method or an electron microscope. In addition, when a commercial product is used as the low refractive index inorganic fine particles of the present invention, the average particle diameter of the present invention may be a value in a catalog.

Here, the average particle diameter of the low refractive index inorganic fine particles which are surface-treated with a silane coupling agent having the molecular weight of 600 or less is equal to the average particle diameter of the low refractive index inorganic fine particles before surface treatment.

The composition of the low refractive index inorganic fine particles is not particularly limited and, for example, oxides of silicon, titanium, aluminum, tin, zinc, antimony, and the like, or mixtures thereof can be used; however, in order to perform the upper portion distribution together with the (A) component of the present invention in the coating film, it is preferable to include a metal oxide in which silicon is set as a constituent component at least on the surfaces of the low refractive index inorganic fine particles. For example, even with core shell particles in which the surface is formed of silicon dioxide, a mixed crystal of silicon and other inorganic elements may be formed. In particular, from the viewpoint of lowering the refractive index, silicon dioxide (silica) particles are preferable.

The refractive index of the low refractive index inorganic fine particles is preferably 1.46 or less, more preferably 1.15 to 1.46, particularly preferably 1.15 to 1.40, even more preferably 1.15 to 1.35, and most preferably 1.17 to 1.32. Since the low refractive index inorganic fine particles of (B) component are distributed in the upper portion of the cured layer, and contribute to the improvement of the scratch resistance and decreasing of the refractive index, a low refractive index is preferable.

Here, the refractive index of the inorganic fine particles can be measured with an Abbe refractometer (manufactured by Atago Co., Ltd.), and is the value measured by D-line at 25° C.

The low refractive index inorganic fine particles of (B) component more preferably has a hollow structure. In the case of inorganic fine particles having a hollow structure, the refractive index does not indicate the refractive index of only the inorganic material of the outer shells but indicates the average value of the whole particles. In this case, assuming that the radius of the cavity inside the particle is a and the radius of the outer shell of the particle is b, the porosity x is represented the following numerical formula (II).

$$x = (4\pi a^3/3)/(4\pi b^3/3) \times 100 \qquad \text{(Numerical formula II):}$$

The porosity x is preferably 10 to 60%, more preferably 20 to 60%, and even more preferably from 30 to 60%. With the porosity set in this range, the low refractive index property and the strength of the particles themselves can be set to suitable ranges.

In order to achieve dispersion stability in the dispersion liquid or the coating liquid, or to increase the compatibility and the bonding with the binder component, the low refractive index inorganic fine particles of (B) component may undergo physical surface treatment such as plasma discharge processing or corona discharge processing, or chemical surface treatment using a surfactant, silane coupling agent, or the like. Among the above, silane coupling processing is particularly effective. In order not to inhibit the interaction with the (A) component of the present invention and to set the dispersion stability in the dispersion liquid or the coating liquid to be sufficient, the molecular weight of the silane coupling agent needs to be 600 or less, preferably 90 or more to 600 or less, more preferably 100 or more to 400 or less, and most preferably 120 or more to 300 or less. The molecular weight of the silane coupling agent in the present invention represents the molecular weight in a state where a hydrolyzable group bonded to an Si atom of the silane coupling agent contributing to the bonding of the inorganic fine particle surfaces is hydrolyzed into a silanol group (Si—OH).

Examples of preferable silane coupling agents of the present invention include trimethylmethoxysilane, triethylmethoxysilane, trimethylethoxysilane, triethylethoxysilane, methyltrimethoxysilane, dimethyldimethoxysilane, vinyltrimethoxysilane, vinyltriethoxysilane, 2-(3,4-epoxycyclohexyl)ethyltrimethoxysilane, 3-glycidoxypropyltrimethoxysilane, 3-acryloyloxypropyltrimethoxysilane, 3-methacryloyloxypropyl trimethoxysilane and the like. Among the silane coupling agents, ones having an alkyl group or an alkyl group having a polymerizable functional group are preferable. As the polymerizable functional group, an epoxy group, a vinyl group, a (meth)acryloyl group, and the like are preferable, and an acryloyl group is most preferable. By introducing the above functional groups, the coating film strength of the upper portion distribution layer of the low refractive index inorganic fine particles can be improved.

Ratio of the low refractive index inorganic fine particles of (B) component and the (A) component In a case where the (A) component does not have a cross-linking functional group, the amount of the (A) component with respect to the (B) component is preferably 10 to 150 mass %, and more preferably 15 to 100 mass %. In a case where the (A) component has a cross-linking functional group, the amount is preferably 10 to 200 mass %, more preferably 15 to 150 mass %, and even more preferably 50 to 150 mass %. By setting the above ranges, it is preferable from the viewpoint of upper portion distribution of the low refractive index inorganic fine particles and coating film strength.

<(C) Component: Curable Binder which does not Contain a Fluorine Atom in the Molecule>

The coating composition of the present invention contains a curable binder which does not contain a fluorine atom in the molecule as the (C) component. Preferable examples of the (C) component include a monomer or oligomer having a reactive group capable of undergoing cross-linking by heat or ionizing radiation, more preferably include a resin component containing a polyfunctional monomer or polyfunctional oligomer having a bifunctional or higher functional group, and still more preferably include a resin component containing a polyfunctional monomer or polyfunctional oligomer having a trifunctional or higher functional group.

The (C) component preferably has a larger surface free energy than the (A) component. A resin capable of forming a cured layer having a surface free energy of 30 mN/m or more is preferable, the range of 35 to 80 mN/m is more preferable, and the range of 40 to 60 mN/m is even more preferable. In addition, the difference in the surface free energy between the (A) component and the (C) component is preferably 5 mN/m or more, and more preferably 10 mN/m or more to 40 mN/m or less. By setting the above ranges, a phase separation structure is more easily formed when the coating composition of the present invention is used. If the surface free energy after curing is too high or too low, reflectivity deterioration, unevenness and the like may be generated. From the viewpoints of strength and coatability, the surface free energy is preferably set to the above-described preferable lower limit or more. Here, as long as the components have the surface free energy as described above, the (C) component may contain a fluorine atom in the molecule.

In order that the surfaces of the low refractive index inorganic fine particles of the (B) component be covered by the fluorine-containing polymer of the (A) component having at least one group selected from the polyalkylene oxide group and the basic functional group and distribution be performed to the outermost surface of the coating film, a greater separation of the (A) component and the (B) component is preferable.

The separation of the (A) component and the (C) component can be predicted by thermodynamic and kinetic studies. For example, when the free energy ($\Delta G=\Delta H-T\cdot\Delta S$) of mixing, which is an index of the separation in the Flory-Huggins lattice theory, is determined, it is known how to perform prediction as a function of the degree of polymerization, the volume fraction ($\phi$: also called the composition fraction in the literature), and the interaction parameter ($\chi$) (for example, refer to Bates "Polymer-Polymer Phase Behavior" Science, Vol. 251 pp. 898-905, 1991, or Strobl "Physics of Polymers" Springer-Verlag Tokyo, 1998).

$\Delta G$ signifies that two components proceed in a direction separating from each other when $\Delta G$ is larger than zero, and the two components proceed in a direction mixing with each other when $\Delta G$ is smaller than zero. In the present invention, in order that the surface of the (B) component be covered with the (A) component and distribution be performed to the outermost surface of the coating film, $\Delta G$ of the (A) component and the (C) component is more preferably greater than zero, and from the viewpoints of further accelerating the separation and reducing the irregularity in the layer interface, $\Delta G$ is more preferably 0.01 or more.

As functional groups having the curable binder of the (C) component, photo-, electron beam-, and radiation-polymerizable groups are preferable, among which, a photopolymerizable functional group is preferable.

Examples of the photopolymerizable functional group specifically include unsaturated polymerizable functional groups or the like such as a (meth)acryloyl group, a vinyl group, a styryl group and an allyl group, among which, a (meth)acryloyl group is preferable.

From the viewpoint of improving the scratch resistance, the curable binder of the (C) component preferably contains a compound having at least a plurality of unsaturated double bonds in the molecule.

Specific examples of the curable binder having a photopolymerizable functional group include:

(meth)acrylic acid diesters of alkylene glycol, such as neopentyl glycol acrylate, 1,6-hexanediol(meth)acrylate and propylene glycol di(meth)acrylate;

(meth)acrylic acid diesters of polyoxyalkylene glycol, such as triethylene glycol di(meth)acrylate, dipropylene glycol di(meth)acrylate, polyethylene glycol di(meth)acrylate and polypropylene glycol di(meth)acrylate;

(meth)acrylic acid diesters of polyhydric alcohol, such as pentaerythritol di(meth)acrylate; and (meth)acrylic acid diesters of ethylene oxide or a propylene oxide adduct, such as 2,2-bis{4-(acryloxy diethoxy) phenyl}propane and 2-2-bis{4-(acryloxy polypropoxy) phenyl}propane.

Furthermore, epoxy(meth)acrylates, urethane(meth)acrylates and polyester(meth)acrylates may be also preferably used as the photopolymerizable polyfunctional monomer.

Among the above, esters of a polyhydric alcohol with a (meth)acrylic acid are preferable. A polyfunctional monomer having three or more (meth)acryloyl groups in each molecule is even more preferable. Specific examples thereof include trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth)acrylate, (di)pentaerythritol triacrylate, (di)pentaerythritol pentaacrylate, (di)pentaerythritol tetra(meth)acrylate, (di)pentaerythritol hexa(meth)acrylate, tripentaerythritol triacrylate, tripentaerythritol hexatriacrylate, and the like. In the present specification, "(meth)acrylate", "(meth)acrylic acid" and "(meth)acryloyl" indicate "acrylate or methacrylate", "acrylic acid or methacrylic acid" and "acryloyl or methacryloyl", respectively.

As the monomer binder, monomers having different refractive indices can be used in order to control the refractive index of each layer. In particular, examples of high refractive index monomers include bis(4-methacryloylthiophenyl)sulfide, vinylnaphthalene, vinyl phenyl sulfide, 4-methacryloxyphenyl-4'-methoxyphenylthioether, and the like.

Furthermore, for example, dendrimers described in JP2005-76005A and JP2005-36105A, and norbornene ring-containing monomers described, for example, in JP2005-60425A can also be used.

Two or more kinds of polyfunctional monomers may be used in combination.

From the viewpoints of forming two or more layers having different refractive indices with a single coating step and imparting an anti-reflection property, it is preferable that the mass ratios of the (A) component, the (B) component, the (C) component, and the (E) component to be described later used in the coating composition of the present invention be a mass ratio in which [(A) component+(B) component+(E) component]/[(C) component+(F) component] is 20/80 to 60/40, more preferably 25/75 to 55/45, and even more preferably 30/70 to 50/50.

<(D) Component: Solvent>

As the solvent (D) used in the present invention, various solvents can be used after being selected from the viewpoints such as of being able to dissolve or disperse each component, of easily providing a uniform surface state in the coating step and drying step, of being able to ensure liquid storability, and of having an appropriate saturated vapor pressure.

One kind of solvent may be used, or two or more kinds of solvents may be mixed and used.

The (D) component is preferably a mixed solvent of at least the following two solvents:
(D-1) a volatile solvent having a boiling point exceeding 100° C.
(D-2) a volatile solvent having a boiling point of 100° C. or less In particular, from the viewpoint of the drying load, while using a solvent having a boiling point of 100° C. or less at room temperature and normal pressure as the main component, a solvent having a boiling point exceeding 100° C. or more for adjusting the drying speed is preferably contained in a small amount (the solvent having a boiling point exceeding 100° C. is preferably contained as 1 to 50 parts by mass, more preferably 2 to 40 parts by mass, and particularly preferably 3 to 30 parts by mass, with respect to 100 parts by mass of the solvent having a boiling point of 100° C. or less). The difference in the boiling points between the two solvents is preferably 25° C. or more, more preferably 35° C. or more, still more preferably 50° C. or more. By using at least two organic solvents with different boiling points together, upper portion distribution of the low refractive index inorganic fine particles and separation of the binder are facilitated. In addition, when the coating film causes phase separation in the coating and drying and the low refractive index inorganic fine particles are distributed, the lower the viscosity of the whole system, the better the distribution property. For this reason, the viscosities of (D-1) and (D-2) components are preferably 4.0 cP or less, more preferably 2.0 cP or less, and even more preferably 1.5 cP or less.

In addition, the solvent in which the solubility parameter difference with the (A) component or the (C) component is 1.0 or more and 10 or less is preferably contained in a small amount (preferably contained as 1 to 50 parts by mass, more preferably 2 to 40 parts by mass, and particularly preferably 3 to 30 parts by mass, with respect to 100 parts by mass of the solvent having a boiling point of 100° C. or less). By adding a solvent with poor solubility, the separation of the binder is promoted.

Examples of the solvent having a boiling point of 100° C. or less include hydrocarbons such as hexane (boiling point: 68.7° C.), heptane (98.4° C.), cyclohexane (80.7° C.) and benzene (80.1° C.); halogenated hydrocarbons such as dichloromethane (39.8° C.), chloroform (61.2° C.), carbon tetrachloride (76.8° C.), 1,2-dichloroethane (83.5° C.) and trichloroethylene (87.2° C.); ethers such as diethyl ether (34.6° C.), diisopropyl ether (68.5° C.), dipropyl ether (90.5° C.) and tetrahydrofuran (66° C.); esters such as ethyl formate (54.2° C.), methyl acetate (57.8° C.), ethyl acetate (77.1° C.), isopropyl acetate (89° C.) and dimethyl carbonate (90.3° C.); ketones such as acetone (56.1° C.) and methyl ethyl ketone (79.6° C.); alcohols such as methanol (64.5° C.), ethanol (78.3° C.), 2-propanol (82.4° C.) and 1-propanol (97.2° C.); cyano compounds such as acetonitrile (81.6° C.) and propionitrile (97.4° C.); carbon disulfide (46.2° C.), and the like. Among the above, ketones and esters are preferable, and ketones are more preferable. Among the ketones, methyl ethyl ketone is particularly preferable.

Examples of the solvent having a boiling point of 100° C. or more include octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (same as methyl isobutyl ketone (MIBK), 115.9° C.), 1-butanol (117.7° C.), N,N-dimethylformamide (153° C.), N,N-dimethylacetamide (166° C.) dimethyl sulfoxide (189° C.), and the like. Among these, cyclohexanone and 2-methyl-4-pentanone are preferable.

Examples of the solvent having a viscosity of 4.0 cP or less include methyl ethyl ketone (0.40 cP (20° C.)), dimethyl ketone (0.32 cP (20° C.)), toluene (0.59 cP (25° C.)), xylene (0.67 cP (25° C.)), dimethyl carbonate (0.63 cP (20° C.)), n-butyl acetate (0.73 cP (20° C.)), tetrahydrofuran (THF) (0.55 cP (20° C.)), methylisobutyl ketone (0.61 cP (20° C.)), propylene glycol monomethyl ether acetate (PGMEA) (1.30 cP (20° C.)), propylene glycol monomethyl ether (PGME) (1.81 cP (20° C.)), (ethanol (1.12 cP (20° C.)), methyl acetate (0.39 cP (20° C.)), and the like. Methyl ethyl ketone, methyl isobutyl ketone, dimethyl ketone, dimethyl carbonate, and methyl acetate are preferable.

In the present invention, it is preferable to use a volatile solvent in which the difference of the SP values (solubility parameter) with either of the (A) component or the (C) component is 1 to 10.

The solvent in which the solubility parameter difference with the (A) component is 1.0 or more to 10 or less is preferably a solvent in which the absolute value of the solubility parameter is 20 or more to 30 or less, more preferably 21 or more to 27 or less, and even more preferably 22 or more to 26 or less. For example, there are propylene glycol monoethyl ether (solubility parameter=23.05), ethyl acetate (solubility parameter=23.65), methanol (solubility parameter=28.17), ethanol (solubility parameter=25.73) and the like. Propylene glycol monoethyl ether is preferable.

In the steps of coating the coating composition, and performing drying, a solvent with a solubility parameter absolute value of 20 or more has a strong tendency to lower the compatibility with the (A) component, and the use of a solvent in which the solubility parameter difference is 1.0 or more is suitable in order to increase the phase separation property. In addition, when preparing the liquid of the coating composition, since a solvent with a solubility parameter absolute value of 30 or more has a strong tendency to not easily dissolve the (A) component, the use of a solvent in which the solubility parameter difference is 10 or less is suitable.

Furthermore, the solvent in which the solubility parameter difference with the (C) component is 1.0 or more to 10 or less is preferably a solvent in which the solubility parameter absolute value is 10 or more and 20 or less, and more preferably 12 or more and 18 or less.

Examples of such a solvent include 1,1,2,2-tetrafluoro-1-(2,2,2-trifluoroethoxy)ethane (solubility parameter=14.54), trifluoromethylbenzene (solubility parameter=16.76), perfluoroheptylethyl acetate (solubility parameter=14.79), 1,1,2,2,3,3,4,4,5,5,6,6-dodecafluorohexylethyl acetate (solubility parameter=16.72), methyl trifluoroacetate (solubility parameter=15.73), and the like. Here, 1,1,2,2-tetrafluoro-1-(2,2,2-trifluoroethoxy)ethane is preferable. By combining solvents in which the solubility parameter difference is 1.0 or more to 10 or less, it is easy to satisfy the required minimum solubility while preserving an appropriate phase separation property.

(Solubility Parameter)

The solubility parameter is a numerical value expressing the ease of solubility in a solvent or the like and, using the same concept as the polarity often used with organic compounds, a larger solubility parameter indicates that the polarity is larger. The (A) component used in the present invention is preferably a fluorine-containing polymer and the solubility parameter thereof calculated by Fedor's estimation method is, for example, 19 or less. The solubility parameter of DPHA as the (C) component described above, which is a mixture of dipentaerythritol pentaacrylate and dipentaerythritol hexaacrylate, is 21.4. The above-described SP value is a value calculated, for example, by Fedor's estimation method (Foundation and Application of SP Values and Calculation Method, page 66: Hideki Yamamoto, Johokiko Co., Ltd. (issued on Mar. 31, 2005)).

As for the blending ratio of the organic solvent as the (D) component in the coating composition of the present invention, the organic solvent is preferably added so as to give a coating composition having a solid content concentration of 2 to 70 mass %, more preferably 3 to 60 mass %, and particularly preferably 5 to 50 mass %. If the solid content concentration is excessively low, there is a concern that the drying may take time or that film thickness unevenness (thickness unevenness) may be easily generated in the process of drying the coating film. In addition, if the solid content concentration is excessively high, there are concerns such as that the distribution of the low refractive index inorganic fine particles in the coating film may not be sufficient, that the coating amount may be reduced, and that coating unevenness may easily occur.

<(E) Polyfunctional Fluorine-Containing Curable Compound>

The coating composition of the present invention contains a polyfunctional fluorine-containing curable compound as the (E) component. The polyfunctional fluorine-containing curable compound is preferably a polyfunctional fluorine-containing monomer or oligomer, and, from the viewpoints of scratch resistance and the effect of improving the surface defects, the molecular weight is preferably 450 to 2000, more preferably 500 to 2000, and even more preferably 600 to 1500.

By using polyfunctional fluorine monomers or oligomers as the (E) component, an anti-reflection film in which the scratch resistance is high and the surface defects are further reduced can be provided. In order to improve the scratch resistance of the anti-reflection film of the present invention, it is preferable to raise the hardness and the slipping property of the outermost layer by distributing the (E) curable compound containing a fluorine atom in the upper portion of the coating film.

The polyfunctional fluorine-containing curable compound of the (E) component preferably has a polymerizable group, and the polymerizable group preferably has any group selected from an acryloyl group, a methacryloyl group, and —C(O)OCH=CH$_2$.

The polyfunctional fluorine-containing monomers or oligomers which can be used as the (E) component are compounds having an atomic group (below, also referred to as "fluorine-containing core portion") substantially not contributing to the polymerization which is mainly formed of a plurality of fluorine atoms and carbon atoms (however, oxygen atoms and/or hydrogen atoms may be included in a part thereof), and having polymerizability such as radical polymerizability, ion polymerizability, or condensation polymerizability through a linking group such as an ester bond or an ether bond, and which preferably have two or more polymerizable groups.

The polyfunctional fluorine-containing monomers or oligomers are preferably compounds represented by the following general formula (I).

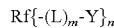     General formula (I)

(In the formula, Rf includes at least a carbon atom and a fluorine atom and may include at least one of an oxygen atom and a hydrogen atom and represents a chain or cyclic n-valent group, and n represents an integer of two or more. L represents a single bond or a divalent linking group and m represents 0 or 1. Y represents a polymerizable group.)

In the above general formula (I), Y represents a polymerizable group. Y is preferably a group having radical polymerizability, ion polymerizability, or condensation polymerizability, more preferably a polymerizable unsaturated group or a ring-opening polymerizable group, and even more preferably a polymerizable unsaturated group. Specifically, those selected from a (meth)acryloyl group, an allyl group, an alkoxysilyl group, an α-fluoro acryloyl group, an epoxy group, and —C(O)OCH=CH$_2$ are more preferable. Among the above, from the viewpoint of polymerization, a (meth) acryloyl group, an allyl group, an α-fluoro acryloyl group, an epoxy group, or —C(O)OCH=CH$_2$ having radical polymerizability or cationic polymerizability are preferable, a (meth) acryloyl group, an allyl group, an α-fluoro acryloyl group, or —C(O)OCH=CH$_2$ having radical polymerizability are particularly preferable, and a (meth)acryloyl group or —C(O) OCH=CH$_2$ are most preferable.

Here, the polyfunctional fluorine-containing curable compound may be a cross-linking agent having a polymerizable group as a cross-linking group.

Examples of the cross-linking group include a silyl group having a hydroxy group or a hydrolyzable group (for example, an alkoxysilyl group, an acyloxysilyl group, or the like), a group having reactive unsaturated double bond (for example, a (meth)acryloyl group, an allyl group, vinyloxy group, or the like), a ring-opening polymerization reactive group (for example, an epoxy group, an oxetanyl group, an oxazolyl group or the like), a group having an active hydrogen atom (for example, a hydroxyl group, a carboxyl group, an amino group, a carbamoyl group, a mercapto group, a β-ketoester group, a hydrosilyl group, a silanol group, or the like), an acid anhydride, a group which can be substituted with a nucleophilic agent (an active halogen atom, a sulfonic acid ester or the like), and the like.

L represents a single bond or a divalent linking group and is preferably an alkylene group having 1 to 10 carbon atoms, an arylene group having 6 to 10 carbon atoms, —O—, —S—, —N(R)—, or a divalent linking group obtained by combining two or more of the above. However, R represents a hydrogen atom or an alkyl group having 1 to 5 carbon atoms.

In a case where L represents an alkylene group or an arylene group, the alkylene group or arylene group represented by L is preferably substituted with a halogen atom, and more preferably substituted with a fluorine atom.

Here, the calculated value of inter-cross-link molecular weight indicates the sum of atomic weights of atomic groups interposed between (a) and (a), between (b) and (b) or between (a) and (b), assuming that, in a polymer where all the polymerizable groups in the polyfunctional fluorine-containing curable compound are polymerized, the carbon atom substituted with a total of 3 or more carbon atoms and/or silicon atoms and/or oxygen atoms is set as (a) and the silicon atom substituted with a total of 3 or more carbon atoms and/or oxygen atoms is set as (b). If the inter-cross-link molecular weight is increased, the fluorine content in the fluorine-containing monomer can be increased, and improvements can be made regarding the lowering of the reflectivity, conductivity and antifouling performance; however, on the other hand, the strength and hardness of the coating film are decreased and the scratch resistance and abrasion resistance of the coating film surface become insufficient. Meanwhile, if the inter-cross-link molecular weight is decreased, the inter-cross-link density can be raised and the film strength can be improved; however, since the amount of fluorine is decreased and the reflectivity increases, from the viewpoint of cross-link density and fluorine content, the calculated value of the inter-cross-link molecular weight when all the polymerizable groups in the fluorine-containing polyfunctional monomer are polymerized is preferably 2,000 or less. In addition, less than 1,000 is more preferable and more than 400 and less than 800 is most preferable. In addition, the polyfunctional fluorine-containing curable compound preferably has, in the molecule, a carbon atom substituted with a total of 3 or more oxygen atoms and/or carbon atoms and/or silicon atoms (excluding oxygen atoms of a carbonyl group). By containing this carbon atom, a dense cross-link network structure can be established during the curing, and the hardness of the coating film tends to be increased.

A more preferable embodiment of the polyfunctional fluorine-containing curable compound represented by the general formula (1) is a compound represented by the following general formulas (I-1), (I-2) and (I-3).

(I-1):

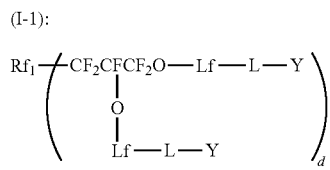

(I-2):

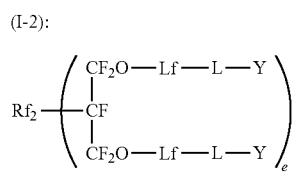

(I-3):

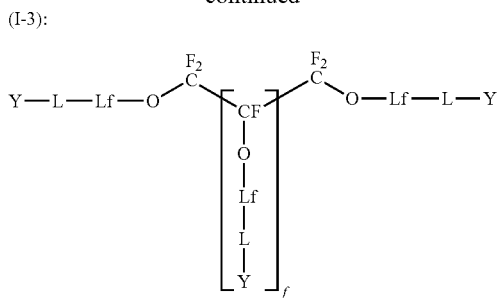

Lf: $-CF_2CF_2CH_2O-$, $-CF_2CH_2O-$

In the formula, $Rf_1$ represents an oxygen atom or a d-valent organic group which is a group substantially configured by only a carbon atom and a fluorine atom or a group configured by only a carbon atom, a fluorine atom and an oxygen atom. $Rf_2$ represents an oxygen atom or an e-valent organic group which is a group substantially configured by only a carbon atom and a fluorine atom or a group substantially configured by only a carbon atom, a fluorine atom and an oxygen atom. Lf represents $-CF_2CF_2CH_2O-$ or $-CF_2CH_2O-$ (in both, the carbon atom side is bonded to the oxygen atom); L and Y have the same meaning as L and Y in formula (I); d and e each independently represent an integer of 2 or more; and f represents an integer of 1 or more.

$Rf_1$ and $Rf_2$ preferably have 0 to 30 carbon atoms, and more preferably 0 to 10 carbon atoms.

An even more preferable embodiment of the compound represented by the above-described general formulas (I-1), (I-2) or (I-3) is a compound represented by the following general formulas (I-1'), (I-2') or (I-3').

(I-1'):

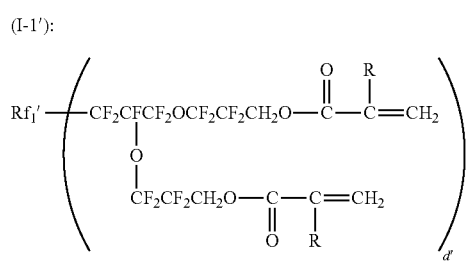

(I-2'):

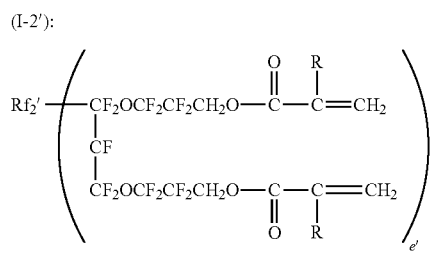

(I-3'):

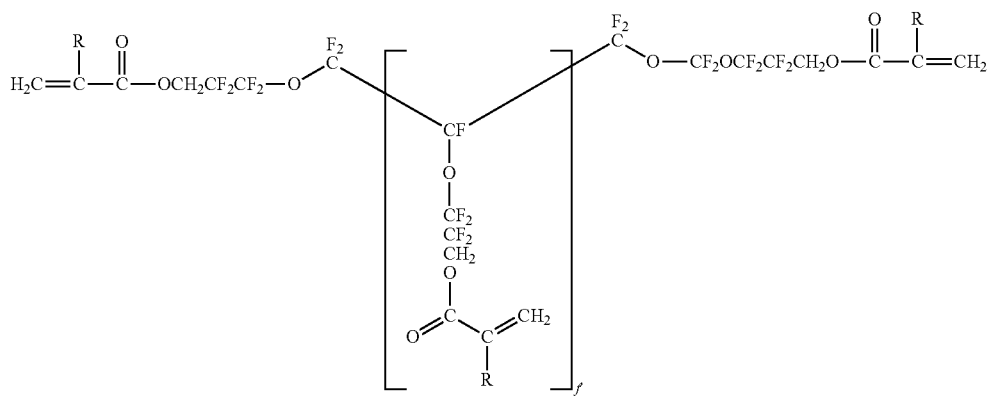

In the formula, $Rf_1'$ represents an oxygen atom or a d'-valent organic group which is a group substantially configured by only a carbon atom and a fluorine atom or a group configured by only a carbon atom, a fluorine atom and an oxygen atom. $Rf_2'$ represents an oxygen atom or an e'-valent organic group which is a group substantially configured by only a carbon atom and a fluorine atom or a group substantially configured by only a carbon atom, a fluorine atom and an oxygen atom. R represents any one of a hydrogen atom, a fluorine atom, an alkyl group (preferably an alkyl group having 1 to 5 carbon atoms) or a fluoroalkyl group (preferably a perfluoroalkyl group having 1 to 5 carbon atoms). d' and e' each independently represent an integer of 2 or 3, and f represents an integer of 1 to 4.

$Rf_1'$ or $Rf_2'$ preferably have 0 to 30 carbon atoms, and more preferably 0 to 10 carbon atoms.

Specific examples of the polyfunctional fluorine-containing curable compound represented by the general formula (I) of the present invention are shown below, but the present invention is not limited thereto.

F-1

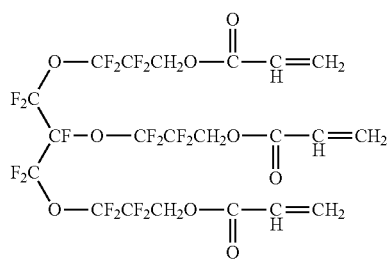

F-2

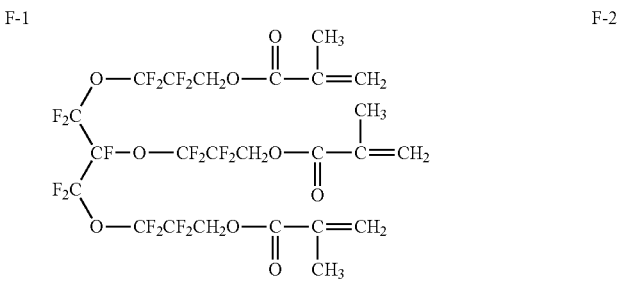

F-3

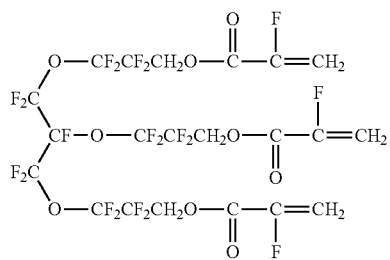

F-4

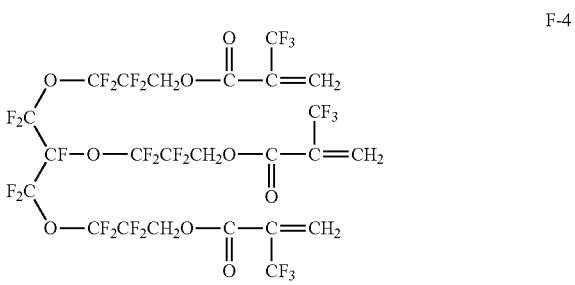

F-5

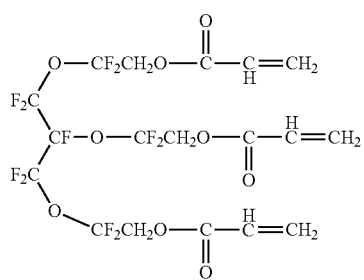

F-6

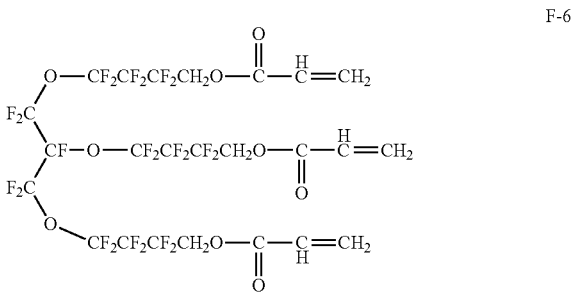

-continued
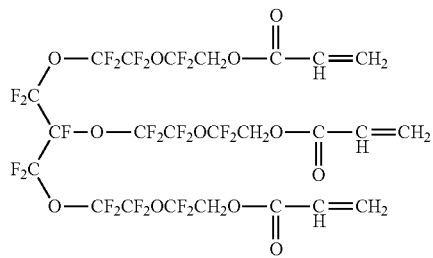
F-7
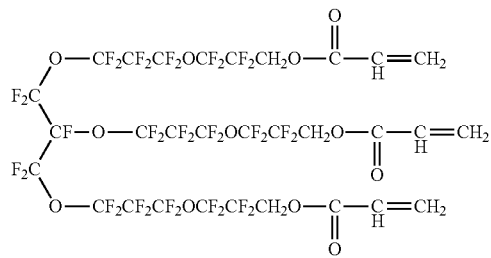
F-8
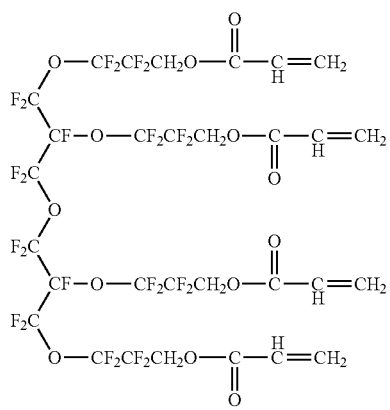
F-9
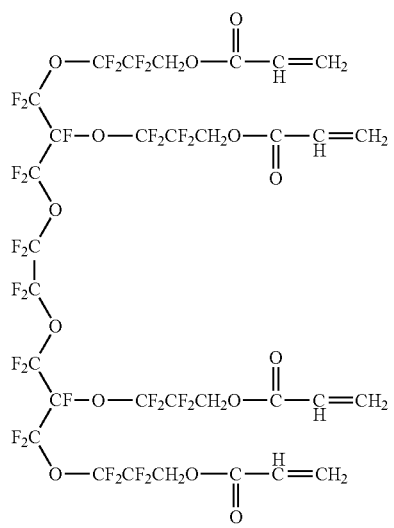
F-10
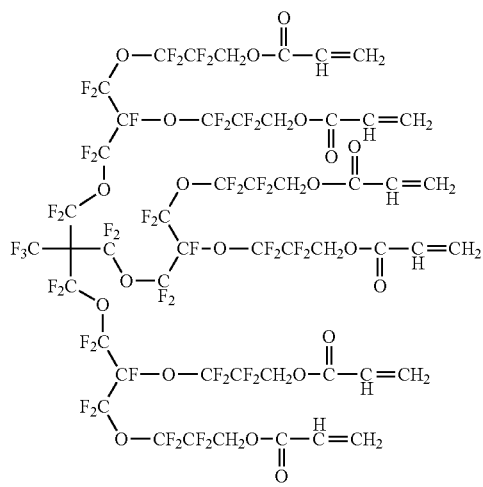
F-11
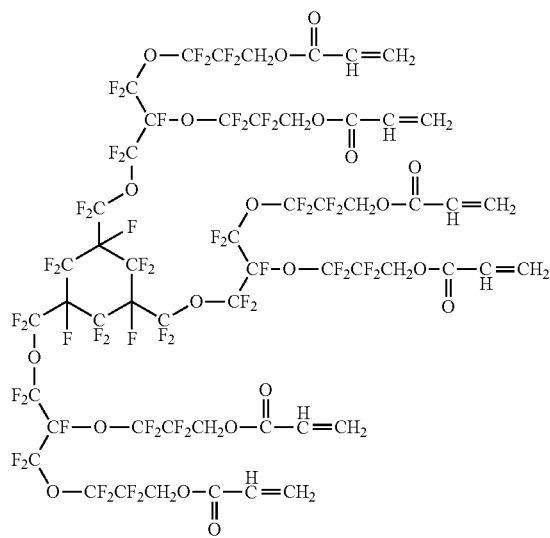
F-12

-continued
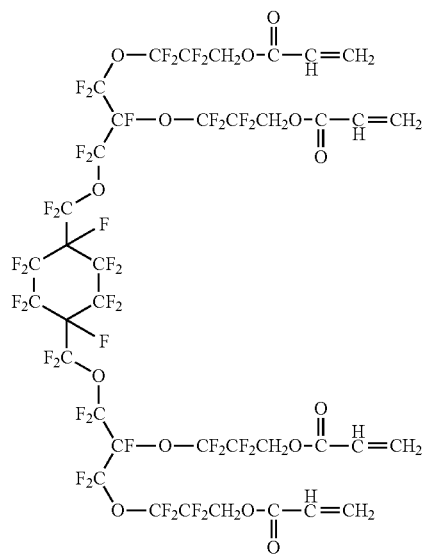
F-13
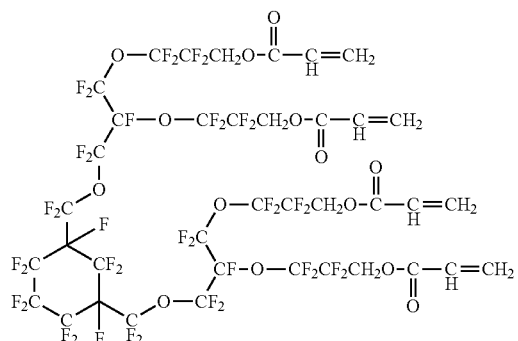
F-14
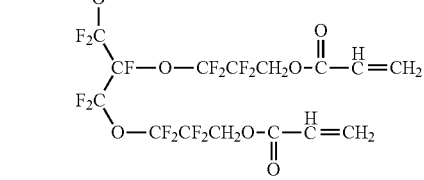
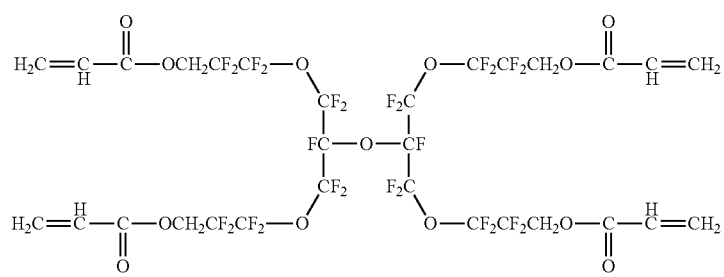
F-15
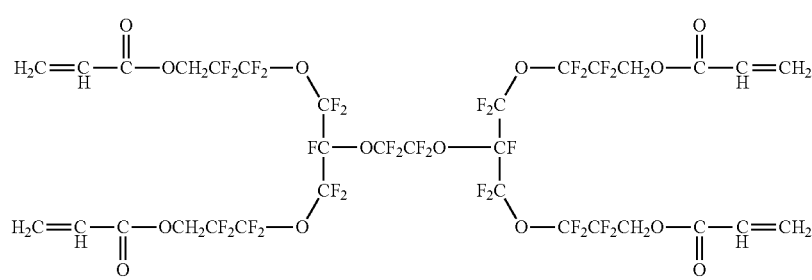
F-16
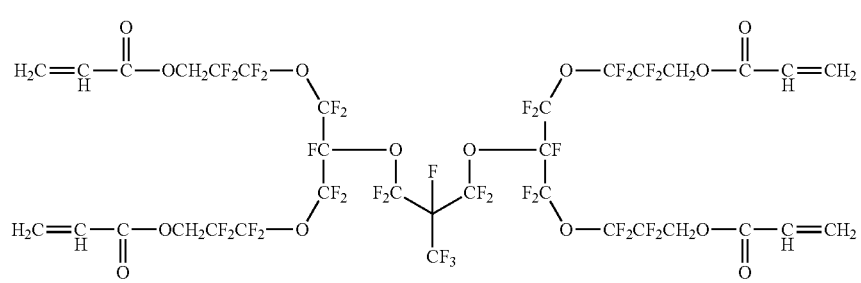
F-17

F-18
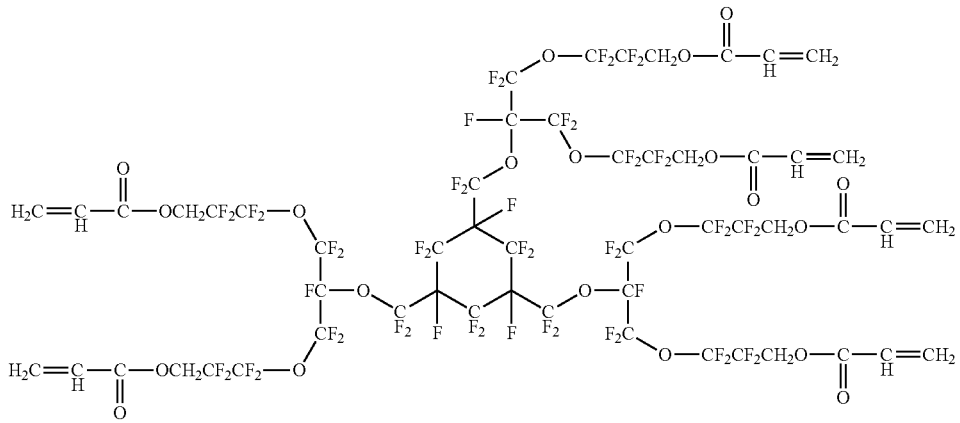
F-19
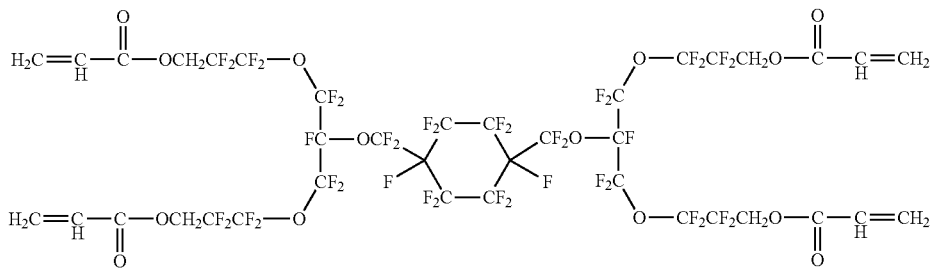
F-20
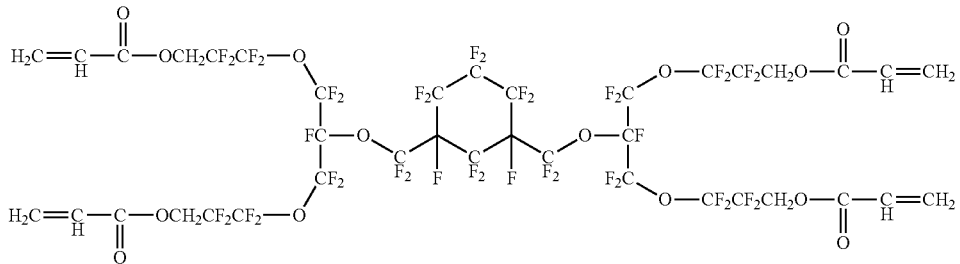
F-21
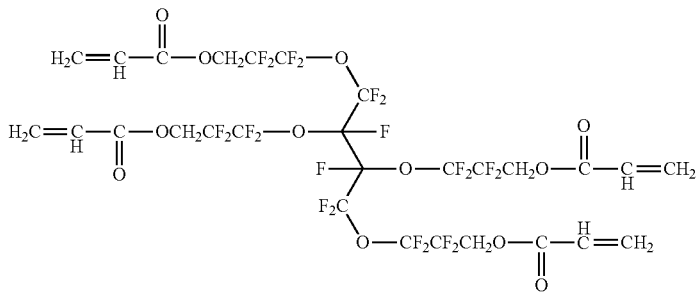
F-22
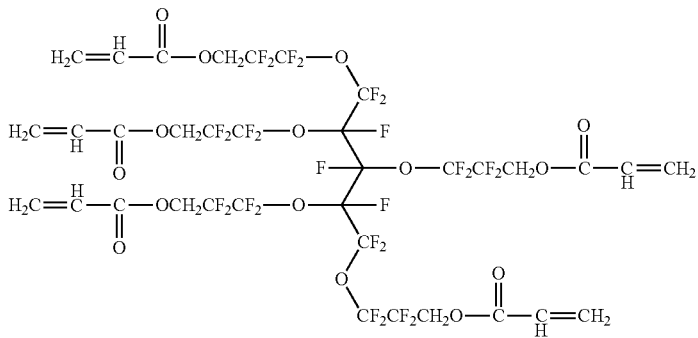

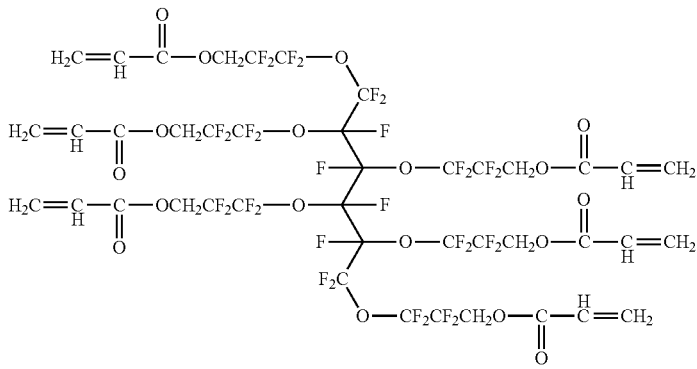

F-23

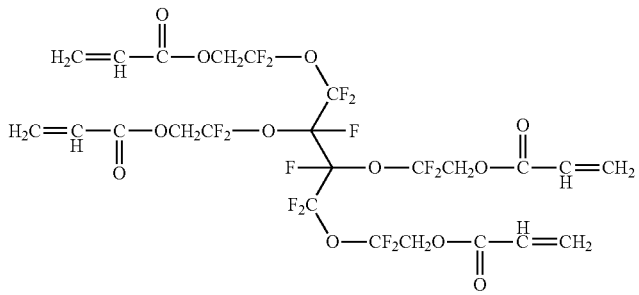

F-24

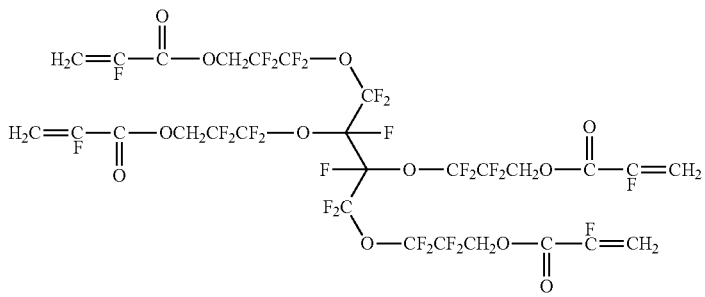

F-25

The method of manufacturing the polyfunctional fluorine-containing curable compound represented by the general formula (I) of the present invention is not particularly limited; however, manufacturing can be performed, for example, by a combination of known methods described below. Here, in the following description, unless otherwise indicated, the previously used symbols have the same meanings as those described above.

Step 1: A step of subjecting a compound represented by Rh(CO$_2$R$_1$)a or Rh(CH$_2$OCOR$_2$)a to a liquid phase fluorination reaction and a subsequent reaction with methanol described in U.S. Pat. No. 5,093,432A and WO00/56694A to obtain a methyl ester of Rf(CO$_2$CH$_3$)a.

(In the formula, R$_1$ represents a lower alkyl group such as a methyl group or an ethyl group, R$_2$ represents an alkyl group, preferably a fluorine-containing alkyl group, and more preferably a perfluoroalkyl group, and Rh represents a group capable of becoming Rf by a liquid phase fluorination reaction.)

Step 2: A step of reducing a compound represented by Rf(CO$_2$CH$_3$)a with a reducing agent such as hydrogenated lithium aluminum and hydrogenated boron sodium to obtain an alcohol of Rf(CH$_2$OH)a.

Step 3: A step of adding one or more selected from ethylene carbonate, ethylene oxide and glycidyl alcohol randomly or in blocks to the compound represented by Rf(CH$_2$OH)a to obtain Rf(CH$_2$O-L-H)a. Here, this step is not necessary when b=c=0.

Step 4: A step of introducing a polymerizable group into the compound represented by Rf(CH$_2$O-L-H)a to obtain a compound of Rf(CH$_2$O-L-Y)a represented by the general formula (1).

Here, in the case where Y is —COC(R$_0$)=CH$_2$, as the reaction of introducing a polymerizable group, an esterification reaction of the alcohol Rf(CH$_2$O-L-H)a with an acid halide XCOC(R$_0$)=CH$_2$ (wherein X represents a halogen atom, preferably a chlorine atom) or dehydration condensation with a carboxylic acid HOCOC(R$_0$)=CH$_2$ can be used. In the case where Y is another polymerizable group, for example, a nucleophilic substitution reaction with a halide compound corresponding to Rf(CH$_2$O-L-H)a can be used.

Specific preferable examples of the polyfunctional fluorine-containing curable compound are shown below; however, the present invention is not limited thereto.

In addition, from the viewpoints of improving the coated surface state and the scratch resistance of the film, X-2 to 4, X-6, X-8 to 14 and X-21 to 32 described in paragraphs [0023] to [0027] of JP2006-28409A can be preferably used as the polyfunctional fluorine-containing monomer or oligomer.

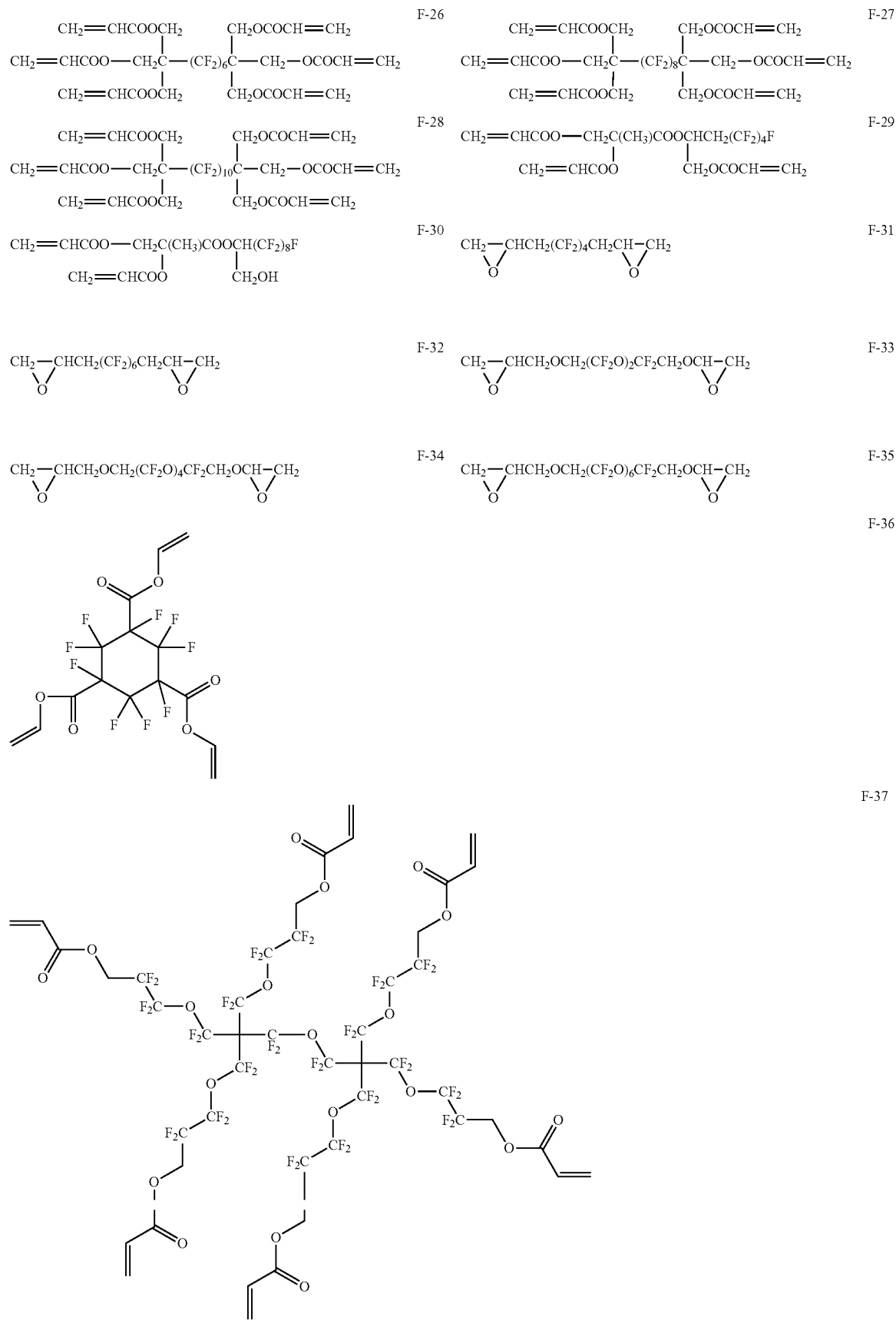

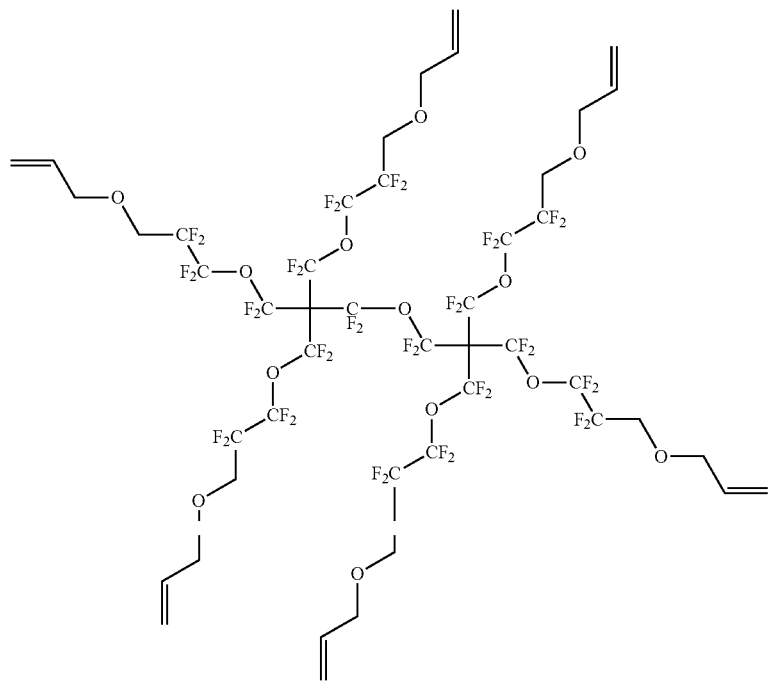
F-38
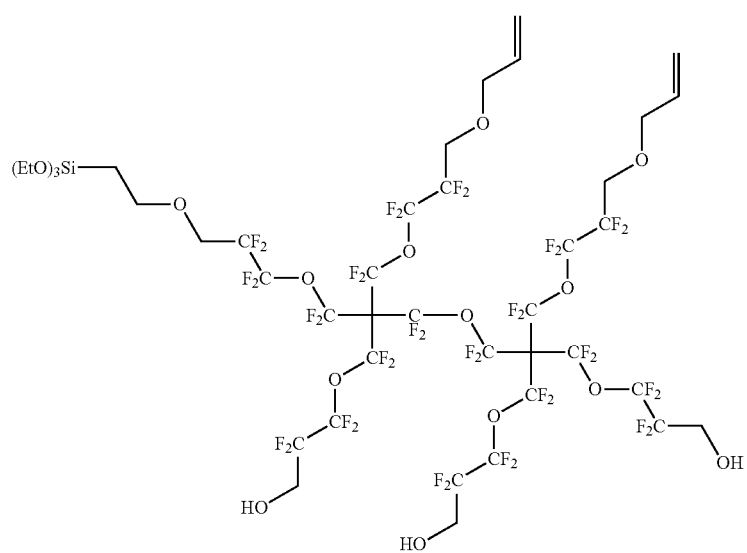
F-39

-continued
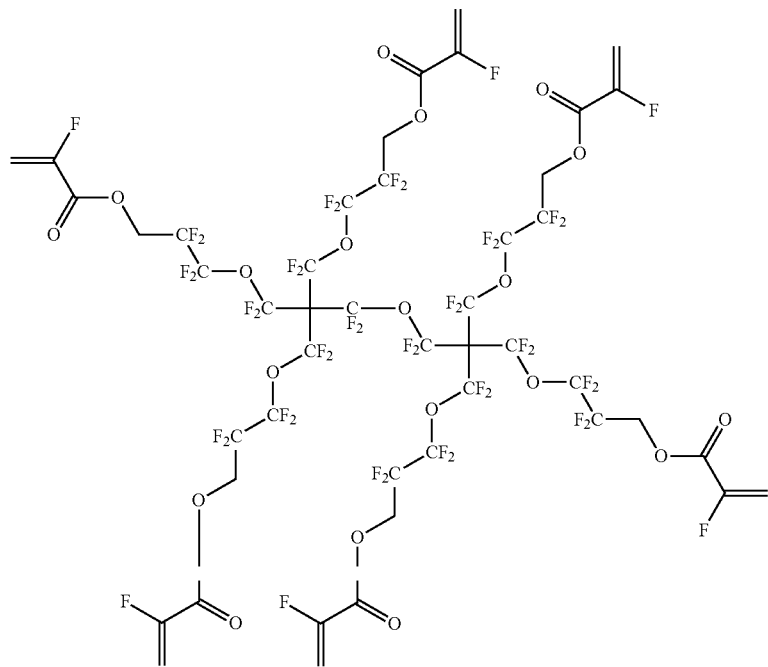
F-40
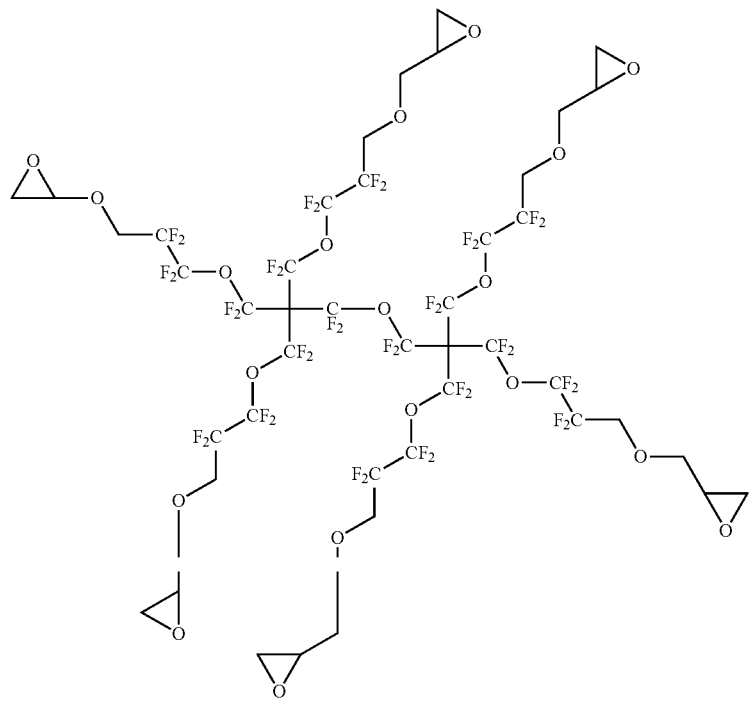
F-41

F-42
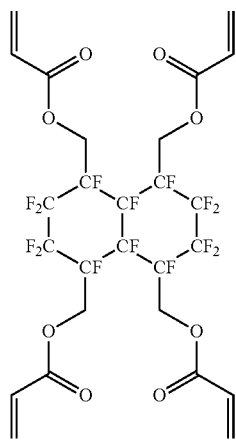
F-43
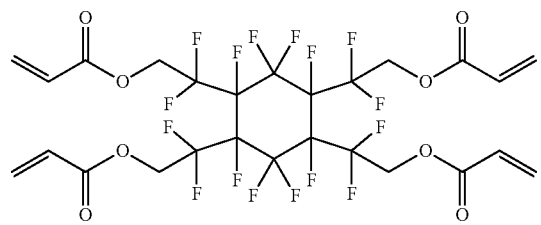
F-44
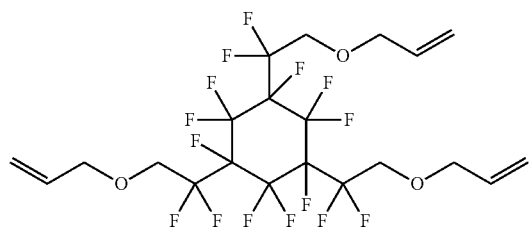
F-45
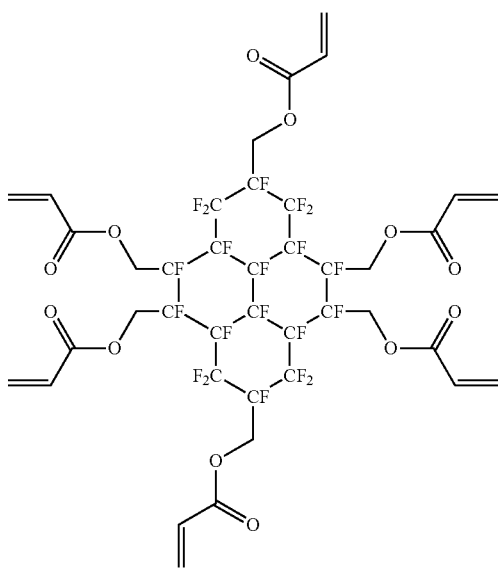
F-46
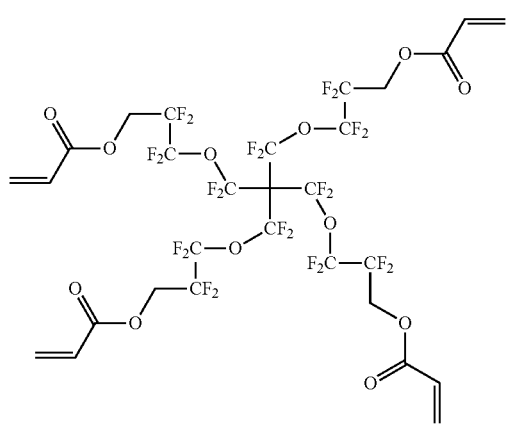
F-47
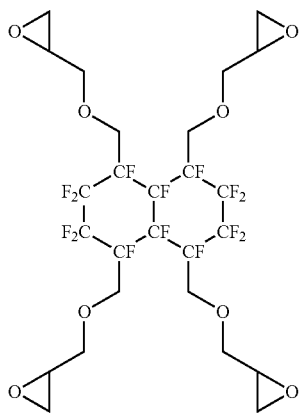

-continued
F-48
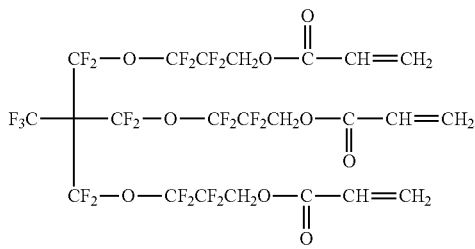
Furthermore, the following compounds can also be preferably used.
F-49
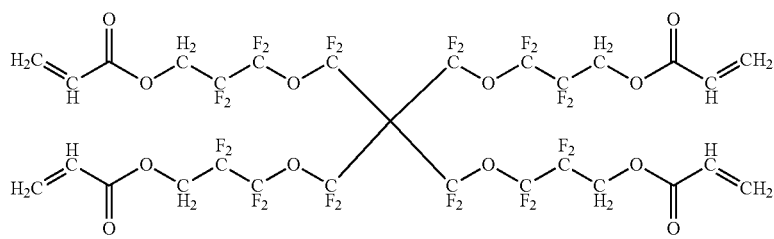
F-50
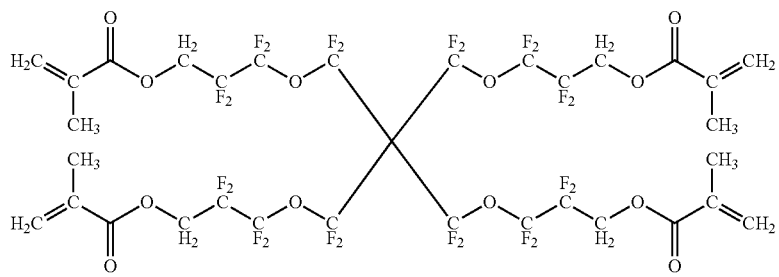
F-51
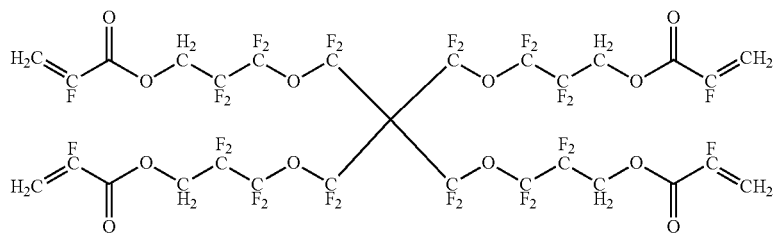
F-52
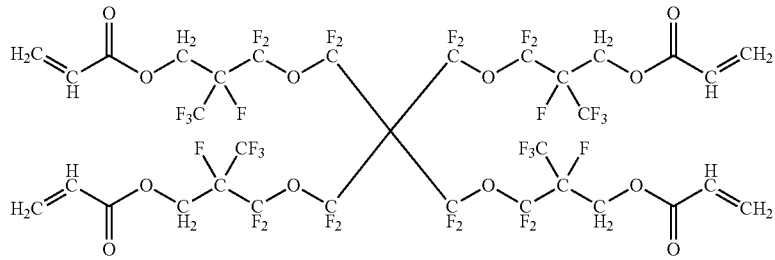

-continued
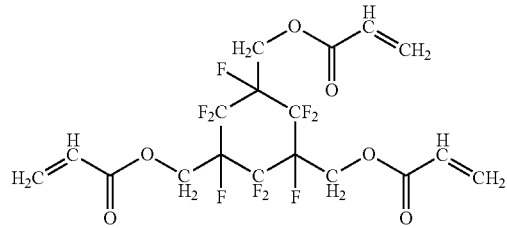
F-53
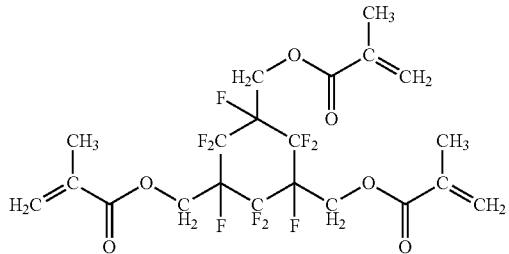
F-54
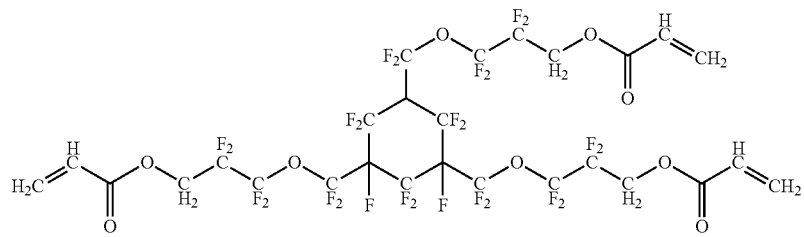
F-55
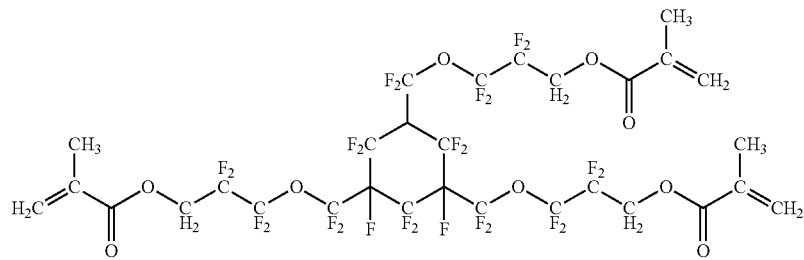
F-56
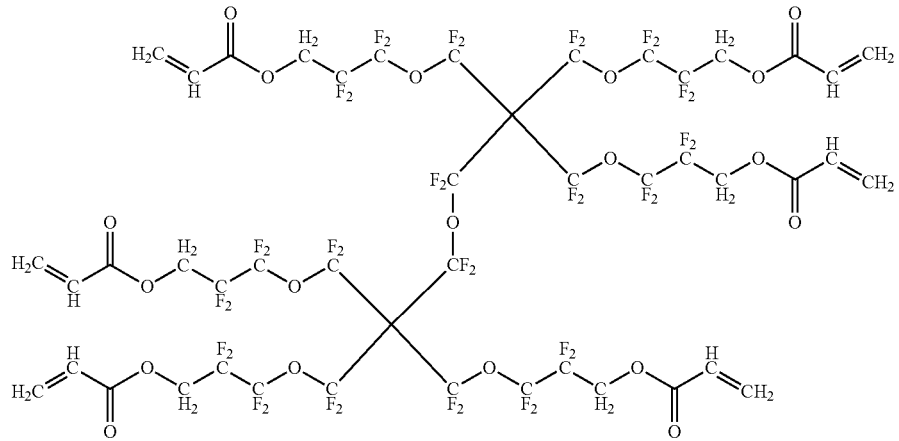
F-57

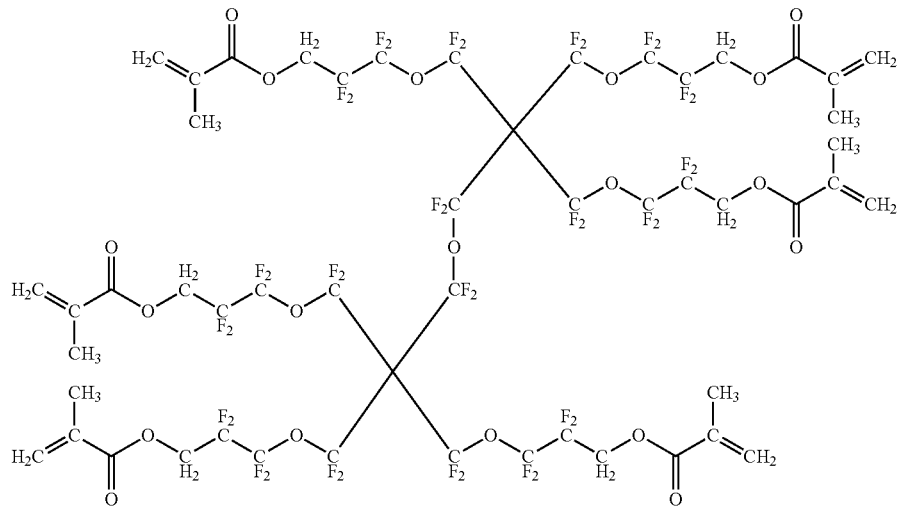
F-58
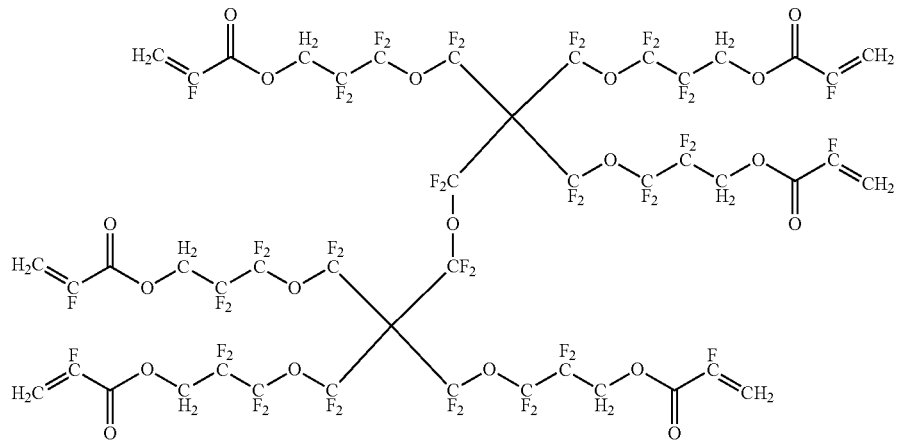
F-59
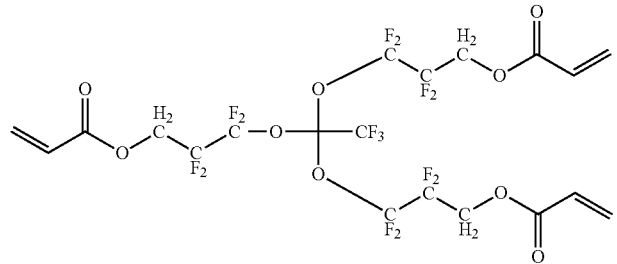
F-60
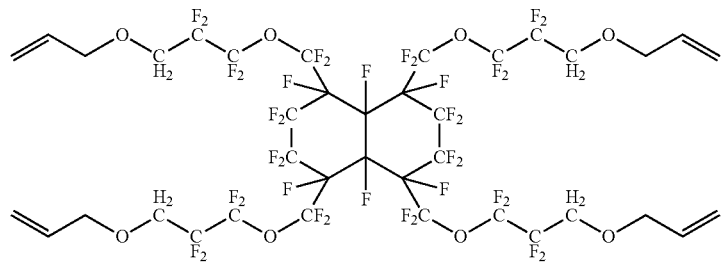
F-61

F-62
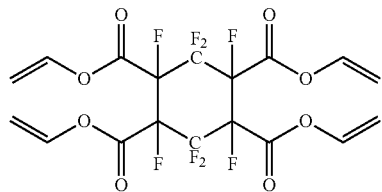
F-63
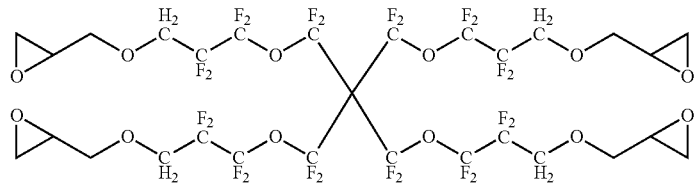
F-64
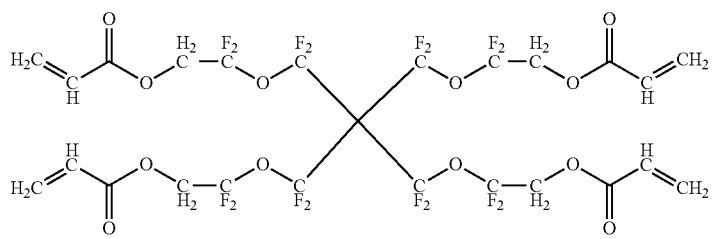
F-65
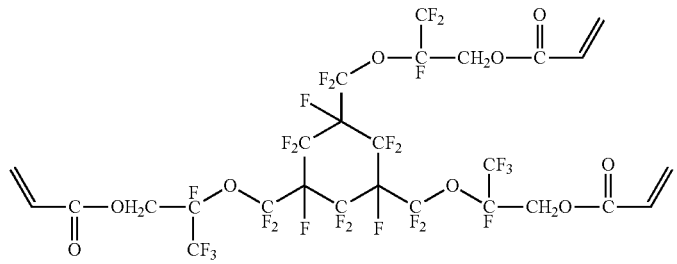
F-66
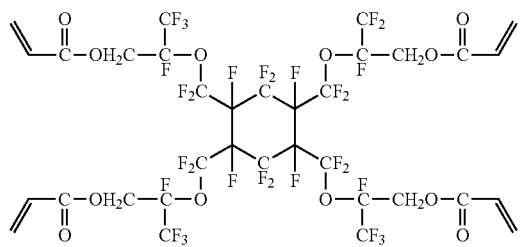
F-67
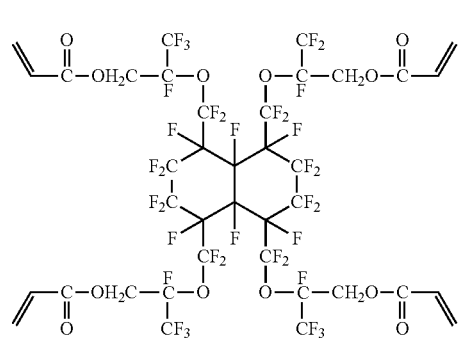
F-68
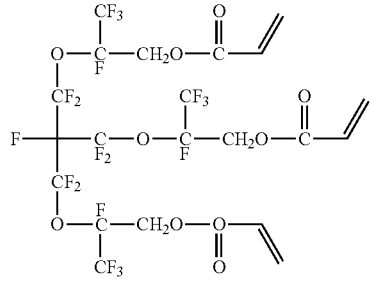
F-69
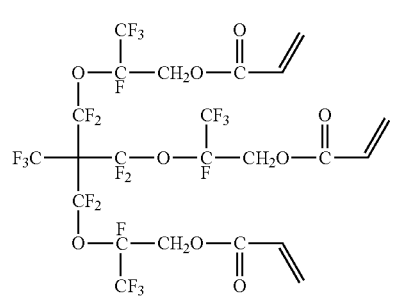

-continued
F-70
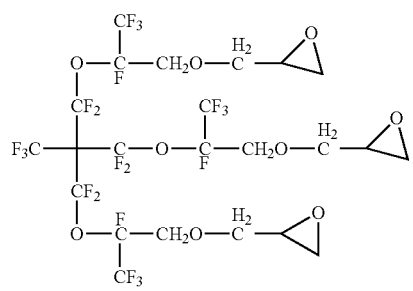
F-71
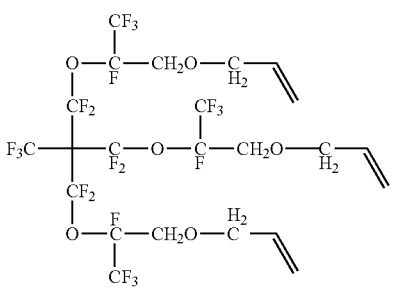
F-72
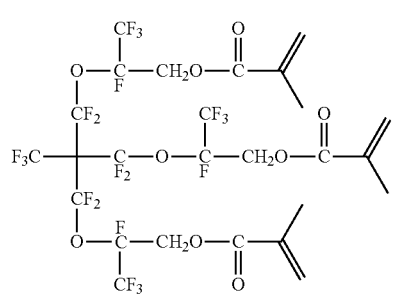
F-73
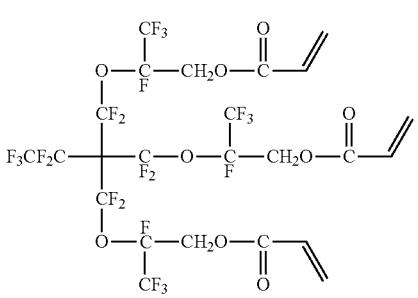
F-74
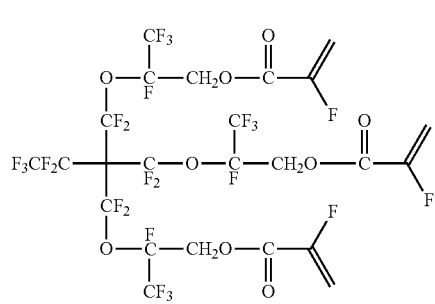
F-75
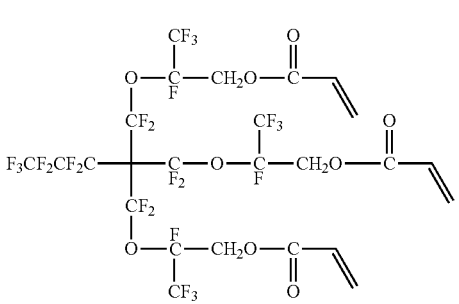
F-76
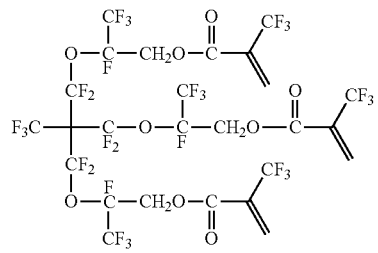
F-77
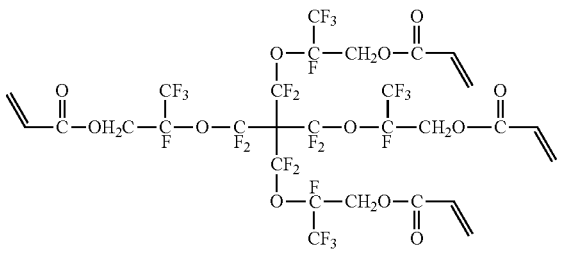
F-78
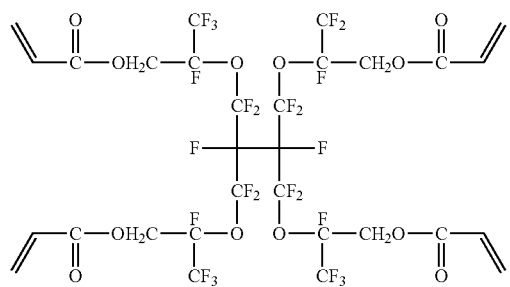
F-79
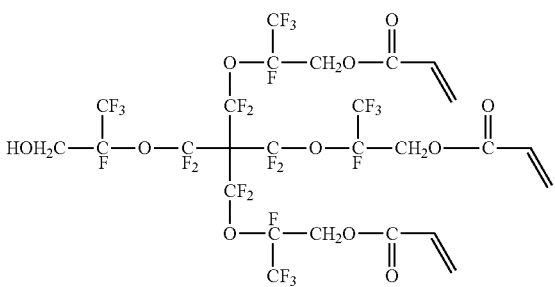

F-80
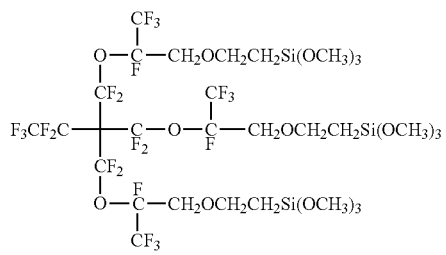

F-81
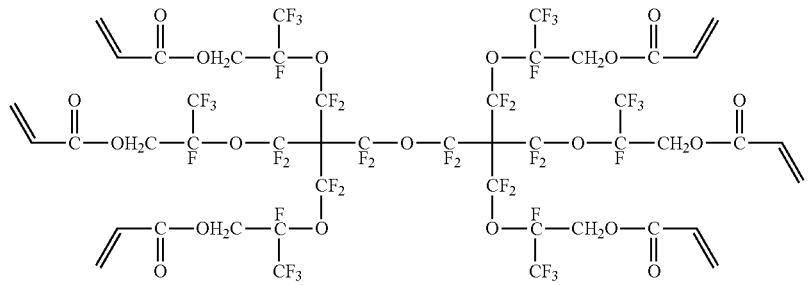

F-82
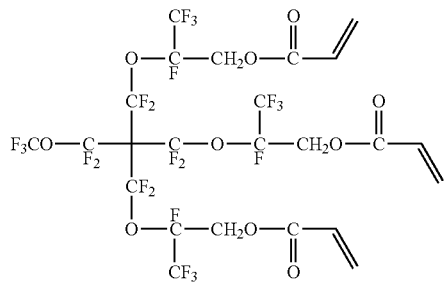

F-83
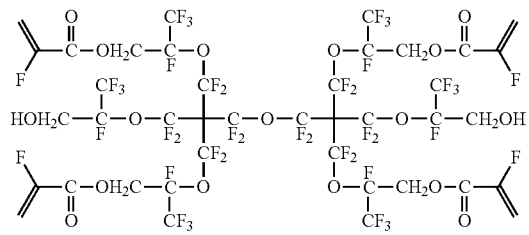

F-84
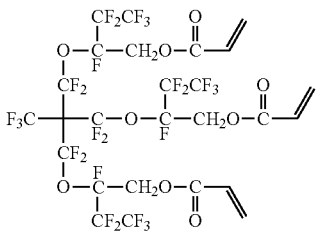

In addition, from the viewpoint of compatibility with other binders or fluorine-free monomers, a monomer having a repeating unit of an alkyl chain substituted with fluorine through an ether bond, represented by the following general formula (II), can be used as the polyfunctional fluorine-containing curable compound.

Y—(CF$_2$—CFX—O)$_{n2}$—Y   General formula (II)

(in the formula, X represents —F or —CF$_3$, n2 represents an integer of 1 to 20, and Y represents a polymerizable group.)

The preferable range and specific examples of Y are the same as those of Y in formula (I).

Specific examples of the polyfunctional fluorine-containing monomer represented by the general formula (II) are shown below; however, the present invention is not limited thereto.

CH$_2$=CH—COOCH$_2$(CF$_2$CF$_2$—O)$_2$CH$_2$OCOCH=CH$_2$   FP-1:

CH$_2$=CH—COOCH$_2$(CF$_2$CF$_2$—O)$_4$CH$_2$OCOCH=CH$_2$   FP-2:

CH$_2$=C(CH$_3$)—COOCH$_2$(CF$_2$CF$_2$—O)$_2$CH$_2$OCOC(CH$_3$)=CH$_2$   FP-3:

CH$_2$=C(CH$_3$)—COOCH$_2$(CF$_2$C(CF$_3$)F—O)$_4$CH$_2$OCOC(CH$_3$)=CH$_2$   FP-4:

CH$_2$=C(CH$_3$)—COOCH$_2$(CF$_2$C(CF$_3$)F—O)$_8$CH$_2$OCOC(CH$_3$)=CH$_2$   FP-5:

In addition, since a cross-linking structure can be formed and the strength and hardness of the cured film are high, the following polyfunctional fluorine-containing (meth)acrylic acid ester can be also preferably used as the polyfunctional fluorine-containing monomer or oligomer. Specific examples thereof include 1,3-bis{(meth)acryloyloxy}-2,2-difluoropropane, 1,4-bis{(meth)acryloyloxy}-2,2,3,3-tetrafluorobutane, 1,5-bis{(meth)acryloyloxy}-2,2,3,3,4,4-hexafluoropentane, 1,6-bis{(meth)acryloyloxy}-2,2,3,3,4,4,5,5-octafluorohexane, 1,7-bis{(meth)acryloyloxy}-2,2,3,3,4,4,5,5,6,6-decafluoroheptane, 1,8-bis{(meth)acryloyloxy}-2,2,3,3,4,4,5,5,6,6,7,7-dodecafluorooctane, 1,9-bis{(meth)acryloyloxy}-2,2,3,3,4,4,5,5,6,6,7,7,8,8-tetradecafluorononane, 1,10-bis{(meth)acryloyloxy}-2,2,3,3,4,4,5,5,6,6,7,7,8,8,9,9-hexadecafluorodecane, 1,11-bis{(meth)acryloyloxy}-2,2,3,3,4,4,5,5,6,6,7,7,8,8,9,9,10,10-octadecafluoroundecane, 1,12-bis{(meth)acryloyloxy}-2,2,3,3,4,4,5,5,6,6,7,7,8,8,9,9,10,10,11,11-eicosafluorododecane, 1,8-bis{(meth)acryloyloxy}-2,7-dihydroxy-4,4,5,5-tetrafluorooctane, 1,7-bis{(meth)acryloyloxy}-2,8-dihydroxy-4,4,5,5-tetrafluorooctane, 2,7-bis{(meth)acryloyloxy}-1,8-dihydroxy-4,4,5,5-tetrafluorooctane, 1,10-bis{(meth)acryloyloxy}-2,9-dihydroxy-4,4,5,5,6,6,7,7-octafluorodecane, 1,9-bis{(meth)acryloyloxy}-2,10-dihydroxy-4,4,5,5,6,6,7,7-octafluorodecane, 2,9-bis{(meth)acryloyloxy}-1,10-dihydroxy-4,4,5,5,6,6,7,7-octafluorodecane, 1,2,7,8-tetrakis{(meth)acryloyloxy}-4,4,5,5-tetrafluorodecane, 1,2,8,9-tetrakis{(meth)acryloyloxy}-4,4,5,5,6,6-hexafluorononane, 1,2,9,10-tetrakis{(meth)acryloyloxy}-4,4,5,5,6,6,7,7-octafluorodecane, 1,2,10,11-tetrakis{(meth)acryloyloxy}-4,4,5,5,6,6,7,7,8,8-decafluoroundecane, 1,2,11,12-tetrakis{(meth)acryloyloxy}-4,4,5,5,6,6,7,7,8,8,9,9-dodecafluorododecane, 1,10-bis(α-fluoroacryloyloxy)-2,9-dihydroxy-4,4,5,5,6,6,7,7-octafluorodecane, 1,9-bis(α-fluoroacryloyloxy)-2,10-dihydroxy-4,4,5,5,6,6,7,7-octafluorodecane, 2,9-bis(α-fluoroacryloyloxy)-1,10-dihydroxy-4,4,5,5,6,6,7,7-octafluorodecane, 1,2,9,10-tetrakis(α-fluoroacryloyloxy)-4,4,5,5,6,6,7,7-octafluorodecane, 1,2,11,12-tetrakis(α-fluoroacryloyloxy)-4,4,5,5,6,6,7,7,8,8,9,9-dodecafluorododecane, and the like.

The above polyfunctional fluorine-containing (meth)acrylic acid esters can be manufactured by a known method. For example, the manufacturing is performed using a ring-opening reaction of an equivalent fluorine-containing epoxy compound with a (meth)acrylic acid or an esterification reaction of an equivalent fluorine-containing polyhydric alcohol or a fluorine-containing (meth)acrylic acid ester having a hydroxyl group obtained as an intermediate in the ring-opening reaction, with (meth)acrylic acid chloride.

(Fluorine Content of Fluorine-Containing Monomer)

From the viewpoint of lowering the surface energy of the low refractive index inorganic fine particles in order to cause phase separation with the (C) component and achieve upper portion distribution, the fluorine content of the fluorine-containing monomer is preferably 25.0 mass % or more of the molecular weight of the fluorine-containing monomer. In addition, preferably, the fluorine content is 45.0 to 80.0 mass % and most preferably 50.0 to 80.0 mass %. In a case where the fluorine content exceeds 80.0 mass %, the fluorine atom content in the cured film is high; however, the strength and hardness of the film are deteriorated and the scratch resistance and abrasion resistance of the film surface are insufficient.

<(F) Component: High Refractive Index Inorganic Fine Particles Treated with a Surface Modifying Agent Represented by the General Formula (F-1)>

Description will be given of the high refractive index inorganic fine particles treated with a surface modifying agent represented by the general formula (F-1), which are the (F) component included in the coating composition in the present invention.

As the high refractive index inorganic fine particles, inorganic oxide fine particles are preferable, and, although the inorganic oxide fine particles are not particularly limited, oxides of elements such as zirconium (Zr), titanium (Ti), aluminum (Al), iron (Fe), copper (Cu), zinc (Zn), yttrium (Y), niobium (Nb), molybdenum (Mo), indium (In), tin (Sn), tantalum (Ta), tungsten (W), lead (Pb), bismuth (Bi), cerium (Ce), antimony (Sb), and germanium (Ge) may be used.

Examples of the oxides of the above elements include zirconium oxide ($ZrO_2$), titanium oxide ($TiO_2$), aluminum oxide ($Al_2O_3$), iron oxide ($Fe_2O_3$, FeO, $Fe_3O_4$), copper oxide (CuO, $Cu_2O$), zinc oxide (ZnO), yttrium oxide ($Y_2O_3$), niobium oxide ($Nb_2O_5$), molybdenum oxide ($MoO_3$), indium oxide ($In_2O_3$, $In_2O$), tin oxide ($SnO_2$), tantalum oxide ($Ta_2O_5$), tungsten oxide ($WO_3$, $W_2O_5$), lead oxide (PbO, $PbO_2$), bismuth oxide ($Bi_2O_3$), cerium oxide ($CeO_2$, $Ce_2O_3$), antimony oxide ($Sb_2O_3$, $Sb_2O_5$), germanium oxide ($GeO_2$, GeO), and the like. In particular, zirconium oxide ($ZrO_2$) and titanium oxide ($TiO_2$), which increase the compatibility with the resin, are preferable.

The average dispersed particle diameter of the high refractive index inorganic fine particles is preferably 1 nm or more and 20 nm or less. This is because, when the average dispersed particle diameter is less than 1 nm, the crystallinity becomes poor and it is difficult to express the particle characteristics such as the refractive index, and, when the average dispersed particle diameter of the inorganic oxide fine particles exceeds 20 nm, the transparency is decreased in a case where a dispersion liquid and a transparent compound are set.

In this manner, since the inorganic oxide fine particles are nano-size particles, even in a case where the inorganic oxide fine particles are dispersed in a resin and set as a transparent compound, the light scattering is small and the transparency of the composite can be maintained.

From the viewpoint of increasing the refractive index of the high refractive index layer after forming the coating film, the refractive index of the high refractive index inorganic fine particles is preferably 1.50 to 2.50 (wavelength of 550 nm), more preferably 1.60 to 2.30 (wavelength of 550 nm), and even more preferably 1.70 to 2.10 (wavelength of 550 nm).

[Preparation of High Refractive Index Inorganic Fine Particle Dispersion]

It is preferable that high refractive index inorganic fine particles, a surface modifying agent modifying the surface of the high refractive index inorganic fine particles, and a dispersion medium are mixed, the surface of the high refractive index inorganic fine particles is modified by the surface modifying agent, then, a dispersion process is performed and the high refractive index inorganic fine particles of which the surface is modified by the surface modifying agent are dispersed in the dispersion medium to take the form of a high refractive index inorganic fine particles dispersion liquid.

[Dispersion Method of High Refractive Index Inorganic Fine Particles]

A dispersion method in which the high refractive index inorganic fine particles are chemically bonded at the surface by surface modifying agent processing in an organic solvent or the coating composition in order to achieve uniform dispersion is desirable. Unmodified high refractive index inorganic fine particles for which the surface modifying agent processing is not performed cannot be dispersed in the organic solvent or the coating composition, and aggregation and precipitation occur. In addition, in the dispersion methods using a known low molecule weight or a polymer-type cationic, nonionic, or anionic dispersing agent, there is a problem in that, when mixing is performed with low refractive index particles having comparatively high polarity, aggregation and precipitation occur in the coating liquid.

[Surface Modifying Agent of High Refractive Index Inorganic Fine Particles]

The surface modifying agent of the high refractive index inorganic fine particles is represented by the following general formula (F-1).

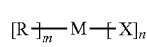

(F-1)

In the general formula (F-1), R represents an organic group having one or more carbon atoms, M represents a metal atom selected from silicon, zirconium, or titanium, and X represents an alkoxy group or a halogen atom. m represents an integer of 1 to 3 and n represents an integer of 1 to 3. In a case where there is more than one of R and X, they may respectively be the same or different.

In the general formula (F-1), R is preferably an organic group having 3 or more and 50 or less carbon atoms, and more preferably an organic group having 5 or more and 30 or less carbon atoms.

X is preferably an alkoxy group.

As the surface modifying agent, ones having one or two or more selected from a group of a vinyl group, a styryl group, an acryl group, a methacryl group, an acryloxy group, an epoxy group, a carbon-carbon double bond, a phenyl group, and a methylphenyl group are preferably used.

Examples of the above surface modifying agents include alkoxysilane compounds, siloxane compounds, and the like.

Among the above surface modifying agents, a silane coupling agent is particularly preferable as the alkoxysilane compound.

Examples of the silane coupling agent include vinyl trimethoxysilane, vinyl triethoxysilane, vinyl triphenoxysilane, p-styryl trimethoxysilane, p-styryl triethoxysilane, p-styryl triphenoxysilane, 3-acryloxypropyltrimethoxysilane, 3-acryloxypropyl triethoxysilane, 3-acryloxypropyl triphenoxysilane, 3-methacryloxypropyl trimethoxysilane, 3-methacryloxypropyl triethoxysilane, 3-methacryloxypropyl triphenoxysilane, 3-aminopropyl trimethoxysilane, 3-mercaptopropyl trimethoxysilane, 3-mercaptopropyl triethoxysilane, allyl trimethoxysilane, allyl triethoxysilane, allyl triphenoxysilane, methyl trimethoxysilane, dimethyl dimethoxysilane, trimethyl methoxysilane, n-propyl trimethoxysilane, n-butyl triethoxysilane, n-hexyl trimethoxysilane, n-hexyl triethoxysilane, n-octyl triethoxysilane, n-decyl trimethoxysilane, phenyl trimethoxysilane, diphenyl dimethoxysilane, and the like.

Methods modifying the surface of the inorganic oxide fine particles using the above-described surface modifying agent include a wet method, a dry method, and the like.

The wet method is a method modifying the surface of the inorganic oxide fine particles by inserting and mixing the surface modifying agent and the inorganic oxide fine particles into the solvent.

The dry method is a method modifying the surface of the inorganic oxide fine particles by introducing and mixing the surface modifying agent and the dried inorganic oxide fine particles into a dry mixing machine such as a mixer.

The mass ratio of the modified portion of the surface-modified high refractive index inorganic oxide fine particles is preferably 1 mass % or more and 50 mass % or less of the total amount of the particles, more preferably 2 mass % or more and 30 mass % or less, and even more preferably 3 mass % or more and 25 mass % or less.

Here, the reason for limiting the mass ratio of the modified portion to 1 mass % or more and 50 mass % or less is that, if the mass ratio of the modified portion is less than 1 mass %, compatibility with the resin of the inorganic oxide fine particles is made difficult, and transparency is lost during conjugation with the resin, and, on the other hand, if the mass ratio of the modified portion exceeds 50 mass %, the influence of the surface treatment agent on the resin characteristics is great and the composite characteristics such as the refractive index deteriorate.

Examples of dispersion solvents of the high refractive index inorganic fine particles which may be suitably used include alcohols such as methanol, ethanol, 2-propanol, butanol, and octanol; esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether(methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone, methyl isobutyl ketone, acetylacetone, and cyclohexanone; aromatic hydrocarbons such as benzene, toluene, xylene, and ethylbenzene; and amides such as dimethylformamide, N,N-dimethyl acetoacetamide, and N-methylpyrrolidone, and one or two or more of the above solvents can be used.

[Structure of Anti-Reflection Film]

The anti-reflection film of the present invention is an anti-reflection film obtained by the above method.

By having, in order, a step of coating the coating composition of the present invention on a substrate to form a coating film, a step of drying the coating film by volatilizing the solvent from the coating film, and a step of curing the coating film to form a cured layer, in this order, and a cured film having a multi-layer structure with different refractive indices is obtained. The multi-layer structure is preferably substantially a two-layer structure. The two layers formed by the separation are configured by a low refractive index layer in which the (B) component is distributed at the air interface side and a high refractive index layer in which the (F) component is distributed at the substrate interface side. In the present invention, it is preferable that the low refractive index layer is configured to have the (B) component and a component derived from the (A) component as the main components and that the high refractive index layer is configured to have a component derived from the (C) component and the (F) component as the main components. In the present invention, in the low refractive index layer, the (A) and (B) components are preferably present in a concentration of 1.5 times or more the average density of entire layers of the coating film which is formed from the coating composition of the present invention, more preferably 1.8 times or more, and even more preferably 1.9 to 2.0 times. In the high refractive index layer, the (C) and (F) components are preferably present in a concentration of 1.5 times or more the average density of entire layers of the coating film which is formed from the coating composition of the present invention, more preferably 1.8 times or more, and even more preferably 1.9 to 2.0 times. In addition, in the low refractive index layer, the (B) component is preferably present at a density of 20 to 90 vol %, more preferably 30 to 80 vol %, and most preferably 40 to 70 vol %. In the same manner, in the high refractive index layer, the (B) component is preferably present at a density of 20 to 90 vol %, more preferably 30 to 80 vol %, and most preferably 40 to 70 vol %.

The multi-layer structure having different refractive indices of the cured film obtained by coating the composition is a structure configured of at least two layers of a low refractive index layer in which the (B) component is distributed at the air interface side and a high refractive index layer in which the (F) component is distributed at the substrate interface side, and may be a layer (a layer in which a component derived from the (A) component and a component derived from the (C) component are mixed, a layer in which the (B) component and a component derived from the (C) component are mixed, a layer in which a component derived from the (A) component and a component derived from the (F) component are mixed, a layer in which the (B) component and a component derived from the (F) component are mixed, a layer in which a component derived from the (A) component, the (B) component, a component derived from the (C) component, and the (C) component are mixed, or the like) in which the constituent components are mixed in the vicinity of the interface of the two layers in a range in which the actual performance is not impaired.

A component derived from the (E) component of the present invention is preferably present in the layer configured by the distribution of the (A) component and the (B) component.

The multi-layer structure of the cured film as the anti-reflection film of the present invention can be confirmed, for example, by cross-sectional TEM observation or by C60 sputtering ESCA observation of the obtained film. From the cross-sectional TEM, the in-film distribution state of the (B) component and the (F) component can be observed, and in the C60 sputtering ESCA, by analyzing the intensity ratio of fluorine atoms, silicon atoms, or elements (at least one element from aluminum, titanium, zirconium, zinc, indium, tin, antimony, and cerium) originating from the high refractive index inorganic particles in the depth (film thickness) direction, the composition distribution in the film thickness direction of the components derived from the (A), (C), (E) and (F) components can be found.

For example, it can be observed by cross-sectional TEM that the (B) component is abundantly present on the air interface side and that the (F) component is abundantly present on the substrate interface side, and it can be observed that elements originating from the high refractive index inorganic particles are abundantly present on the substrate interface side. In addition, with C60 sputtering and ESCA, it can be observed that a layer in which fluorine atoms and silicon atoms are abundantly present is present on the air interface side, that the fluorine or silicon atoms are reduced from a depth where the film thickness from the surface of the air interface side is 80 nm to 100 nm, and that elements caused by the high refractive index inorganic particles are increased from a depth of 80 to 110 nm.

When the coating composition of the present invention is coated and dried, the (C) component, or the (F) component, of which the free energy of mixing with the component derived from the (A) component is zero or more, undergo phase separation, and the separation is started. At this time, since the component derived from the (A) component has a fluorine component or silicone component having a low surface energy, distribution to the hydrophobic interface (air interface) occurs and the (B) component covered by the component derived from the (A) component is also distributed in the upper portion at the same time, whereby a layer in which the (B) component and the component derived from the (A) component are substantially distributed can be formed. Since both the (B) component and the component derived from the (A) component are a low refractive index material, a low refractive index layer can be formed at the upper layer (the air interface side). At the same time, since the (C) component and the (F) component are distributed in the lower layer (the substrate interface side), a layer substantially configured with the component derived from the (C) component and the (F) component as the main components can be formed. Since the component derived from the (C) component and the (F) component are a high refractive index material compared with the (B) component and the component derived from the (A) component, a high refractive index layer can be formed to produce a refractive index difference, whereby an anti-reflection ability can be obtained.

In addition, it can be said that, by performing the upper portion distribution of the low refractive index inorganic fine particles and the lower portion distribution of the high refractive index inorganic fine particles at the same time, the scratch resistance is improved and, since the use amount may be small, it is excellent in terms of cost.

In addition, when the (E) component of which the surface energy is low is used in the same manner as the (A) component, the (E) component is distributed to the upper portion, and a layer can be formed in which the (B) component, the component derived from the (A) component, and the component derived from the (E) component are substantially distributed. Furthermore, since the (E) component is a curable fluorine monomer, the scratch resistance is excellent and furthermore, a surface state improving effect is exhibited. At this time, due to the (F) component, the upper portion distribution property of the (A) component, the (B) component, and the (E) component is further improved.

The film thickness of the low refractive index layer prepared by a step of coating the coating composition of the present invention on a substrate to form a coating film, a step of volatilizing the solvent from the coating film and drying the coating film, and a step of curing the coating film to form a cured layer, indicates, in the cross-sectional TEM photograph of the coating film, the region where the low refractive index inorganic fine particles which are the (B) component are present in a concentration of 1.8 times or more the average density of entire layers of the coating film which is formed from the coating composition of the present invention, and the film thickness is preferably from 40 to 200 nm, more preferably from 50 to 150 nm, and even more preferably from 60 to 110 nm The film thickness of the high refractive index layer prepared by a step of coating the coating composition of the present invention on a substrate to form a coating film, a step of volatilizing the solvent from the coating film and drying the coating film, and a step of curing the coating film to form a cured layer, indicates, in the cross-sectional TEM photograph of the coating film, the region where the high refractive index inorganic fine particles which are the (F) component are present in a concentration of 1.8 times or more the average density of entire layers of the coating film which is formed from the coating composition of the present invention, and the film thickness is preferably 40 to 200 nm, more preferably 50 to 170 nm, and even more preferably 70 to 130 nm The film thickness of the cured layer (high refractive index layer and low refractive index layer) which is prepared by a step of coating the coating composition of the present invention on a substrate to form a coating film, a step of volatilizing the solvent from the coating film and drying the coating film, and a step of curing the coating film to form a cured layer, may be determined by cross-sectional TEM, and is preferably 100 to 300 nm, more preferably 150 to 280 nm, and even more preferably 180 to 230 nm The refractive index of the low refractive index layer in which the (B) component of the anti-reflection film of the present invention is distributed is preferably 1.25 to 1.48, more preferably 1.28 to 1.45 and even more preferably in the range of 1.30 to 1.40. If the refractive index is excessively high, it causes a deterioration in the anti-reflection ability, and, furthermore, if it is excessively low, it causes a deterioration in the scratch resistance.

The refractive index of the high refractive index layer in which the (F) component of the anti-reflection film of the present invention is distributed and the component derived from the (C) component is set as the main component is preferably 1.55 to 1.90, more preferably 1.85 to 1.70, and even more preferably in the range of 1.60 to 1.80.

In the anti-reflection film of the present invention, the "multi-layer structure having different refractive indices" is preferably a multi-layer structure in which the refractive index difference between the layer with the highest refractive index and the layer with the lowest refractive index is 0.10 to 0.62, and more preferably 0.15 to 0.62.

When the coating composition is coated on the substrate, the refractive indices and the film thicknesses of the layer having the above-described multi-layer structure may naturally be designed so as to be optimized; however, according to the purpose, an intermediate refractive index layer for further deteriorating the reflectivity, an antistatic function layer for preventing the attachment of dust, a hard coating layer for imparting physical strength, an anti-glare layer for imparting an anti-glare property, and the like can be provided.

In a case of preparing the anti-reflection film using the manufacturing method of the present invention, the coating composition of the present invention may be coated on a transparent film substrate as the substrate. In such a case, examples of preferable embodiments with good the optical characteristics, physical characteristics, and the like can include configurations of [film substrate/high refractive index layer/low refractive index layer], [film substrate/hard coating layer/high refractive index layer/low refractive index layer], [film substrate/undercoat layer/high refractive index layer/low refractive index layer], [film substrate/conductive layer/high refractive index layer/low refractive index layer], [film substrate/interference unevenness preventing layer/high refractive index layer/low refractive index layer], [film substrate/light-diffusing layer/high refractive index layer/low refractive index layer], and [film substrate/adhesion layer/high refractive index layer/low refractive index layer].

[Substrate]

The substrate which can be used in the present invention may be any substrate as long as various layers can be stacked thereon; however, from the viewpoint of continuous transportation leading to high productivity, a film substrate is preferable.

The film substrate is not particularly limited as long as it has an excellent visible light transmittance (preferably a light transmittance of 90% or more) and excellent transparency (preferably a haze value of 1% or less). Specific examples thereof include a film composed of transparent polymers such as polyester-based polymers such as polyethylene terephthalate, and polyethylene naphthalate; a cellulose-based polymer such as diacetyl cellulose, and triacetyl cellulose; polycarbonate-based polymers; and acrylic polymers such as polymethyl methacrylate. In addition, examples include films composed of transparent polymers such as styrene-based polymers such as polystyrene, and acrylonitrile.styrene copolymers; olefin-based polymers such as polyethylene, polypropylene, cyclic or norbornene structure-containing polyolefin, and ethylene.propylene copolymers; vinyl chloride-based polymers; and amide-based polymers such as nylon, and aromatic polyamides. In addition, examples include films formed of transparent polymers such as imide-based polymers, sulfone-based polymers, polyethersulfone-based polymers, polyether ketone-based polymers, polyphenylene sulfide-based polymers, vinyl alcohol-based polymers, vinylidene chloride-based polymers, vinyl butyral-based polymers, arylate-based polymers, polyoxymethylene-based polymers, epoxy-based polymers, and blends of the above polymers. In particular, ones having a low optical birefringence may be suitably used.

The thickness and width of the film substrate can be appropriately determined. In consideration of, for example, the workability, such as the strength and handling property, and the thin-layer property, generally, the thickness of the film substrate is set to approximately 10 to 500 μm. In particular, 20 to 300 μm is preferable and 30 to 200 μm is more preferable. The width of the film substrate is suitably for use at 100 to 5,000 mm, preferably 800 to 3,000 mm, and more preferably 1,000 to 2,000 mm. Furthermore, the refractive index of the film substrate is not particularly limited and is usually approximately 1.30 to 1.80, and, in particular, 1.40 to 1.70 is preferable.

The surface of the substrate is preferably smooth, and the value of the arithmetic average roughness Ra is preferably 1 μm or less and preferably 0.0001 to 0.5 μm, and more preferably from 0.001 to 0.1 μm. Measuring the arithmetic average roughness (Ra) in the anti-reflection film of the present invention can be performed in accordance with JIS B 0601: 2001.

[Manufacturing Method of Anti-Reflection Film]

The anti-reflection film of the present invention can be manufactured by a coating composition coating step, a drying step, and a curing step and, by using the film substrate as described above, the coating, drying and curing step can be continuously performed, and high productivity can be realized. At this time, the obtained laminate is a film-like laminate, that is, an anti-reflection film is prepared. Description will be given of the respective steps below. Here, the manufacturing method of the present invention may contain other steps, other than the above steps.

(Coating Step)

As the coating method in the manufacturing method of the present invention, for example, a known method such as a dip coating method, an air knife coating method, a curtain coating method, a roller coating method, a wire bar coating method, a gravure coating method, an extrusion coating method (die coating method) (refer to U.S. Pat. No. 2,681,294A) or a microgravure coating method, is used, and, among these, a microgravure coating method and a die coating method are preferably used from the viewpoints of high productivity and uniformity of the coating film.

[Step for Extrusion on Substrate Using Slot Die]

In order to supply the film of the present invention with high productivity, an extrusion coating method (die coating method) is preferably used. In particular, regarding die coaters which can be preferably used in regions having a small wet coating amount (20 cc/m$^2$ or less), such as a hard coating layer or an anti-reflection layer, for example, JP2007-293313A and the like can be used as a reference, and the same applies to the present invention.

(Drying Step)

In the manufacturing method of the present invention, after coating the coating composition of the present invention on a substrate, the substrate is transported by a web to a heated zone for drying the solvent. The temperature in the drying zone at this time is preferably from 0° C. to 140° C., and more preferably from 10° C. to 120° C. and it is also suitable to perform adjustments in order that the temperature in the first half of the drying zone is comparatively low and the temperature in the latter half is comparatively high. However, it is necessary to set a temperature lower than that at which at which components other than the solvent contained in the coating composition start volatilizing. The drying step is not restricted other than the above preferable drying conditions, and a method which can be used for normal drying after coating can be used.

(Curing Method)

In the present invention, after the step of coating the coating film and the step of drying the coating film, the laminate can be cured by ultraviolet irradiation and/or heat. Here, curing by ultraviolet irradiation indicates curing the film by irradiating the dried film with ultraviolet rays using a low-pressure mercury lamp, a medium-pressure mercury lamp, a high-pressure mercury lamp, an ultrahigh-pressure mercury lamp, a carbon arc lamp, a metal halide lamp, a xenon lamp, or the like, or a light source such as an ArF excimer laser, a KrF excimer laser, an excimer lamp or a synchrotron radiation light.

The irradiation conditions vary according to respective lamps used in the irradiation; however, the irradiation dose is preferably 20 to 10,000 mJ/cm$^2$, more preferably 100 to 2,000 mJ/cm$^2$, and particularly preferably 150 to 1,000 mJ/cm$^2$.

In the case of curing by ultraviolet ray irradiation, each layer may be irradiated one layer at a time, or irradiation may be performed after lamination. For the purpose of promoting the laminate surface curing during the ultraviolet ray irradiation, the oxygen concentration can be decreased by purging with a nitrogen gas or the like. The oxygen concentration in the environment where curing is performed is preferably 5% or less. In the case where the uppermost layer of the laminate forms a low refractive index layer as in the anti-reflection film of the present invention, the oxygen concentration is preferably 0.1% or less, more preferably 0.05% or less, and most preferably 0.02% or less.

The laminate obtained by the manufacturing method of the present invention preferably has a particle-containing layer. In addition, the laminate preferably has an anti-reflection function.

[Hard Coating Layer]

In the anti-reflection film of the present invention, a hard coating layer can be provided on one surface of the substrate so as to impart physical strength.

From the viewpoints of imparting sufficient durability and impact resistance as well as of curling, productivity and cost, the film thickness of the hard coating layer is generally approximately 0.5 µm to 50 µm. The thickness is preferably 1 to 30 µm, more preferably 2 to 20 µm, and most preferably 3 to 15 µm.

In addition, using the pencil hardness test, the strength of the hard coating layer is preferably H or more, more preferably 2H or more, even more preferably 3H or more, and most preferably 5H or more.

Furthermore, in the Taber test according to JIS K5400, the smaller the abrasion loss of the specimen before and after testing, the more preferable it is.

In view of optical design, reflectivity, color tint, unevenness and cost, the refractive index of the hard coating layer is preferably in the range of 1.48 to 1.75, more preferably 1.49 to 1.65, and even more preferably 1.50 to 1.55.

In the case of imparting an anti-glare function by the surface scattering of the hard coating layer, the surface haze (a value obtained by subtracting the internal haze value from the total haze value; the internal haze value can be measured by eliminating unevenness on the film surface using a substance having the same refractive index as the film surface) is preferably 0.1 to 20%, more preferably 0.2 to 5%, and particularly preferably from 0.2 to 2%. If the surface haze is excessively large, the bright-room contrast is adversely affected, whereas if it is excessively small, background reflection is increased.

In addition, in the case of imparting internal scattering by including light-transmitting particles in the hard coating layer, the preferable range of the internal haze may vary depending on the purpose; however, in a case of imparting a function of reducing the visibility of the liquid crystal panel pattern, color unevenness, brightness unevenness, glaring or the like due to the effect of internal scattering or of enlarging the viewing angle according to the scattering, the internal haze value is preferably from 0 to 60%, more preferably from 1 to 40%, and particularly preferably from 10 to 35%. If the internal haze is excessively large, the front contrast is reduced and a sense of fading is increased. If the internal haze is excessively small, the combination of materials is limited, making it difficult to combine the anti-glare property and other characteristic values, and incurring a high cost. On the other hand, in a case where the front contrast is considered important, the value is preferably 0 to 30%, more preferably 1 to 20%, and most preferably 1 to 10%.

In addition, regarding the uneven shape of the hard coating layer surface, the arithmetic average roughness (Ra) is preferably set to 0.30 µm or less. Ra is more preferably from 0.01 to 0.20 µm, and even more preferably from 0.01 to 0.12 µm. If Ra is large, there may be problems such as that white-blurring caused by surface scattering may occur or that it may be difficult to obtain uniformity in the layer formed on the hard coating layer.

[Intermediate Refractive Index Layer]

In the present invention, an intermediate refractive index layer can be provided between the substrate (transparent support) provided with a hard coating layer or an anti-glare layer and the high refractive index layer.

The refractive index of the intermediate refractive index layer is adjusted to be an intermediate value between the refractive index of the hard coating layer or the anti-glare layer and the high refractive index, and is preferably 1.55 to 1.80, and more preferably 1.55 to 1.70.

In addition, it is preferable that the film thickness of the intermediate refractive index layer in the present invention be 150 nm or less, more preferably 20 to 150 nm, and even more preferably 30 to 130 nm.

The intermediate refractive index layer contains a curable binder (for example, a polyfunctional monomer, polyfunctional oligomer, or the like) and high refractive index inorganic fine particles for controlling the refractive index.

In addition, the high refractive index inorganic fine particles used in the intermediate refractive index layer are preferably oxides including at least one element from aluminum, titanium, zirconium, zinc, indium, tin, antimony, and cerium.

In addition, the average particle diameter of the high refractive index inorganic fine particles of the intermediate refractive index layer is preferably 50 nm or less and particularly preferably 5 to 40 nm.

The high refractive index inorganic fine particles of the intermediate refractive index layer are preferably contained at 30 to 90 mass % with respect to the total solid content of the intermediate refractive index layer, and more preferably contained at 40 to 90 mass %.

[Conductive Layer]

In the anti-reflection film of the present invention, a conductive layer can be provided for antistatic prevention, whereby dust adhesion can be prevented on the anti-reflection film surface. The conductive layer may be provided as a single layer separately from each layer, or any of the laminated layers can be provided as a dual-purpose layer also acting as the conductive layer.

The film thickness of the conductive layer is preferably 0.01 µm to 10 µm, more preferably 0.03 µm to 7 µm, and most preferably 0.05 µm to 5 µm. The surface resistance SR (Ω/sq) of the conductive layer is, as log SR, preferably 5 to 12, more preferably 5 to 11, and most preferably 6 to 10. The surface resistance of the conductive layer can be measured by a known measuring method and, for example, can be measured by a four-point probe method.

(Interference Unevenness Preventing Layer)

In the anti-reflection film of the present invention, an interference unevenness preventing layer can be provided for the purpose of preventing interference unevenness, whereby interference unevenness on the anti-reflection film surface can be prevented. The interference unevenness is caused by reflected light interference due to a refractive index difference between the substrate and a layer (for example, hard coating layer) coated on the substrate and the resulting change in color tint corresponding to the film thickness unevenness, and in order to prevent this problem, there is a method of preventing interference unevenness by continuously changing the refractive index between the substrate and the layer coated on the substrate, (refer to JP2003-205563A and JP2003-131007A). The above interference unevenness preventing layer may be provided on the substrate layer.

[Polarizing Plate Protective Film]

In a case of using the anti-reflection film of the present invention in a liquid crystal display apparatus, since the anti-reflection film is used as a surface protective film (polarizing plate protective film) of a polarizing film at the preparation of a polarizing plate, the adhesiveness to the polarizing film in which polyvinyl alcohol is set as the main component is preferably improved by hydrophilizing the transparent support surface on the side opposite the side having a low refractive index layer, that is, the surface on the side to be bonded with the polarizing film.

As the film substrate in the anti-reflection film, a triacetyl cellulose film is preferably used. As the technique for preparing the polarizing plate protective film in the present invention, two techniques may be considered, (1) a technique of coating and providing each of the above-described layers (for example, the hard coating layer, the medium refractive index layer, two surface layers, or the like) on one surface of a previously saponified transparent support, and (2) a technique of coating and providing each layer described above on one surface of a transparent support and saponifying the surface on the side to be bonded with the polarizing film; however, since, in (1), hydrophilization is performed up to the surface to be coated and provided with a hard coating layer and it is difficult to preserve the adhesion between the support and the hard coating layer, the technique of (2) is preferable.

[Saponification Process]

(1) Dipping Method

As a method of saponifying the substrate of the anti-reflection film, there is a dipping method. The dipping method is a technique of dipping the above-described anti-reflection film in an alkali solution under appropriate conditions to saponify all the surfaces having reactivity with an alkali throughout the entire film surface, and, since no special equipment is required, it is preferable from the viewpoint of cost. The alkali solution is preferably an aqueous sodium hydroxide solution. The concentration is preferably from 0.5 to 3 mol/l, and particularly preferably from 1 to 2 mol/l. The liquid temperature of the alkali solution is preferably from 30 to 70° C., more preferably from 40 to 60° C.

The combination of the saponification conditions is preferably a combination of comparatively mild conditions; however, it can be set according to the material or configuration of the anti-reflection film or the target contact angle.

After dipping in the alkali solution, the film is preferably sufficiently washed with water or dipped in a dilute acid to neutralize the alkali component in order that the alkali component does not remain in the film.

The surface opposite the transparent support surface having an anti-reflection layer is hydrophilized by the saponification process. The polarizing plate protective film is used by adhering the hydrophilized surface of the transparent support to the polarizing film.

The hydrophilized surface is effective for improving the adhesion to the adhesive layer in which polyvinyl alcohol is set as the main component.

In the saponification process, the contact angle with respect to the water on the transparent support surface of the opposite side to the side having a low refractive index layer is preferably lower from the viewpoint of adhesiveness to the polarizing film; however, on the other hand, in the dipping method, since the surface having a low refractive index layer is also damaged by the alkali, it is important to set minimum necessary reaction conditions. In the case of using, as an index for damage to the anti-reflection layer by the alkali, the contact angle with respect to the water of the transparent support surface of the opposite side to the side having an anti-reflection structure layer, that is, the bonding surface of the anti-reflection film, the contact angle is preferably set to 20° to 50°, more preferably from 30° to 50°, and even more preferably from 40° to 50°, particularly when the support is triacetyl cellulose. When the contact angle is 50° or less, excellent adhesiveness to the polarizing film is obtained, which is preferable. Meanwhile, when the contact angle is 20° or more, the anti-reflection film takes little damage and the physical strength and light stability are not impaired, which is preferable.

(2) Alkali Solution Coating Method

In order to avoid damage to the anti-reflection film in the dipping method, an alkali solution coating method of coating an alkali solution only on the surface of the opposite side to the surface having an anti-reflection layer under appropriate conditions, and performing heating, water washing and drying is preferably used. Here, the coating in this case signifies bringing an alkali solution or the like into contact only with respect to the surface to be saponified, and, at this time, the saponification process is preferably performed in order that the contact angle with respect to water of the bonding surface of the anti-reflection film becomes from 10 to 50°.

Since either of the above-described saponification methods (1) and (2) can be performed after unrolling from a roll-type support and forming respective layers, they may be added after the manufacturing process described above and performed by a series of operations. Furthermore, by continuously performing a step of bonding to a polarizing plate formed of a support which is unrolled in a similar manner, polarizing plates can be produced with higher efficiency than in the case of performing the same operations using sheets.

[Polarizing Plate]

The polarizing plate of the present invention has a polarizing film and the above-described anti-reflection film as a protective film protecting at least one of the front side or the back side of the polarizing film. In a preferable embodiment, the polarizing plate of the present invention is a laminate plate having two protective films protecting both surfaces of the polarizing film and at least one of the protective films is the anti-reflection film.

The polarizing plate has the anti-reflection film as at least one protective film of the polarizing film (polarizing plate protective film). The transparent support of the anti-reflection film is adhered to the polarizing film through an adhesive layer formed of polyvinyl alcohol, and another protective film of the polarizing film is adhered, through an adhesive layer, to the main surface of the polarizing film of the opposite side to the main surface to which the anti-reflection film is adhered. An adhesive layer is included on the main surface of the opposite side to the main surface adhered to a polarizing film of the other protective film.

By using the anti-reflection film of the present invention as a polarizing plate protective film, a polarizing plate having physical strength and an excellent anti-reflection function can be prepared, and the cost can be greatly reduced.

In addition, by preparing a polarizing plate using the anti-reflection film of the present invention on one side of the polarizing plate protective film and using an optically compensatory film to be described later having optical anisotropy on another side of the protective film of the polarizing film, a polarizing plate capable of improving the bright-room contrast of a liquid crystal display apparatus and greatly broadening the viewing angle in the vertical, horizontal and oblique directions can be prepared.

[Image Display Device]

Examples of the image display devices having the anti-reflection film of the present invention include a liquid crystal display (LCD), a plasma display panel (PDP), an electroluminescent display (ELD), a cathode ray tube (CRT), a field emission display (FED) and a surface-conduction electron-emitter display (SED). Among the above, the anti-reflection film of the present invention is preferably used as the surface film of a liquid crystal panel screen. Examples of the image display device provided with the polarizing plate having the anti-reflection film of the present invention include image display devices such as a liquid crystal display (LCD), and an electroluminescent display (ELD). In the image display device of the present invention, the polarizing plate having the anti-reflection film of the present invention is used by being adhered to the glass of liquid crystal cells of a liquid crystal display device directly or through another layer.

The polarizing plate using the anti-reflection film according to the present invention can be preferably used in a transmissive, reflective or transflective liquid crystal display apparatus in modes such as twisted nematic (TN), super-twisted nematic (STN), vertical alignment (VA), in-plane switching (IPS) and optically compensated bend cell (OCB).

In addition, in the case of being used in a transmissive or transflective liquid crystal display apparatus, by being used in combination with a commercially available brightness enhancing film (a polarization separation film having a polarization selection layer, for example, D-BEF manufactured by Sumitomo 3M Ltd.), a display apparatus having higher visibility can be obtained.

In addition, when combined with a λ/4 plate, the polarizing plate can be used as a polarizing plate for a reflective liquid crystal display or a surface protective plate for ELD in order to reduce reflected light from the surface and the inside.

EXAMPLES

The present invention is described in greater detail below with reference to Examples; however, the present invention is not limited thereto. Here, unless otherwise indicated, the "parts" and "%" are a value based on mass.

Example 1

Production of Base Material with Undercoat Layer

[Preparation of Coating Solution (Sub-1) for Undercoat Layer]

The respective components were mixed according to the composition shown in the following Table 4, adjusted to a solid content concentration of 40 mass % with a solvent of MEK (methyl ethyl ketone)/MIBK (methyl isobutyl ketone)/cyclohexanone=45/45/10 (mass ratio) and filtered through a filter made of polypropylene having a pore size of 30 μm to prepare a coating solution (Sub-1) for an undercoat layer.

TABLE 4

| Coating Solution Sub-1 | |
|---|---|
| Binder | DPCA-20/40 parts by mass |
| Polymerization initiator | Irgacure 184/2 parts by mass |
| Silica Sol | MIBK-ST/10 parts by mass (as solid content) |

The compounds used in the above description are shown below.
DPCA-20: Partially caprolactone-modified polyfunctional acrylate [manufactured by Nippon Kayaku Co., Ltd.]
Silica Sol: MIBK-ST, a dispersion liquid using MIBK solvents and having a solid content concentration of 30%, silica fine particle having an average particle size of about 15 nm, and a refractive index of 1.45 [manufactured by Nissan Chemicals Industries, Ltd.]
Irgacure 184: Polymerization initiator [manufactured by Ciba Specialty Chemicals Corp.]

[Preparation of Coating Solution (Sub-2) for Undercoat Layer]

The respective components were mixed according to the composition shown in the following Table 5, and adjusted to a solid content concentration of 2.5 mass % with a solvent of MEK (methyl ethyl ketone)/MIBK (methyl isobutyl ketone)=50/50 (mass ratio) to prepare a coating solution (Sub-2) for an undercoat layer.

TABLE 5

| Coating Solution Sub-2 | |
|---|---|
| Binder | DPHA/3.9 parts by mass |
| Polymerization initiator | Irgacure 127/0.1 parts by mass |
| Zirconia dispersion liquid | Z-1 (30 mass %)/11.8 parts by mass |

The compounds used in the above description are shown below.
DPHA: a mixture of dipentaerythritol pentaacrylate and dipentaerythritol hexaacrylate (manufactured by Nippon Kayaku Co., Ltd.)
Irgacure 127: Polymerization initiator [manufactured by Ciba Specialty Chemicals Corp.]

Zirconia dispersion liquid; Z-1; surface modification processed zirconia dispersion described below

[Formation of Undercoat Layer]

The coating solution (Sub-1) for the undercoat layer was coated on a triacetyl cellulose film TAC-TD80U (manufactured by Fujifilm Corp.) having a film thickness of 80 μm and a width of 1,340 mm by a die coater under conditions of a transport speed of 30 m/min and then dried at 60° C. for 150 seconds and thereafter, under purging with nitrogen (oxygen concentration: 0.5% or less), the coated film was cured by irradiation with ultraviolet rays at an illuminance of 400 mW/cm$^2$ and an irradiation dose of 150 mJ/cm$^2$ using an air-cooled metal halide lamp (manufactured by Eye Graphics Co., Ltd.) of 160 W/cm to form an undercoat layer-1 of which the film thickness after curing was 6 μm.

The coating solution (Sub-2) for the undercoat layer was coated by a die coater under conditions of a transport speed of 30 m/min and then dried at 60° C. for 60 seconds and thereafter, under purging with nitrogen (oxygen concentration: 0.5% or less), the coated film was cured by irradiation with ultraviolet rays at an illuminance of 160 mW/cm$^2$ and an irradiation dose of 60 mJ/cm$^2$ using an air-cooled metal halide lamp (manufactured by Eye Graphics Co., Ltd.) of 160 W/cm to form an undercoat layer-2 of which the film thickness after curing was 58 nm and the refractive index after curing was 1.63. At this time, the coating amount was adjusted in a range of plus or minus 20% in 5% increments in order to obtain the target film thickness.

The thus-obtained Triacetyl Cellulose Film (TAC-1) with an undercoat layer was used as the substrate used for evaluation of the coating compositions later.

[Preparation of Hollow Silica Particle Dispersion Liquid S-1]

10 parts by mass of γ-acryloyloxypropyltrimethoxysilane, 1.51 parts by mass of diisopropoxyaluminum ethyl acetate and 500 parts by mass of methyl ethyl ketone were added to and mixed with 500 parts by mass of Hollow Silica Fine Particle Sol A (isopropyl alcohol silica sol, average particle diameter: 50 nm, silica concentration: 20%, refractive index of silica particles: 1.25), and then 3 parts by mass of ion-exchanged water were added thereto. After reacting this mixed solution at 60° C. for 8 hours and then cooling to room temperature, 1.8 parts by mass of acetyl acetone were added to obtain a dispersion liquid. Thereafter, while adding cyclohexanone to keep the silica content almost constant, solvent replacement was performed by reduced-pressure distillation under a pressure of 30 Torr, and finally, by adjusting the concentration, a hollow silica particle dispersion liquid S-1 having a solid content concentration of 21.7% (silica concentration: 20%) and being surface-modified with a silane coupling agent having a polymerizable functional group was obtained.

[Preparation of Hollow Silica Particle Dispersion Liquid S-2]

While adding cyclohexanone to Hollow Silica Fine Particle Sol A (isopropyl alcohol silica sol, average particle diameter: 50 nm, silica concentration: 20%, refractive index of silica particle: 1.25) so as to keep the silica content almost constant, solvent replacement was performed by reduced-pressure distillation under a pressure of 30 Torr, and a hollow silica particle dispersion liquid S-2 having a solid content concentration of 21.7% (silica concentration: 20%) was obtained.

[Preparation of Hollow Silica Particle Dispersion Liquid S-3]

4.4 parts by mass of trimethylmethoxysilane (molecular weight defined herein as 90), 1.51 parts by mass of diisopropoxyaluminum ethyl acetate and 500 parts by mass of methyl ethyl ketone were added to and mixed with 500 parts by mass of Hollow Silica Fine Particle Sol A (isopropyl alcohol silica sol, average particle diameter: 50 nm, silica concentration: 20%, refractive index of silica particles: 1.25), and then 3 parts by mass of ion-exchanged water were added thereto. After reacting this mixed solution at 60° C. for 8 hours and then cooling to room temperature, 1.8 parts by mass of acetyl acetone were added to obtain a dispersion liquid. Thereafter, while adding cyclohexanone to keep the silica content almost constant, solvent replacement was performed by reduced-pressure distillation under a pressure of 30 Torr, and finally, by adjusting the concentration, a hollow silica particle dispersion liquid S-3 having a solid content concentration of 21.7% and being surface-modified with a trimethylsilyl group was obtained.

[Preparation of Hollow Silica Particle Dispersion Liquid S-4]

28 parts by mass of a mixture (Ab-1) (molecular weight defined herein as 660) including the silane coupling agents (example compounds (A-4) and (A-5) of JP2007-238897A), 1.51 parts by mass of diisopropoxyaluminum ethyl acetate, and 500 parts by mass of methyl ethyl ketone were added to and mixed with 500 parts by mass of hollow silica fine particle Sol A (isopropyl alcohol silica sol, average particle diameter: 50 nm, silica concentration: 20%, refractive index of silica particles: 1.25), and then 3 parts by mass of ion-exchanged water were added thereto. After reacting this mixed solution at 60° C. for 8 hours and then cooling to room temperature, 1.8 parts by mass of acetyl acetone were added to obtain a dispersion liquid. Thereafter, while adding cyclohexanone to keep the silica content almost constant, solvent replacement was performed by reduced-pressure distillation under a pressure of 30 Torr, and finally, by adjusting the concentration, a surface-modified hollow silica particle dispersion liquid S-4 having a solid content concentration of 21.7% was obtained.

[Preparation of Zirconium Oxide Particle Dispersion Liquid Z-1]

70 parts by mass of methyl isobutyl ketone as a dispersion medium and 10 parts by mass of methacryloxypropyl trimethoxysilane which is a silane coupling agent containing an acrylic group as a surface modifying agent were added and mixed with 20 parts by mass of zirconia particle powder, and the surface of the zirconia particles was modified by the surface modification agent.

Thereafter, a dispersion process was performed, and a transparent zirconia dispersion liquid (Z-1) with a solid content of 30 mass % was prepared.

[Preparation of Zirconium Oxide Particle Dispersion Liquid Z-2]

70 parts by mass of methyl ethyl ketone as a dispersion medium and 10 parts by mass of methyltrimethoxysilane (b.p. 102° C.) which is an alkoxysilane compound as a surface modification agent were added and mixed with 20 parts by mass of zirconia particle powder, and the surface of the zirconia particles was modified by the surface modification agent. Thereafter, a dispersion process was performed, and a transparent zirconia dispersion liquid (Z-2) with a solid content of 30 mass % was produced.

[Preparation of Zirconium Oxide Particle Dispersion Liquid Z-3]

27 g of zirconium oxide nano-particle powder (trade name: RC-100, Daiichi Kigenso Kagaku Kogyo Co., Ltd., primary particle size 10 nm), 1.35 g of phosphate ester dispersant (trade name: disper BYK106, manufactured by BYK), and 270 g of toluene were mixed, and roughly dispersed by ultrasound irradiation for 10 minutes under stiffing.

The obtained mixture liquid was subjected to a dispersion process using an Ultra Apex Mill UAM-015 manufactured by Kotobuki Industries Co., Ltd., which is a wet type stiffing grinder provided with a mechanism separating the media by centrifugation, and a transparent zirconia dispersion liquid (Z-3) with a solid content of 30 mass % was produced.

[Preparation of Zirconium Oxide Particle Dispersion Liquid Z-4]

70 parts by mass of water as a dispersion medium were added and mixed with 20 parts by mass of zirconia particle powder, a dispersion process was performed and a transparent zirconia dispersion liquid (Z-4) with a solid content of 30 mass % was produced.

[Preparation of Single Liquid Two-Layer Coating Composition]

As the (A) component, IPF-1 (9.2 parts by mass) solution with a solid content of 30 mass % was prepared by using a MEK solvent. 12.0 parts by mass (as the solid content amount) of S-1 of the (B) component were mixed with the (A) component, diluted with a solvent of 80/20 (mass ratio) of MEK/MIBK to obtain a solution having a solid content concentration of 2.4 mass % and left to stand for 24 hours at 25° C. Thereafter, 1.3 parts by mass of DPHA which is the (C) component, 1.8 parts by mass of F-1 which is the (E) component, and 38.7 parts by mass of Z-1 which is the (F) component were added thereto, 0.2 parts by mass of Irgacure 127 as a polymerization initiator were mixed therewith, the solid content concentration was adjusted to become 6.7 mass % with a solvent of 80/20 (mass ratio) of MEK/MIBK, whereby the coating composition of the present invention (Comp-1) was prepared.

In the same manner as (Comp-1), each component was mixed as shown in the following Table 6, and a coating composition having a solid content of 6.7 mass % was prepared.

In the coating composition, the mass ratio of [(A) component+(B) component+(E) component]/[(C) component+(F) component] was 35/65.

Here, the added amounts of each component in the following Table are in parts by mass. Furthermore, In the column of the (C) component and the (D) component, when two types or more are using, the mass ratios are also described.

TABLE 6

| | (A) component | | (B) component | | (C) component | | (D) component | (E) component | | (F) component | | Initiator | | | |
|---|---|---|---|---|---|---|---|---|---|---|---|---|---|---|---|
| | Kind | Added amount | Kind | Added amount | Kind | Added amount | Kind | Kind | Added amount | Kind | Added amount | Kind | Added amount | ΔG | Notes |
| Comp-1 | IPF-1 | 9.2 | S-1 | 12.0 | DPHA | 1.3 | MEK/MiBK = 80/20 | F-1 | 1.8 | Z-1 | 38.5 | Irg. 127 | 0.2 | 0.034 | Present Invention |
| Comp-2 | IPF-2 | 9.2 | S-1 | 12.0 | DPHA | 1.3 | MEK/MiBK = 80/20 | F-1 | 1.8 | Z-1 | 38.5 | Irg. 127 | 0.2 | 0.026 | Present Invention |
| Comp-3 | IPF-3 | 9.2 | S-1 | 12.0 | DPHA | 1.3 | MEK/MiBK = 80/20 | F-1 | 1.8 | Z-1 | 38.5 | Irg. 127 | 0.2 | 0.022 | Present Invention |
| Comp-4 | IPF-4 | 9.2 | S-1 | 12.0 | DPHA | 1.3 | MEK/MiBK = 80/20 | F-1 | 1.8 | Z-1 | 38.5 | Irg. 127 | 0.2 | 0.021 | Present Invention |
| Comp-5 | IPF-9 | 9.2 | S-1 | 12.0 | DPHA | 1.3 | MEK/MiBK = 80/20 | F-1 | 1.8 | Z-1 | 38.5 | Irg. 127 | 0.2 | 0.010 | Present Invention |
| Comp-6 | IPF-21 | 9.2 | S-1 | 12.0 | DPHA | 1.3 | MEK/MiBK = 80/20 | F-1 | 1.8 | Z-1 | 38.5 | Irg. 127 | 0.2 | 0.043 | Present Invention |
| Comp-7 | IPF-29 | 9.2 | S-1 | 12.0 | DPHA | 1.3 | MEK/MiBK = 80/20 | F-1 | 1.8 | Z-1 | 38.5 | Irg. 127 | 0.2 | 0.010 | Present Invention |
| Comp-8 | EPF-4 | 9.2 | S-1 | 12.0 | DPHA | 1.3 | MEK/MiBK = 80/20 | F-1 | 1.8 | Z-1 | 38.5 | Irg. 127 | 0.2 | 0.022 | Present Invention |
| Comp-9 | EPF-103 | 9.2 | S-1 | 12.0 | DPHA | 1.3 | MEK/MiBK = 80/20 | F-1 | 1.8 | Z-1 | 38.5 | Irg. 127 | 0.2 | 0.021 | Present Invention |
| Comp-10 | EPF-104 | 9.2 | S-1 | 12.0 | DPHA | 1.3 | MEK/MiBK = 80/20 | F-1 | 1.8 | Z-1 | 38.5 | Irg. 127 | 0.2 | 0.023 | Present Invention |
| Comp-11 | IPF-1 | 9.2 | S-1 | 12.0 | DPHA | 1.3 | MEK/MiBK = 80/20 | — | — | Z-1 | 38.5 | Irg. 127 | 0.2 | 0.023 | Comparative example |
| Comp-12 | IPF-1 | 9.2 | S-1 | 12.0 | DPHA | 1.3 | MEK/MiBK = 80/20 | MF3-3 | 1.8 | Z-1 | 38.5 | Irg. 127 | 0.2 | 0.023 | Comparative example |
| Comp-13 | IPF-1 | 9.2 | S-1 | 12.0 | DPHA | 1.3 | MEK/MiBK = 80/20 | FP-1 | 1.8 | Z-1 | 38.5 | Irg. 127 | 0.2 | 0.023 | Present Invention |
| Comp-14 | P-1 | 9.2 | S-1 | 12.0 | DPHA | 1.3 | MEK/MiBK = 80/20 | F-1 | 1.8 | Z-1 | 38.5 | Irg. 127 | 0.2 | 0.006 | Comparative example |
| Comp-15 | A-1 for comparison | 9.2 | S-1 | 12.0 | DPHA | 1.3 | MEK/MiBK = 80/20 | F-1 | 1.8 | Z-1 | 38.5 | Irg. 127 | 0.2 | -0.007 | Comparative example |
| Comp-16 | IPF-21 | 9.2 | S-1 | 12.0 | DPHA | 1.3 | MEK/PGME/MiBK = 80/5/15 | F-49 | 1.8 | Z-2 | 38.5 | Irg. 127 | 0.2 | 0.022 | Present Invention |
| Comp-17 | IPF-21 | 9.2 | S-1 | 12.0 | DPHA | 1.3 | MEK/PGME/MiBK = 80/5/15 | F-49 | 1.8 | Z-3 | 38.5 | Irg. 127 | 0.2 | 0.022 | Comparative example |
| Comp-18 | IPF-21 | 9.2 | S-1 | 12.0 | DPHA | 1.3 | MEK/PGME/MiBK = 80/5/15 | F-49 | 1.8 | Z-4 | 38.5 | Irg. 127 | 0.2 | 0.022 | Comparative example |
| Comp-19 | IPF-21 | 9.2 | S-1 | 12.0 | DPHA/TMPTA = 60/40 | 1.3 | MEK/PGME/MiBK = 80/5/15 | F-49 | 1.8 | Z-1 | 38.5 | Irg. 127 | 0.2 | 0.020 | Present Invention |
| Comp-20 | IPF-21 | 9.2 | S-1 | 12.0 | DPHA/TMPTA = 30/70 | 1.3 | MEK/PGME/MiBK = 80/5/15 | F-49 | 1.8 | Z-1 | 38.5 | Irg. 127 | 0.2 | 0.019 | Present Invention |
| Comp-21 | IPF-21 | 9.2 | S-1 | 12.0 | DPHA | 1.3 | MEK | F-49 | 1.8 | Z-1 | 38.5 | Irg. 127 | 0.2 | 0.022 | Present Invention |
| Comp-22 | IPF-21 | 9.2 | S-1 | 12.0 | DPHA | 1.3 | MEK/MiBK/methyl acetate = 70/15/15 | F-49 | 1.8 | Z-1 | 38.5 | Irg. 127 | 0.2 | 0.022 | Present Invention |
| Comp-23 | IPF-21 | 9.2 | S-1 | 12.0 | DPHA | 1.3 | MEK/2-butanol/MiBK = 80/5/15 | F-49 | 1.8 | Z-1 | 38.5 | Irg. 127 | 0.2 | 0.022 | Present Invention |
| Comp-24 | IPF-21 | 9.2 | S-2 | 12.0 | DPHA | 1.3 | MEK/PGME/MiBK = 80/5/15 | F-49 | 1.8 | Z-1 | 38.5 | Irg. 127 | 0.2 | 0.022 | Present Invention |
| Comp-25 | IPF-21 | 9.2 | S-3 | 12.0 | DPHA | 1.3 | MEK/PGME/MiBK = 80/5/15 | F-49 | 1.8 | Z-1 | 38.5 | Irg. 127 | 0.2 | 0.022 | Present Invention |
| Comp-26 | IPF-21 | 9.2 | S-4 | 12.0 | DPHA | 1.3 | MEK/PGME/MiBK = 80/5/15 | F-49 | 1.8 | Z-1 | 38.5 | Irg. 127 | 0.2 | 0.022 | Comparative example |

TABLE 6-continued

| | (A) component | | (B) component | | (C) component | | (D) component | (E) component | | (F) component | | Initiator | | | Notes |
|---|---|---|---|---|---|---|---|---|---|---|---|---|---|---|---|
| | Kind | Added amount | Kind | Added amount | Kind | Added amount | Kind | Kind | Added amount | Kind | Added amount | Kind | Added amount | ΔG | |
| Ln-1 | IPF-4 | 9.2 | S-1 | 12.0 | — | — | MEK/PGME/MiBK = 80/5/15 | F-1 | 1.8 | — | — | Irg. 127 | 0.1 | — | Comparative example |
| Hn-1 | — | — | — | — | DPHA | 1.3 | MEK/PGME/MiBK = 80/5/15 | — | — | Z-1 | 38.5 | Irg. 127 | 0.1 | — | Comparative example |

The compounds used in the above description are shown below.
DPHA: a mixture of dipentaerythritol pentaacrylate and dipentaerythritol hexaacrylate (manufactured by Nippon Kayaku Co., Ltd.)
TMPTA: Trimethylolpropane triacrylate (Daicel-Cytec Co., Ltd.)
Irgacure 127 (Irg. 127): Polymerization initiator [manufactured by Ciba Specialty Chemicals Corp.]
A-1 for Comparison: a compound having a polyalkylene oxide group not including a fluorine-containing hydrocarbon structure (in (IPF-2), a polymer in which a structural unit derived from an HFP monomer is substituted with a structural unit derived from an EVE monomer), weight average molecular weight: 25,000
MF3-3: $CH_2=CH-COOCH_2(CF_2CF_2-O)_2CH_2OCCH=CH_2$ (molecular weight 386 g/mol)
FP-1: $CH_2=CH-COOCH_2(CF_2CF_2-O)_2CH_2OCCH=CH_2$ (molecular weight 402 g/mol)
P-1

M.W. 20,000

[Formation of Laminate]

The coating composition Comp-1 was coated on the undercoat layer of the previously mentioned substrate TAC-1 by a die coater under the condition of a transport speed of 30 m/min and then dried at 60° C. for 150 seconds and thereafter, under purging with nitrogen (oxygen concentration: 0.1% or less), the coated film was cured by irradiation with ultraviolet rays at an illuminance of 400 mW/cm$^2$ and an irradiation dose of 400 mJ/cm$^2$ by using an air-cooled metal halide lamp (manufactured by Eye Graphics Co., Ltd.) of 160 W/cm to form a laminate 101 in order that the film thickness of the low refractive index layer becomes 92 nm and the film thickness of the high refractive index layer becomes 112 nm after curing. Using the other coating compositions (Comp-2 to Comp-26) in the Table, Laminates 102 to 126 were produced in the same manner as the formation of laminate 101. At this time, the coated amount was adjusted in increments of 5% in the range of plus or minus 20% in order that the difference of the two minimal reflectivities of the reflectivity in the measurement of reflectivity described later was in a range of 0.1%.

In addition, as the laminate for comparison, a coating solution (Hn-1) for the high refractive index layer was coated on the substrate TAC-1 by a die coater under the condition of a transport speed of 30 m/min and then dried at 60° C. for 60 seconds and thereafter, under purging with nitrogen (oxygen concentration: 0.1% or less), the coated film was cured by irradiation with ultraviolet rays at an illuminance of 160 mW/cm$^2$ and an irradiation dose of 60 mJ/cm$^2$ by using an air-cooled metal halide lamp (manufactured by Eye Graphics Co., Ltd.) of 160 W/cm to form a high refractive index layer of which the film thickness became 112 nm after curing. A coating solution Ln-1 for the low refractive index layer was coated thereon by a die coater under the condition of a transport speed of 30 m/min and then dried at 60° C. for 60 seconds and thereafter, under purging with nitrogen (oxygen concentration: 0.1% or less), the coated film was cured by irradiation with ultraviolet rays at an illuminance of 400 mW/cm$^2$ and an irradiation dose of 400 mJ/cm$^2$ by using an air-cooled metal halide lamp (manufactured by Eye Graphics Co., Ltd.) of 160 W/cm to form a comparative laminate 126 of which the film thickness became 93 nm after curing.

[Evaluation of Laminates]

Regarding the obtained laminates (anti-reflection films), evaluation and measurement of the following items were performed.

[Particle Distribution Property]

The anti-reflection film sample after curing was vertically cut in the thickness direction and the cross section was observed by a transmission electron microscope, then, the cross-sectional image was observed over 5 µm in the width direction, and the state in which the inorganic fine particles were present was evaluated using the following 5-stage criteria.

A: The low refractive index inorganic fine particle-containing layer was distributed in the upper portion, the high refractive index inorganic fine particle-containing layer was distributed in the lower portion and the thickness unevenness thereof was less than 5%.

B: The low refractive index inorganic fine particle-containing layer was distributed in the upper portion, the high refractive index inorganic fine particle-containing layer was distributed in the lower portion and the thickness unevenness thereof was 5% or more to less than 10%.

C: The low refractive index inorganic fine particle-containing layer was distributed in the upper portion, the high refractive index inorganic fine particle-containing layer was distributed in the lower portion, the thickness unevenness thereof was 10% or more to less than 30%, and a part of the inorganic fine particles was also present in the lower layer.

D: The thickness unevenness of the inorganic fine particle-containing layer was 30% or more to less than 50%, or the interface between the distribution layer of the low refractive index inorganic fine particles and the layer of high refractive index inorganic fine particles in the lower layer was indistinct.

E: The thickness unevenness of the inorganic fine particle-containing layer was 50% or more, or the distribution layer of the inorganic fine particles was substantially not formed.

Furthermore, the definition of the thickness unevenness is shown below.

Among observed across 5 µm in the width direction, the film thicknesses of the low refractive index layer and the film thickness of the high refractive index layer were measured at 10 points, and the film thickness ratio of the total film thicknesses of the two layers and the low refractive index layer was calculated. It was defined that the thickness unevenness of a certain point=(film thickness ratio of the total film thickness of the two layers and the film thickness of the low refractive index layer at the certain point)÷(the average value of the film thickness ratio of the total film thickness of the two layers and the film thickness of the low refractive index layer), and furthermore, the average value of these measured 10 points was defined as the thickness unevenness.

[Aggregation Property of the Coating Solution]

Regarding the aggregation property of the coating solution, after one hour passed from the preparation of the coating solution, it was visually determined whether or not there was a precipitate.

A: No aggregation of the coating solution or precipitate.

B: Aggregation of the coating solution or precipitates occurred.

[Surface Defects]

A black PET film was bonded to the back face (support side) of the anti-reflection film sample to prepare a sample for surface evaluation in which the back face reflection was suppressed. The front face side of the sample was irradiated with a 3-wavelength fluorescent lamp to give illuminance of 500 lux to the front face, only 5 m$^2$ was visually inspected, the number of surface defects was divided by 5, and the occurrence frequency of surface defects caused by the inorganic particle for 1 m$^2$ was evaluated according to the following criteria. Levels of C or greater are preferable.

The determination of the presence or absence of surface defects was performed by cutting the defective portion and observing the obtained cross section with electron microscope. In a case that there were aggregations, foreign materials, or the like of 5 µm or more in the coating film formed by the single liquid two-layer coating composition, it was determined that there were surface defects.

A: 0 or more to less than 0.1 defects.
B: 0.1 or more to less than 0.2 defects.
C: 0.2 or more to less than 0.3 defects.
D: 0.3 or more to less than 0.4 defects.
E: 0.4 or more to less than 1.0 defects.
F: 1.0 defect or more.

[Integrated Reflectivity]

The back face (substrate side) of the anti-reflection film sample was roughened with sandpaper and then processed with black ink to eliminate the back face reflection and in such a state, the front face side was measured for the integrated spectral reflectivity at an incident angle of 5° in the wavelength region of 380 to 780 nm using a spectrophotometer (manufactured by JASCO Corp.). As the result, the arithmetic average value of the integral reflectivity at 450 to 650 nm was used.

The integral reflectivity of the anti-reflection film sample is preferably 0.79% or less.

[Steel Wool Scratch Resistance]

A rubbing test was performed using a rubbing tester under the following conditions.

Evaluation environmental conditions: 25° C. and 60% RH

Rubbing material: a steel wool {No. 0000, manufactured by Nihon Steel Wool Co., Ltd.} was wound around the rubbing tip (1 cm×1 cm) of the tester coming into contact with the sample, and fixed so as not to move with a band. In addition, a reciprocating rubbing motion was executed under the following conditions.

Moving distance (one way): 13 cm, Rubbing speed: 13 cm/sec

Load: 500 g/cm$^2$, Contact area of tip: 1 cm×1 cm

Number of rubbings: 10 reciprocations

An oil-based black ink was coated on the back side of the rubbed sample, and scratches in the rubbed portion were visually observed using reflected light and evaluated according to the following criteria.

A: Scratches can not be seen at all even with extremely careful checking.

B: Slight scratches can be faintly seen with extremely careful checking.

C: Slight scratches can be seen.

D: Moderate scratches can be seen.

E: There are scratches which are recognizable at a glance.

When the scratch resistance is the B level or more, the practical value is high.

[Adhesion]

The anti-reflection film sample was humidified for 2 hours under conditions of a temperature of 25° C. and 60 RH %. The surface on the side having the low refractive index layer of each sample was incised with a cutter knife to form 11 longitudinal lines and 11 transverse lines in a grid pattern, thereby carving a total of one hundred 1 cm×1 cm squares, and a polyester adhesive tape (No. 31B) manufactured by Nitto Denko Corp. was adhered to the surface. After 30 minutes passed, the tape was swiftly peeled off in the orthogonal direction, and the number of peeled-off squares was counted and evaluated according to the following 4-stage criteria. The same adhesion evaluation was performed three times, and the average thereof was taken.

A: Peeling off was not recognized at all in 100 squares.

B: Peeling off of one or two squares was recognized in 100 squares.

C: Peeling off of 3 to 10 squares was recognized in 100 squares (within an acceptable range).

D: Peeling off of 11 or more squares was recognized in 100 squares.

[Calculation Method of Film Thickness]

The anti-reflection film sample after curing was vertically cut in the thickness direction, the cross section was observed by a transmission electron microscope, and the region, in which the inorganic fine particles which are the (B) component were present in a concentration of 1.8 times or more of the average density of the entire coating film layer formed by using the coating composition of the present invention, was calculated as the film thickness of the low refractive index layer. In addition, the region in which the high refractive index inorganic fine particles which are the (F) component are present at a concentration of 1.8 times or more of the average concentration of the entire coating film layer formed by using the coating composition of the present invention was calculated as the film thickness of the high refractive index layer. However, in a case in which there is no low refractive index layer or high refractive index layer, the film thickness of the cured film is given as the film thickness of the low refractive index layer.

The refractive indices of the low refractive index layer and the high refractive index layer were calculated by optical fitting (least squares method).

[Calculation Method of the Free Energy of Mixing]

The free energy ($\Delta G = \Delta H - T \cdot \Delta S$) of mixing ($\Delta H$: enthalpy, $\Delta S$: entropy, and T: absolute temperature) of the (A) component and the (C) component was determined using the Flory-Huggins lattice theory. The calculation was performed using the degree of polymerization of the (A) component and the (C) component, the volume fraction ($\phi$; in the literature, also referred to as the composition fraction), and the interaction parameter ($\chi$) of the (A) component and the (C) component.

The results are shown in Table 7.

TABLE 7

| Sample No. | Substrate | Coating composition | Aggregation of coating solution | Distribution of particles | Integrated reflectivity | Low refractive index layer Refractive index | Film thickness (nm) |
|---|---|---|---|---|---|---|---|
| 101 | TAC-1 | Comp-1 | A | B | 0.79% | 1.38 | 92 |
| 102 | TAC-1 | Comp-2 | A | A | 0.55% | 1.36 | 94 |
| 103 | TAC-1 | Comp-3 | A | A | 0.55% | 1.36 | 93 |
| 104 | TAC-1 | Comp-4 | A | A | 0.55% | 1.36 | 92 |
| 105 | TAC-1 | Comp-5 | A | B | 0.73% | 1.38 | 90 |
| 106 | TAC-1 | Comp-6 | A | A | 0.53% | 1.36 | 93 |
| 107 | TAC-1 | Comp-7 | A | B | 0.64% | 1.37 | 94 |
| 108 | TAC-1 | Comp-8 | A | B | 0.73% | 1.38 | 90 |
| 109 | TAC-1 | Comp-9 | A | A | 0.53% | 1.36 | 93 |
| 110 | TAC-1 | Comp-10 | A | B | 0.64% | 1.37 | 94 |
| 111 | TAC-1 | Comp-11 | A | C | 0.77% | 1.38 | 91 |
| 112 | TAC-1 | Comp-12 | A | C | 0.80% | 1.39 | 93 |
| 113 | TAC-1 | Comp-13 | A | B | 0.82% | 1.39 | 92 |
| 114 | TAC-1 | Comp-14 | A | E | 4.15% | 1.43 | 60 |
| 115 | TAC-1 | Comp-15 | A | E | 5.80% | — | 208 |
| 116 | TAC-1 | Comp-16 | A | A | 0.55% | 1.36 | 94 |
| 117 | TAC-1 | Comp-17 | B | — | — | — | — |
| 118 | TAC-1 | Comp-18 | B | — | — | — | — |
| 119 | TAC-1 | Comp-19 | A | A | 0.56% | 1.37 | 92 |
| 120 | TAC-1 | Comp-20 | A | B | 0.62% | 1.37 | 93 |
| 121 | TAC-1 | Comp-21 | A | B | 0.71% | 1.37 | 92 |
| 122 | TAC-1 | Comp-22 | A | A | 0.55% | 1.36 | 94 |
| 123 | TAC-1 | Comp-23 | A | B | 0.79% | 1.38 | 95 |
| 124 | TAC-1 | Comp-24 | A | A | 0.54% | 1.36 | 94 |

TABLE 7-continued

| | | | | | | | |
|---|---|---|---|---|---|---|---|
| 125 | TAC-1 | Comp-25 | A | B | 0.67% | 1.37 | 92 |
| 126 | TAC-1 | Comp-26 | A | C | 1.07% | 1.40 | 90 |
| 127 | TAC-1 | Hn-1/Ln-1 | — | — | 0.54% | 1.36 | 93 |

| Sample No. | High refractive index layer | | Scratch resistance | Adhesions | Surface defects | Notes |
|---|---|---|---|---|---|---|
| | Refractive index | Film thickness (nm) | | | | |
| 101 | 1.70 | 112 | B | B | B | Present Invention |
| 102 | 1.72 | 115 | A | A | A | Present Invention |
| 103 | 1.72 | 113 | A | A | A | Present Invention |
| 104 | 1.72 | 112 | A | A | A | Present Invention |
| 105 | 1.71 | 108 | A | A | B | Present Invention |
| 106 | 1.72 | 110 | A | A | A | Present Invention |
| 107 | 1.71 | 111 | A | A | A | Present Invention |
| 108 | 1.71 | 108 | A | A | A | Present Invention |
| 109 | 1.72 | 110 | A | A | A | Present Invention |
| 110 | 1.71 | 111 | A | A | A | Present Invention |
| 111 | 1.70 | 110 | E | B | D | Comparative Example |
| 112 | 1.71 | 110 | C | B | D | Comparative Example |
| 113 | 1.70 | 110 | A | A | B | Present Invention |
| 114 | 1.56 | 140 | B | A | D | Comparative Example |
| 115 | — | — | A | A | D | Comparative Example |
| 116 | 1.72 | 112 | A | A | A | Present Invention |
| 117 | — | — | — | — | — | Comparative Example |
| 118 | — | — | — | — | — | Comparative Example |
| 119 | 1.72 | 110 | A | A | A | Present Invention |
| 120 | 1.71 | 114 | B | A | A | Present Invention |
| 121 | 1.70 | 113 | B | A | A | Present Invention |
| 122 | 1.72 | 110 | A | B | A | Present Invention |
| 123 | 1.70 | 109 | B | B | B | Present Invention |
| 124 | 1.72 | 112 | B | A | A | Present Invention |
| 125 | 1.71 | 113 | B | B | A | Present Invention |
| 126 | 1.69 | 110 | C | B | D | Comparative Example |
| 127 | 1.72 | 112 | A | C | A | Comparative Example |

As seen from Table 7, in samples 101 to 110, since a low refractive index layer containing low refractive index inorganic fine particles (hollow silica particles) was distributed to the air interface side, and a high refractive index layer containing high refractive index inorganic fine particles (zirconia particles) was distributed to the substrate interface side to allow the forming of two layers having different compositions at the same time with a single coating, the production efficiency of the anti-reflection film was increased, and, in comparison with the sequential coating sample 127, excellent results in which the distribution property of particles was B or more, the integral reflectivity was 0.79% or less, the scratch resistance was B or more, the adhesion was B or more, and the surface defects were B or more, were obtained. In addition, in samples 101 to 110, since a compound containing a polyalkylene oxide group or a basic functional group as the (A) component was used, in comparison with sample 114 using a fluorine compound (P-1) which does not contain such functional groups as the (A) component, excellent results in which the distribution property of particles was B or more, the integral reflectivity was 0.79% or less, the scratch resistance was B or more, the adhesion was B or more, and the surface defects were B or more, were obtained. In addition, in samples 101 to 110, by using a compound having a fluorine-containing hydrocarbon structure as the (A) component of the present invention, the surface energy of the (A) component could be lowered, and excellent results in which the distribution property of particles was B or more, the integral reflectivity was 0.79% or less, the scratch resistance was B or more, the adhesion was B or more, and the surface defects were B or more, were obtained. (Comparison with sample 115. Since the sample 115 used the compound A-1 which does not have a fluorine-containing hydrocarbon structure, there was no refractive index interface, the layers were uniform, and the reflectivity was substantially not decreased). In addition, in samples 101 to 110, since a polyfunctional fluorine-containing monomer was used as the (E) component, in comparison with a system of the comparative example of sample 111 in which the polyfunctional fluorine-containing monomer is not present or with the comparative example of sample 112 in which a monofunctional fluorine-containing monomer is used, excellent results in which the surface defects were B or more were obtained.

In sample 116, by using high refractive index inorganic fine particles having undergone surface modification processing as the (F) component, the aggregation property of the coating liquid could be controlled and the distribution of the two types of particles could be respectively controlled, whereby excellent results in which the distribution property of particles was B or more, the integral reflectivity was 0.61% or less, the scratch resistance was A or more, and the adhesion was B or more, were obtained. Since the comparative example 117 used zirconia particles dispersed by a dispersing agent, in the coating liquid, the hollow silica particles having a comparatively high polarity and the dispersing agent interact, and the aggregation property of the coating liquid cannot be controlled. Furthermore, since zirconia which has not undergone surface treatment is also used in comparative example 118, the aggregation property of the coating liquid cannot be controlled.

Regarding the (A) component of samples 116, 119, and 120 and the (C) component of which the free energy of mixing is zero or more, the separability of the component derived from the (A) component and the (B) component is improved, and excellent results in which the distribution property was B or more, the integral reflectivity was 0.62% or less, the scratch resistance was B or more, and the adhesion was A or more, were obtained.

According to samples 116 and 122, as the (D) component, by using a solvent of PGME or methyl acetate in addition to MEK and MIBK in combination, a poor solvent (PGME), of which the difference in the SP value with the (A) component was approximately 4.5 could improve the phase separability, and time could be saved up until the diffusion movement of the inorganic fine particles was finished after the phase separation by the solvent (MIBK) having a boiling point higher than 100° C. In addition, due to the fast drying of the solvent (MEK) having a boiling point of 100° C. or less, the occurrence of surface defects or the like could be suppressed until the concentration at which the (A) component and the inorganic fine particles (B) undergo phase separation is achieved. Furthermore, by using a low-viscosity solvent such as MIBK, MEK, and methyl acetate, excellent results, in which the distribution property was B or more, the integral reflectivity was 0.71% or less, the scratch resistance was B or more, and the adhesion was B or more, were obtained (Comparison with sample 123. Since 2-butanol has a viscosity of 4.2 cP (20° C.), the viscosity in the coating film during coating and drying was extremely high, and the particles are not easily diffused, the distribution of the particle worsened).

According to samples 124 and 125, due to the fact that the surface of the (B) component is unmodified, or the molecular weight of the silane coupling agent used in the surface treatment of the (B) component is 600 or less, the dispersibility in the organic solvent is improved and due to the interaction of the (A) component with the (B) component, excellent results, in which the distribution of the hollow silica particles was B or more, the integral reflectivity was 0.67% or less, the scratch resistance was B or more, and the adhesion was B or more, were obtained (Comparison with sample 126. Sample 126 uses a silane coupling agent (S-4) of which the molecular weight is greater than 600 in the surface treatment of the (B) component).

From these results of Examples and Comparative Examples, it may be understood that, since the coating composition of the present invention enables the low refractive index inorganic fine particles to be distributed to the upper portion of the coating film and enables the high refractive index inorganic fine particles to be distributed to the lower portion of the coating film, a multi-layer structure of two or more layers can be formed with a single coating step, whereby the productivity is high. In addition, the obtained laminate is an anti-reflection film having low reflectivity, and excellent in scratch resistance and adhesion.

This application claims priority under 35 U.S.C. §119 of Japanese Patent application JP 2011-215655, filed on Sep. 29, 2011, the entire contents of which are hereby incorporated by reference.

What is claimed is:
1. A method of manufacturing an anti-reflection film, the method comprising steps of:
preparing a coating composition in which the following (A) to (F) components are mixed;
coating the coating composition on a substrate to form a coating film;
drying the coating film by volatilizing a solvent from the coating film;
curing the coating film to form a cured layer, in this order; and
forming a multi-layer structure having different refractive indices from the coating composition,
(A) Fluorine-containing polymer including a fluorine-containing hydrocarbon structure and a constituent unit derived from a compound having at least one group selected from a polyalkylene oxide group and a basic functional group,
(B) low refractive index inorganic fine particles which are not surface-modified or low refractive index inorganic fine particles which are surface-treated with a silane coupling agent having the molecular weight of 600 or less,
(C) a curable binder containing no fluorine atoms in the molecule,
(D) a solvent,
(E) a polyfunctional fluorine-containing curable compound,
(F) high refractive index inorganic fine particles treated with a surface modifying agent represented by the following general formula (F-1)

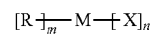

in the general formula (F-1), R represents an organic group having one or more carbon atoms, M represents a metal atom selected from silicon, zirconium, or titanium, and X represents an alkoxy group or a halogen atom, m represents an integer of 1 to 3 and n represents an integer of 1 to 3, In a case where there is more than one of R and X, they may respectively be the same or different, However, in the coating composition, the mass ratio of [(A) component+(B) component+(E) component]/[(C) component+(F) component] is 20/80 to 60/40, wherein the (A) component is a fluorine-containing polymer represented by the following general formula (1),

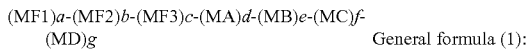

General formula (1):

in general formula (1), a to f respectively represent the molar fraction of each constituent unit with respect to all the constituent units configuring the fluorine-containing polymer, g represents the mass ratio of the constituent unit (MD) with respect to the whole fluorine-containing polymer, and a relationship of $0\% \leq a \leq 70\%$, $0\% \leq b \leq 70\%$, $0\% \leq c \leq 80\%$, $30\% \leq a+b+c \leq 90\%$, $0\% \leq d \leq 50\%$, $0\% \leq e \leq 50\%$, $0.1\% \leq f \leq 50\%$, and 0 mass $\% \leq g \leq 15$ mass % is satisfied, (MF1): represents a constituent unit derived from a monomer represented by $CF_2=CF-Rf_1$, $Rf_1$ represents a perfluoroalkyl group having 1 to 5 carbon atoms, (MF2): represents a constituent unit derived from a monomer represented by $CF_2=CF-ORf_{12}$, $Rf_{12}$ represents a fluorine-containing alkyl group having 1 to 30 carbon atoms, (MF3): represents a constituent unit derived from a monomer represented by $CH_2=CR_0-L-Rf_{13}$, $R_0$ represents a hydrogen atom, a halogen atom, or a methyl group, L represents a divalent linking group, and $Rf_{13}$ represents a fluorine-containing alkyl group having 1 to 30 carbon atoms, (MA): represents a constituent unit having at least one cross-linking group, (MB): represents a constituent unit having at least one non-cross-linking group, (MC): represents a constituent unit derived from a compound having at least one group selected from a polyalkylene oxide group and a basic functional group, (MD): represents a constituent unit having at least one polysiloxane structure, and in a case where there is more than one of (MF1), (MF2), (MF3), (MA), (MB), (MC), and (MD), they may respectively be the same or different, wherein (MC) in the general formula (1) is a constituent unit derived from a monomer having at least one polyalkylene oxide group of the following general formula (2),

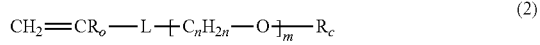
(2)

$R_0$ represents a hydrogen atom, a halogen atom, or a methyl group, L represents a divalent linking group, Rc represents a hydrogen atom or an alkyl group having 1 to 10 carbon atoms, m represents a positive integer and $2 \leq m \leq 50$, and n represents a positive integer and $1 \leq n \leq 5$, and when m is two or more, a plurality of $-C_nH_{2n}-O-$ may be different repeating units, respectively.

2. The method of manufacturing the anti-reflection film according to claim 1 wherein a molecular weight of the (E) component is 450 to 2000.

3. The method of manufacturing the anti-reflection film according to claim 1 wherein the (B) component is low refractive index inorganic fine particles which are surface-treated with a silane coupling agent, of which a molecular weight of the silane coupling agent is 90 to 600.

4. The method of manufacturing the anti-reflection film according to claim 1 wherein the (A) component is a copolymer containing a constituent unit having a fluorine-containing hydrocarbon structure.

5. The method of manufacturing the anti-reflection film according to claim 1 wherein the (A) component further has a polysiloxane structure in the molecule.

6. The method of manufacturing the anti-reflection film according to claim 1 wherein the (A) component contains a polymerizable functional group in the molecule.

7. The method of manufacturing the anti-reflection film according to claim 1 wherein the low refractive index inorganic fine particles of the (B) component are metal oxide fine particles with an average particle diameter of 1 to 150 nm and a refractive index of 1.46 or less.

8. The method of manufacturing the anti-reflection film according to claim 1 wherein the low refractive index inorganic fine particles of the (B) component are metal oxide fine particles of which surface has at least a silicon as a constituent component.

9. The method of manufacturing the anti-reflection film according to claim 1 wherein, as the (C) component, a compound having a plurality of unsaturated double bonds in the molecule is included.

10. The method of manufacturing the anti-reflection film according to claim 1 wherein free energy ($\Delta G = \Delta H - T \cdot \Delta S$) of mixing of the (C) component and the (A) component is greater than zero.

11. The method of manufacturing the anti-reflection film according to claim 1 wherein the (D) component is a mixed solvent including the following (D-1) and (D-2), (D-1): a volatile solvent having a boiling point in excess of 100° C.

(D-2): a volatile solvent having a boiling point of 100° C. or less.

12. The method of manufacturing the anti-reflection film according to claim 11 wherein the viscosities of the solvents (D-1) and (D-2) are 4.0 cP or less.

13. The method of manufacturing the anti-reflection film according to claim 1 wherein the high refractive index inorganic fine particles of the (F) component are oxide fine particles of at least one element selected from a group of zirconium, titanium, aluminum, iron, copper, zinc, yttrium, niobium, molybdenum, indium, tin, tantalum, tungsten, lead, bismuth, cerium, antimony, and germanium.

14. The method of manufacturing the anti-reflection film according to claim 1 wherein the surface modifying agent in the high refractive index inorganic fine particles of the (F) component is a compound having at least one group selected from a group of a vinyl group, a styryl group, an acryl group, a methacryl group, an acryloxy group, an epoxy group, a carbon-carbon double bond, a phenyl group, and a methylphenyl group.

15. The method of manufacturing the anti-reflection film according to claim 1 wherein the (A) component is a polymer containing a constituent unit having a fluorine-containing hydrocarbon structure, and a constituent unit including a basic functional group is grafted.

16. The method of manufacturing the anti-reflection film according to claim 1 wherein L in the general formula (2) is a divalent linking group having 1 to 9 carbon atoms.

* * * * *